(12) United States Patent
Knox et al.

(10) Patent No.: US 9,965,747 B2
(45) Date of Patent: *May 8, 2018

(54) CASE MANAGEMENT SYSTEM

(71) Applicant: Leydig, Voit & Mayer, Ltd., Chicago, IL (US)

(72) Inventors: Phillip J. Knox, Chicago, IL (US); Bruce M. Gagala, Downers Grove, IL (US); John Kilyk, Jr., Naperville, IL (US); H. Michael Hartmann, River Forest, IL (US)

(73) Assignee: Leydig, Voit & Meyer, Ltd., Chicago, IL (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/980,520

(22) Filed: Dec. 28, 2015

(65) Prior Publication Data
US 2016/0110688 A1    Apr. 21, 2016

Related U.S. Application Data

(63) Continuation of application No. 12/025,583, filed on Feb. 4, 2008, now Pat. No. 9,224,132.

(60) Provisional application No. 60/887,906, filed on Feb. 2, 2007.

(51) Int. Cl.
| | |
|---|---|
| *G06F 7/00* | (2006.01) |
| *G06Q 10/10* | (2012.01) |
| *G06Q 50/18* | (2012.01) |
| *G06F 17/30* | (2006.01) |

(52) U.S. Cl.
CPC ....... *G06Q 10/107* (2013.01); *G06F 17/3089* (2013.01); *G06Q 10/10* (2013.01); *G06Q 50/18* (2013.01)

(58) Field of Classification Search
USPC .......................................... 707/821
See application file for complete search history.

(56) References Cited

U.S. PATENT DOCUMENTS

| | | | |
|---|---|---|---|
| 7,373,330 B1 * | 5/2008 | Klebe | G06Q 10/10 380/200 |
| 7,392,254 B1 * | 6/2008 | Jenkins | G06Q 10/10 |
| 2002/0016735 A1 * | 2/2002 | Runge | G06Q 10/107 705/14.49 |

(Continued)

OTHER PUBLICATIONS

The Authoritative Dictionary of IEEE Standards Terms, Seventh Edition, IEEE Press 2000, pp. 442 and 514.*

*Primary Examiner* — Cheyne D Ly
(74) *Attorney, Agent, or Firm* — Leydig, Voit & Mayer, Ltd.

(57) ABSTRACT

A content management system is disclosed for documents and other content for a system operating in legal environment referred to herein as a case management system. The case management system allows attorneys in a legal environment to efficiently store and manage content for their client and case matters. Furthermore, the system encourages attorneys to collaborate with fellow co-workers, clients, and third parties (e.g. expert witnesses) in a secure and confidential environment. The case management system enables attorneys to maintain case files and associated documents more efficiently and thus allow law firms to more productively function as a business that relies heavily upon comprehensive document files.

20 Claims, 41 Drawing Sheets

(56) References Cited

U.S. PATENT DOCUMENTS

| | | | |
|---|---|---|---|
| 2006/0036873 A1* | 2/2006 | Ho | G06F 21/32 |
| | | | 713/186 |
| 2006/0085374 A1* | 4/2006 | Mayes | G06F 17/30707 |
| 2006/0129602 A1* | 6/2006 | Witriol | G06Q 10/107 |
| 2006/0212487 A1* | 9/2006 | Kennis | G06F 17/30569 |
| 2006/0230044 A1* | 10/2006 | Utiger | G06F 17/30345 |
| 2007/0271517 A1* | 11/2007 | Finkelman | G06F 17/30864 |
| | | | 715/742 |

\* cited by examiner

Creating a New Client Site Flow Diagram

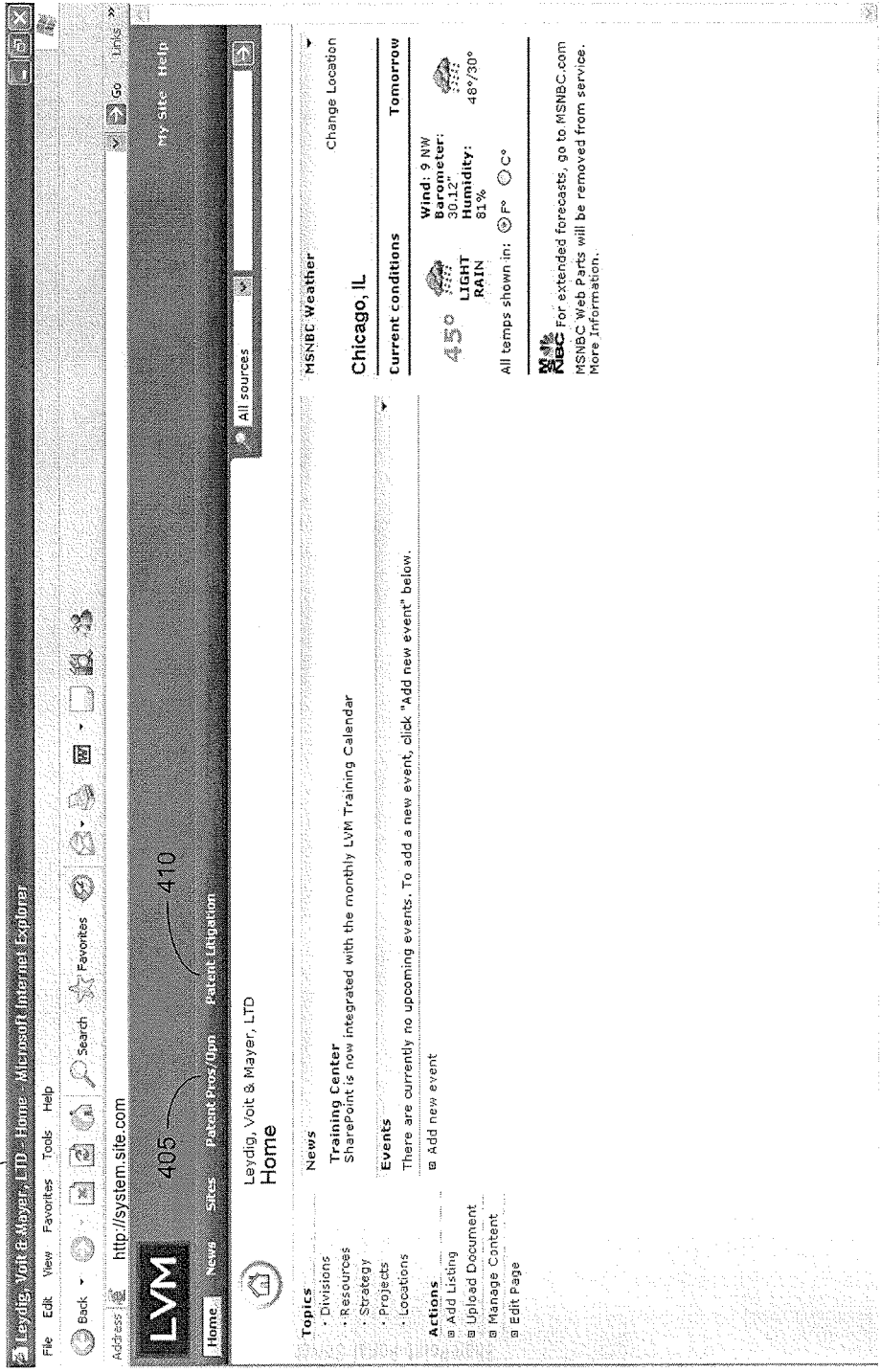
FIGURE 4: Case Management System Home Page

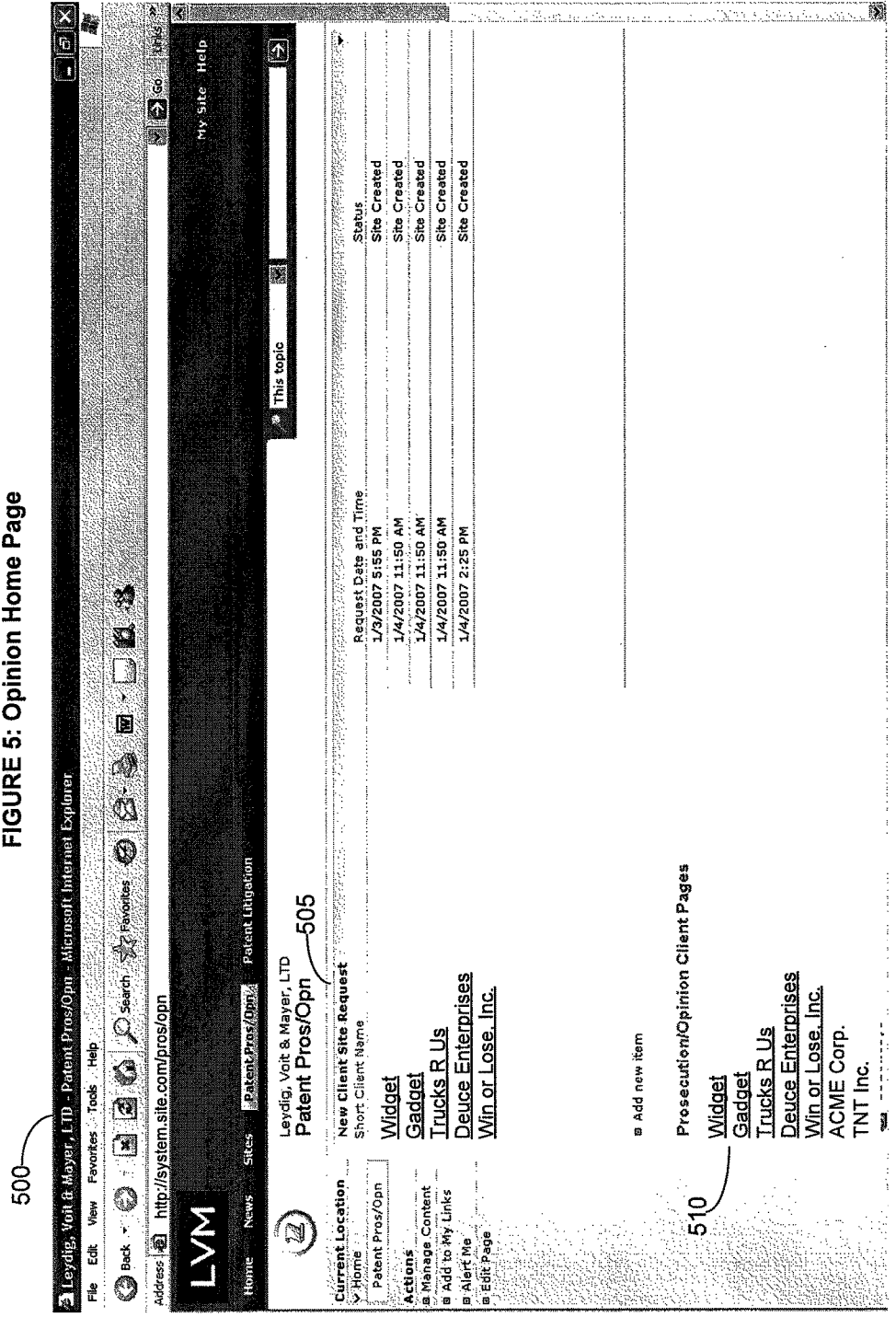
FIGURE 5: Opinion Home Page

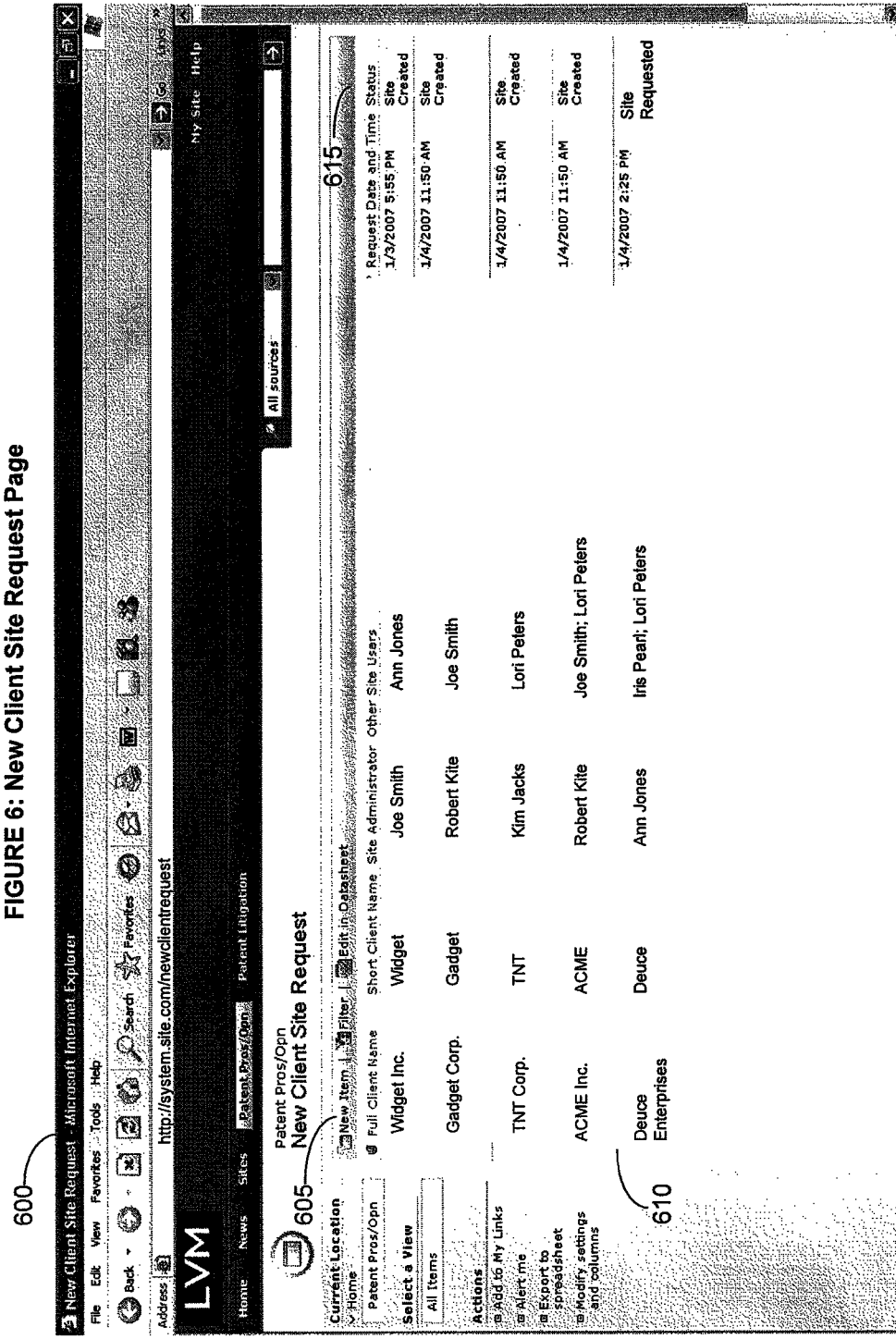
FIGURE 6: New Client Site Request Page

FIGURE 7: New Client Site Request: New Item Page

Creating a New Case Site Flow Diagram

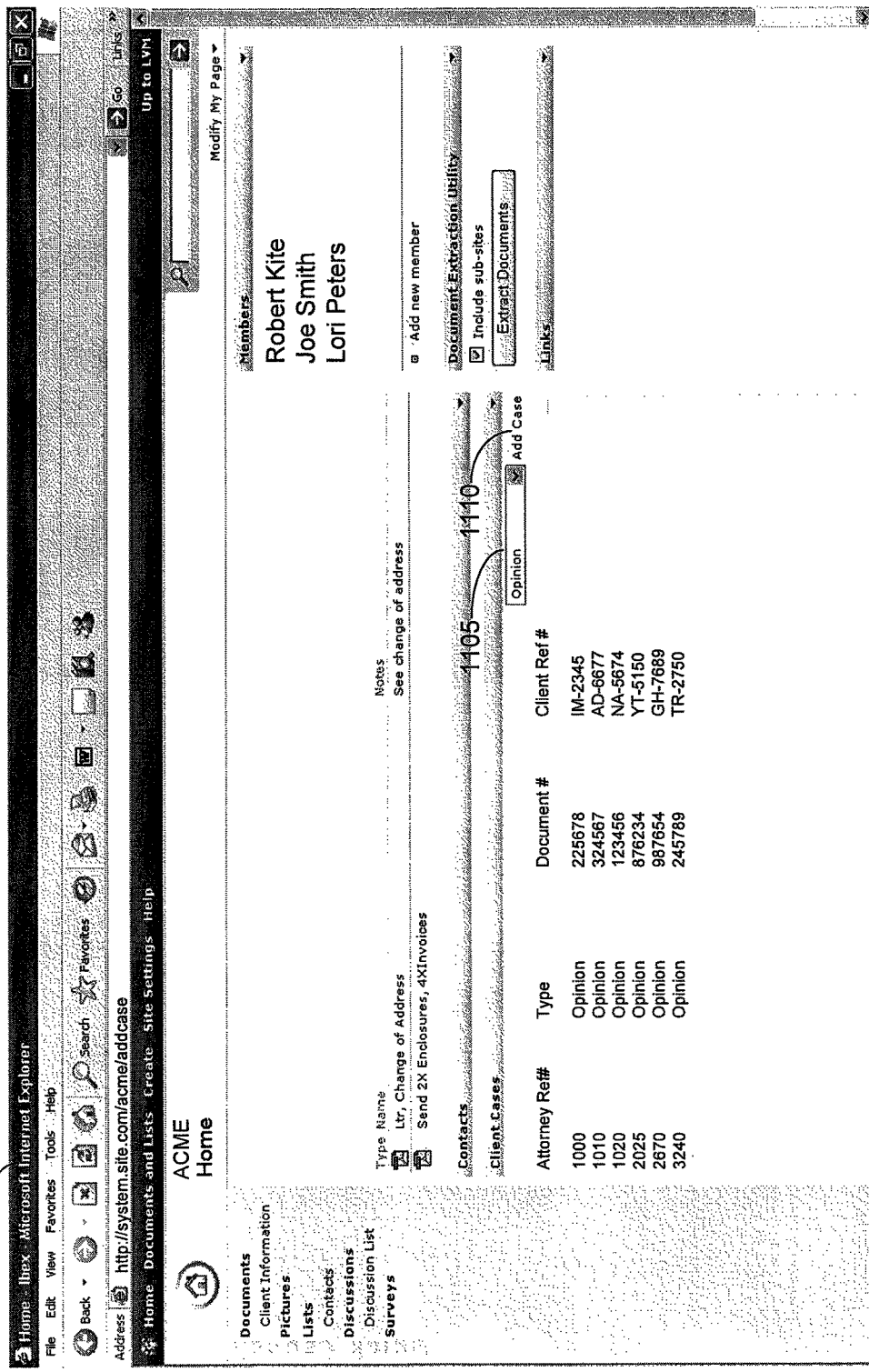
FIGURE 11: Client Site Home Page with Add Case Feature

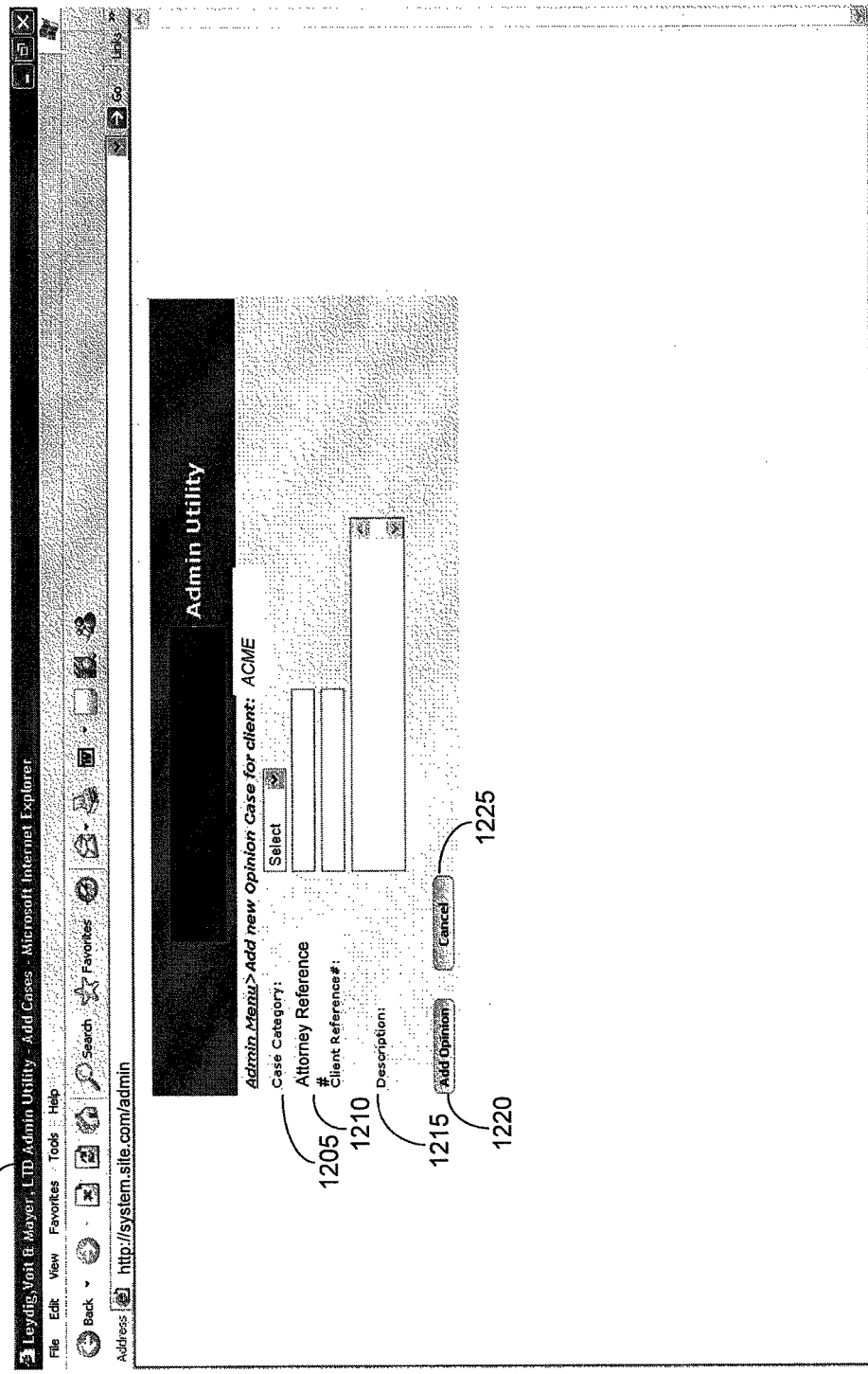
FIGURE 12: New Case Site Request Page

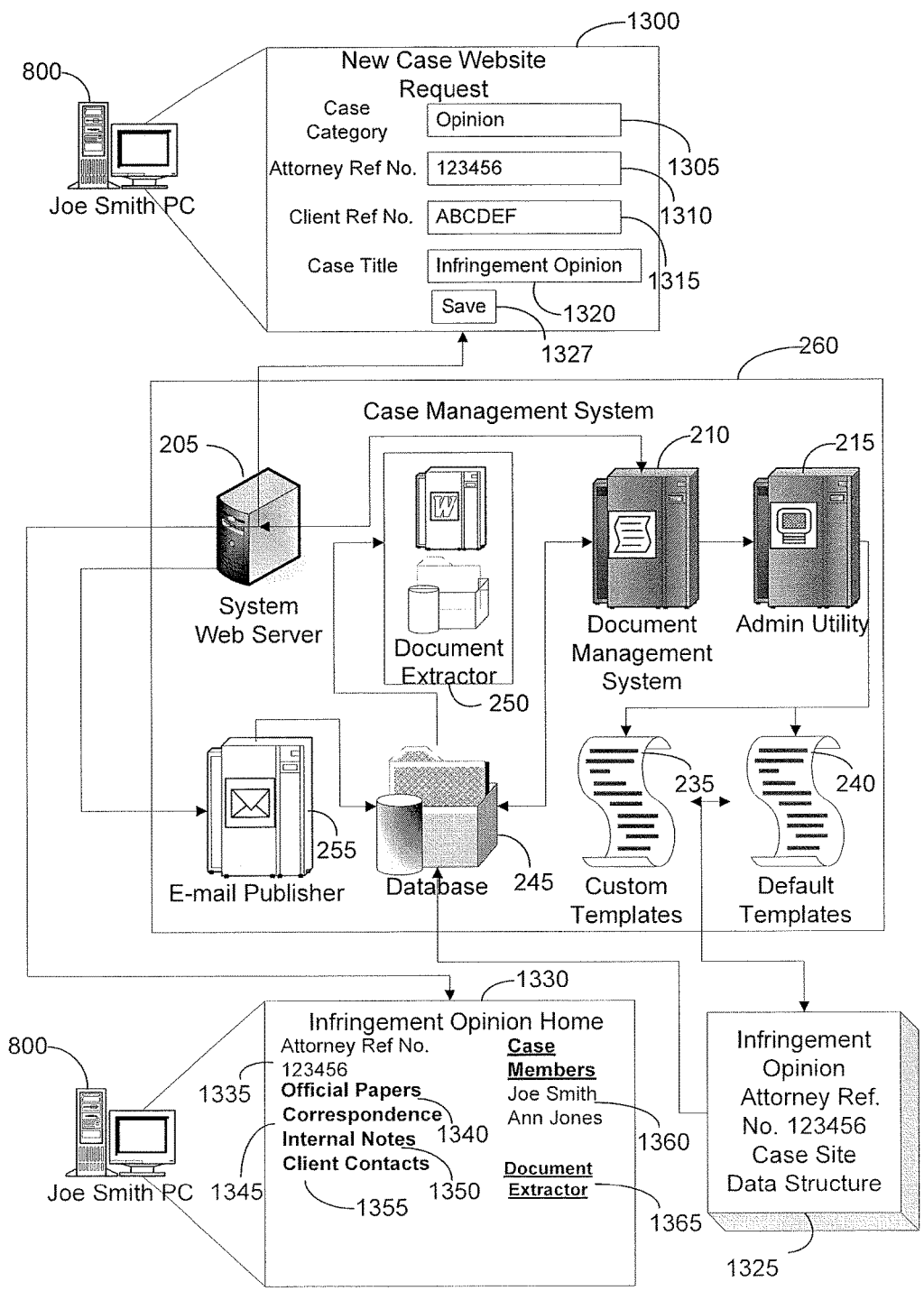

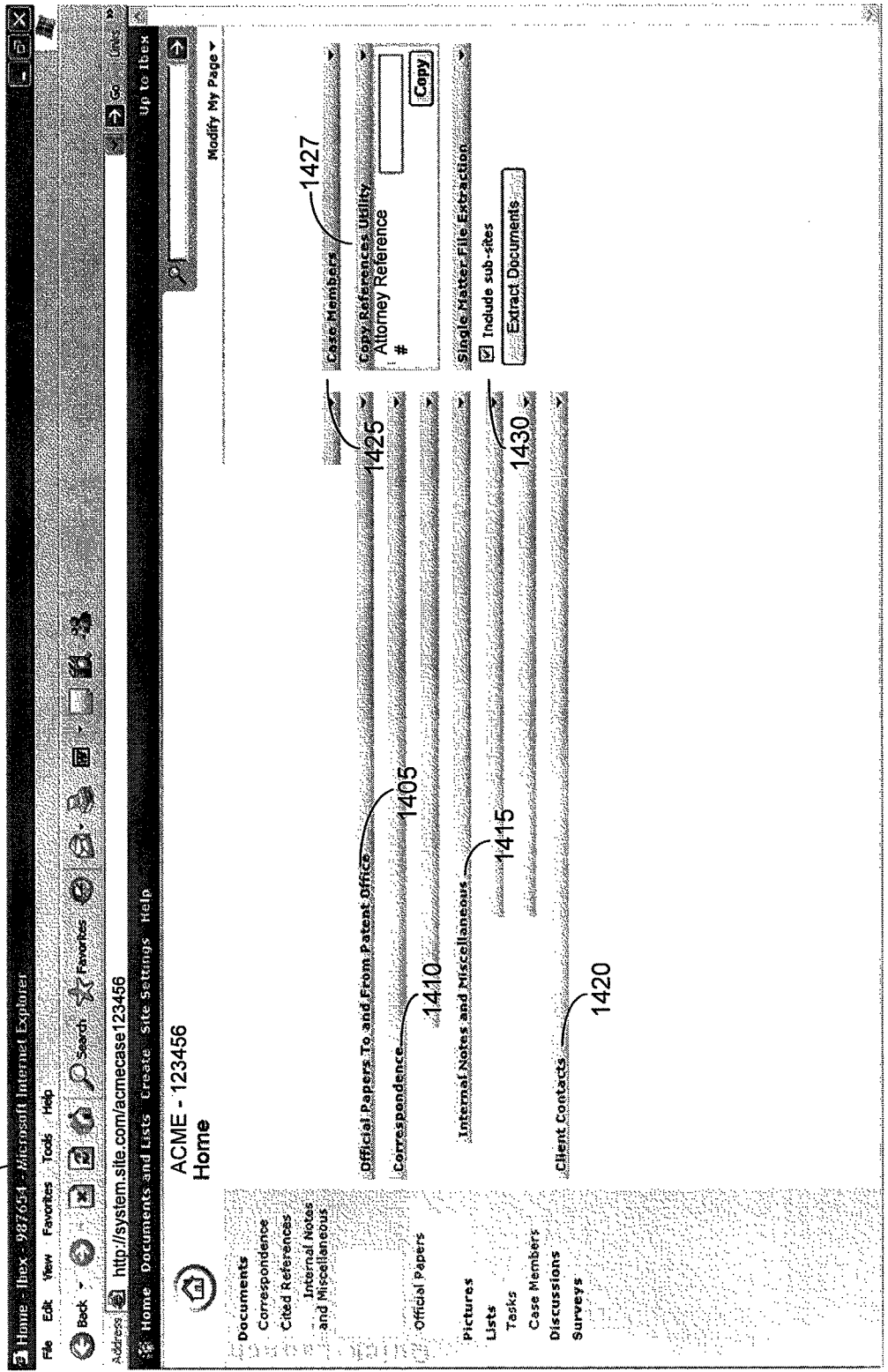
FIGURE 14: Case Site Home Page

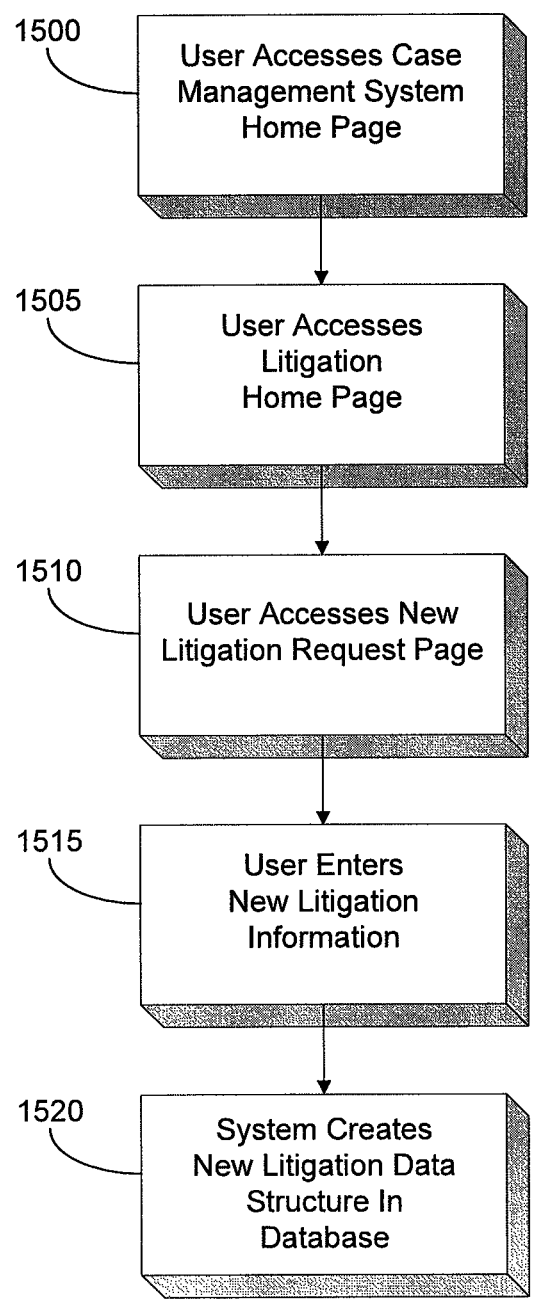

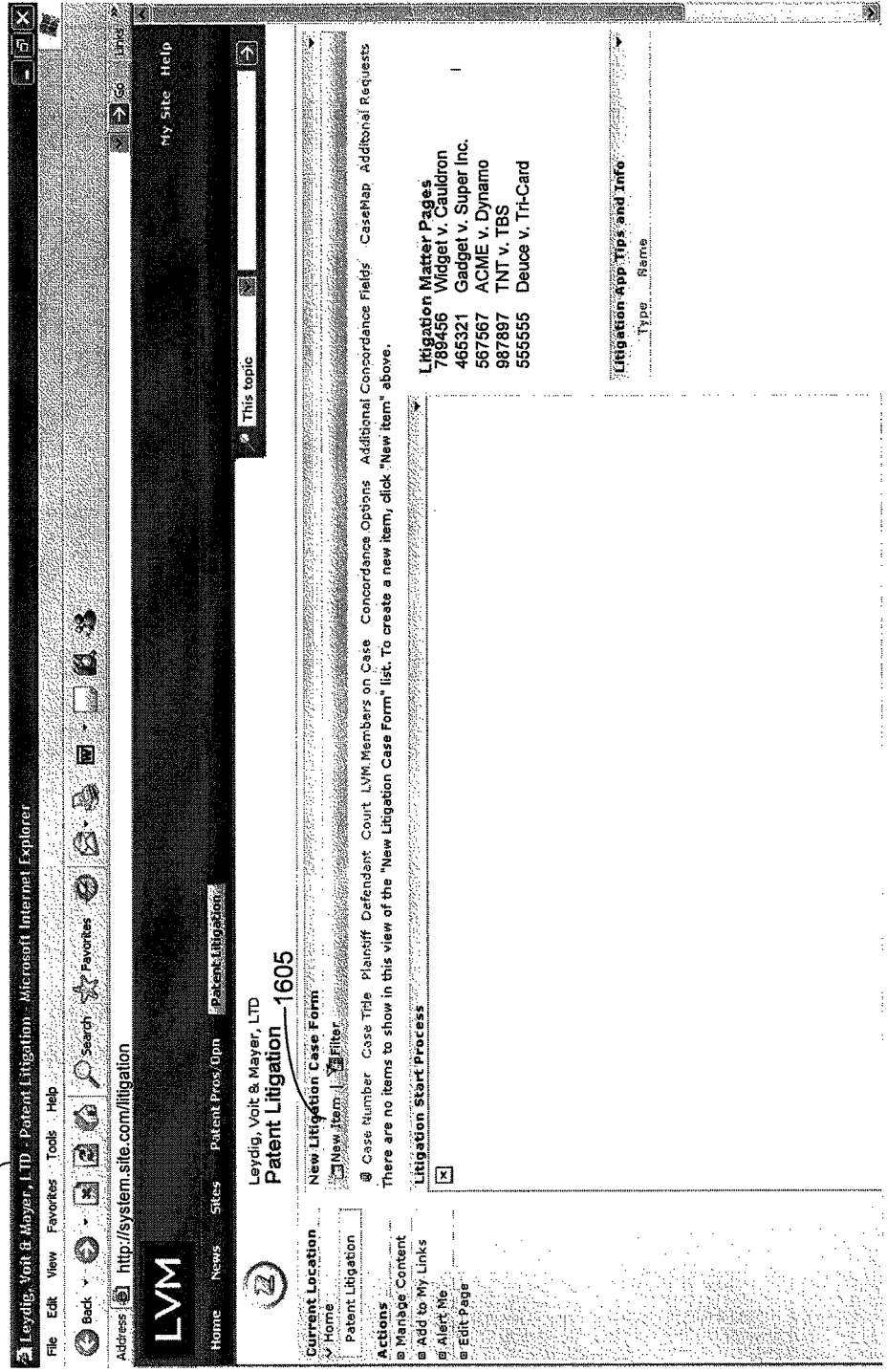
FIGURE 16: Litigation Home Page

FIGURE 17: New Litigation Request Page

FIGURE 19: Litigation Site Home Page

Case Site:
Create and Store Content
Flow Diagram

FIGURE 22: Case Site Official Papers Page

FIGURE 23: Case Site Upload Document Page

Opinion Case Data Structure

FIGURE 27: Litigation Site Pleadings Page

FIGURE 28: Litigation Site Pleadings Upload Document Page

Litigation Case Data Structure

E-Mail Publisher Screen Shots

Default Template

3600

Client Custom Template

Opinion Custom Template

Patent Prosecution Custom Template

Litigation Custom Template

Patent Interference Custom Template

CASE MANAGEMENT SYSTEM

CROSS-REFERENCE TO RELATED APPLICATIONS

This patent application claims the benefit of U.S. patent application Ser. No. 12/025,583, filed Feb. 4, 2008, which claims priority to U.S. Provisional Patent Application No. 60/887,906, filed Feb. 2, 2007, the contents of both of which are incorporated by reference in their entirety, including any references contained therein.

FIELD OF THE INVENTION

The field of the invention is computer systems in general and more particularly content management systems.

BACKGROUND OF THE INVENTION

In today's modern business world the key to productivity for businesses is their ability to efficiently store, manage, and reuse information content and work product. Each business has challenges in managing content. Challenges include having a reliable, efficient, and intuitive organizing system. Also, content management systems should accurately handle version control such that the most current version of a document is used for customer correspondence, supply purchases, or co-worker collaboration. Furthermore, content management systems not only file documents but also store content of differing media, from video to photographs to audio files. Finally, a content management system is not merely an electronic file cabinet that employees use to search and retrieve files, but a digital vault that secures confidential content from customers, suppliers, or fellow workers.

A content management system should be easy to use such that a company's employees should only have a short learning curve so as to not lose their productivity. In addition, the content management system should make typical tasks more efficient, making it worth the investment in time and money for businesses. For example, the e-mailing of documents as attachments to e-mail messages should not be inhibited when sending these same documents from a content management system. No business can trade a content management system for less efficient means for producing daily work product.

In a legal environment, content management can be more challenging than other traditional businesses. Attorneys collaborate with each other as well as with clients and third parties (e.g. expert witnesses). Due to the nature of the relationship between attorneys and their clients, work product and content are kept confidential. Consequently, a content management system in a legal environment should provide security and confidentiality among a group of users. Furthermore, attorneys strive for efficiency and productivity. Therefore, a content management system should be efficient and yield higher productivity for a firm than without investing in a system. Consequently, a system should be easy to use and efficiently perform typical tasks in a legal environment. At the same time, a system should provide a productive means to collaborate with client, third parties, and fellow attorneys. Finally, a content management system should be compatible with typical, daily document processes in a law firm.

BRIEF SUMMARY OF THE INVENTION

The present invention and its embodiments disclose a content management system for documents and other content for a legal environment called a case management system. It allows attorneys in a legal environment to efficiently store and manage content for their client and case matters. Furthermore, the system encourages attorneys to collaborate with fellow co-workers, clients, and third parties (e.g. expert witnesses) in a secure and confidential environment. The case management system enables attorneys to be more efficient individually and allows law firms to be more productive as a business.

BRIEF DESCRIPTION OF THE SEVERAL VIEWS OF THE DRAWINGS

While the appended claims set forth the features of the present invention with particularity, the invention and its advantages are best understood from the following detailed description taken in conjunction with the accompanying drawings, of which:

FIG. 4 is a diagram of an exemplary user interface incorporated into an exemplary embodiment FIG. 5 is a diagram of an exemplary user interface incorporated into an exemplary embodiment;

FIG. 6 is a diagram of an exemplary user interface incorporated into an exemplary embodiment;

FIG. 7 is a diagram of an exemplary user interface incorporated into an exemplary embodiment;

FIG. 11 is a diagram of an exemplary user interface incorporated into an exemplary embodiment;

FIG. 12 is a diagram of an exemplary user interface incorporated into an exemplary embodiment;

FIG. 13 is a general overview of the operation of a system contemplated by an exemplary embodiment;

FIG. 14 is a diagram of an exemplary user interface incorporated into an exemplary embodiment;

FIG. 15 is a flow diagram illustrating the steps in creating a litigation site, in accordance with an exemplary embodiment;

FIG. 16 is a diagram of an exemplary user interface incorporated into an exemplary embodiment;

FIG. 17 is a diagram of an exemplary user interface incorporated into an exemplary embodiment;

DETAILED DESCRIPTION OF THE INVENTION

A content management system described in this specification contains several components and provides several functions. Components of a content management system include; a user interface, a web server, a document management system, an administration utility, custom and default templates, content data structure, a database, a document extractor, and an e-mail publisher. Extension to a base content management system include: an integrated administration utility, and pre-defined templates (custom and default). These additions are integrated through an application programming interface (API) and software development framework (SWDF), to create content specific to the business using a content management system. Further enhancements include a document extractor utility integrated with a document management system, through an API and SWDF, to allow users easier access to content from a system. An additional enhancement is an e-mail publisher that allows a user to easily store content from an e-mail program into a content management system.

The extended document manage system is suitable for a variety of environments. For example, in a law firm environment, users create and manage content specific to the law firm's client and cases. An exemplary embodiment is directed to a law firm environment, alternative embodiments include an administration utility, and default and custom templates that support a variety of business/enterprise classes including manufacturing, banking, investing, consulting, marketing & advertising, etc. Any business that creates, stores, and manages content is able to utilize an alternative embodiment.

Figure 1:
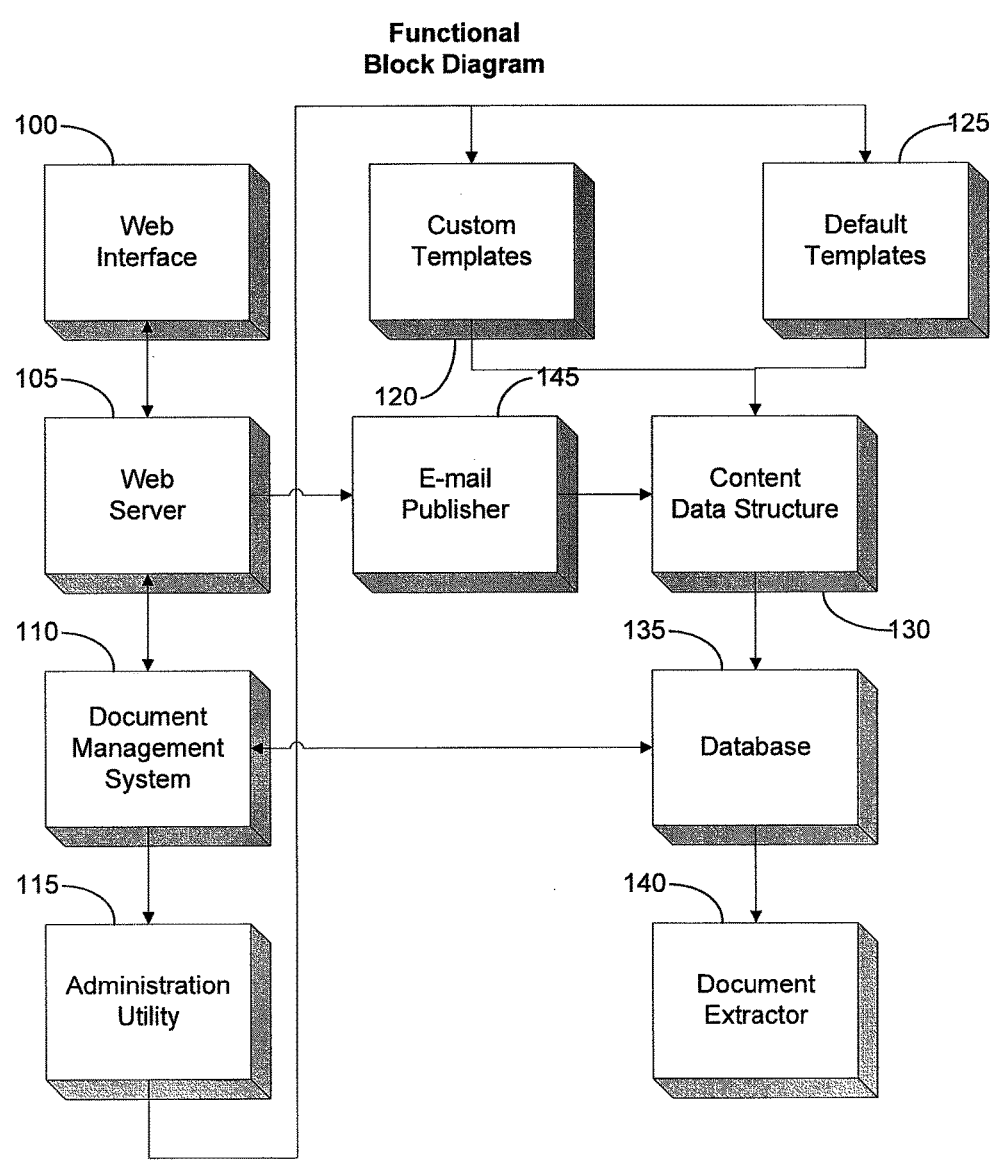
FIG. 1 is a functional block diagram illustrating components of an exemplary case management system, in accordance with an exemplary embodiment.

FIG. 1 is a functional block diagram illustrating components of an exemplary case management system, in accordance with an exemplary embodiment. An embodiment of a case management system contains several components. Components include a user interface 100, a web server 105, and a document management system 110. The user interface 100 allows a user to access content from a case management system when a user is on the same local area network as a case management system, or is a remote user where it accesses a system across a wide area network or the Internet (See FIG. 35). Exemplary embodiments have system user interfaces that include, but are not limited to, a web or any other inter-network, intra-network or local area network, wide area network, Internet, browser, or viewer user interfaces. The web server 105 takes content from the document management system 110 and presents content to a user through the user interface 100. "System" throughout this specification refers to the "case management system" unless specified otherwise. Content created and stored in a system may not only be documents created with a word processor but also other media including, but not limited to, e-mails, photographs, audio, and video files. Components of a case management system also include an administration utility 115, custom 120 and default templates 125, a content data structure 130, and a system database 135 (e.g. SQL). The administration utility 115 and the custom 120 and default templates 125 are used to create new content data structures 130. Custom 120 and default templates 125 comprise reusable software forms that are used to create new content. Default templates 125 are software forms presented by the document management system 110 to expedite creating new content for a system. Alternatively, custom templates 120 are software forms geared toward a specific piece of content that will be repeatedly created by the user of a case management system for specific business needs. Content created by a case management system is stored in the system database 135. However, the database 135 is structured to store content in different data structures 130 that include, but are not limited to, client, case, and litigation data structures. Content stored for a particular client is stored in client data structures, while content stored for a particular case is stored in a case data structure. Similarly, litigation data structures contain content for litigation matters. The organization of data structures within the database 135 will be further explained when describing FIG. 20. The database can be contained in one server or span across several servers. A case management system also includes a document extractor 140 and an e-mail publisher 145. The document extractor 140 provides a user access to a set of documents (or other content) from a case management system and copies them to a user's storage media. Due to the data structures of the content in the database 135, the document extractor 140 first copies the documents into a flat file database, and then allows a user to access documents from the flat file database. The e-mail publisher 145 allows a user to copy e-mail correspondence from a local personal computer (or other storage media) into a content data structure 130 of the system database 135 through the user interface 100 and web server 105.

Figure 2:
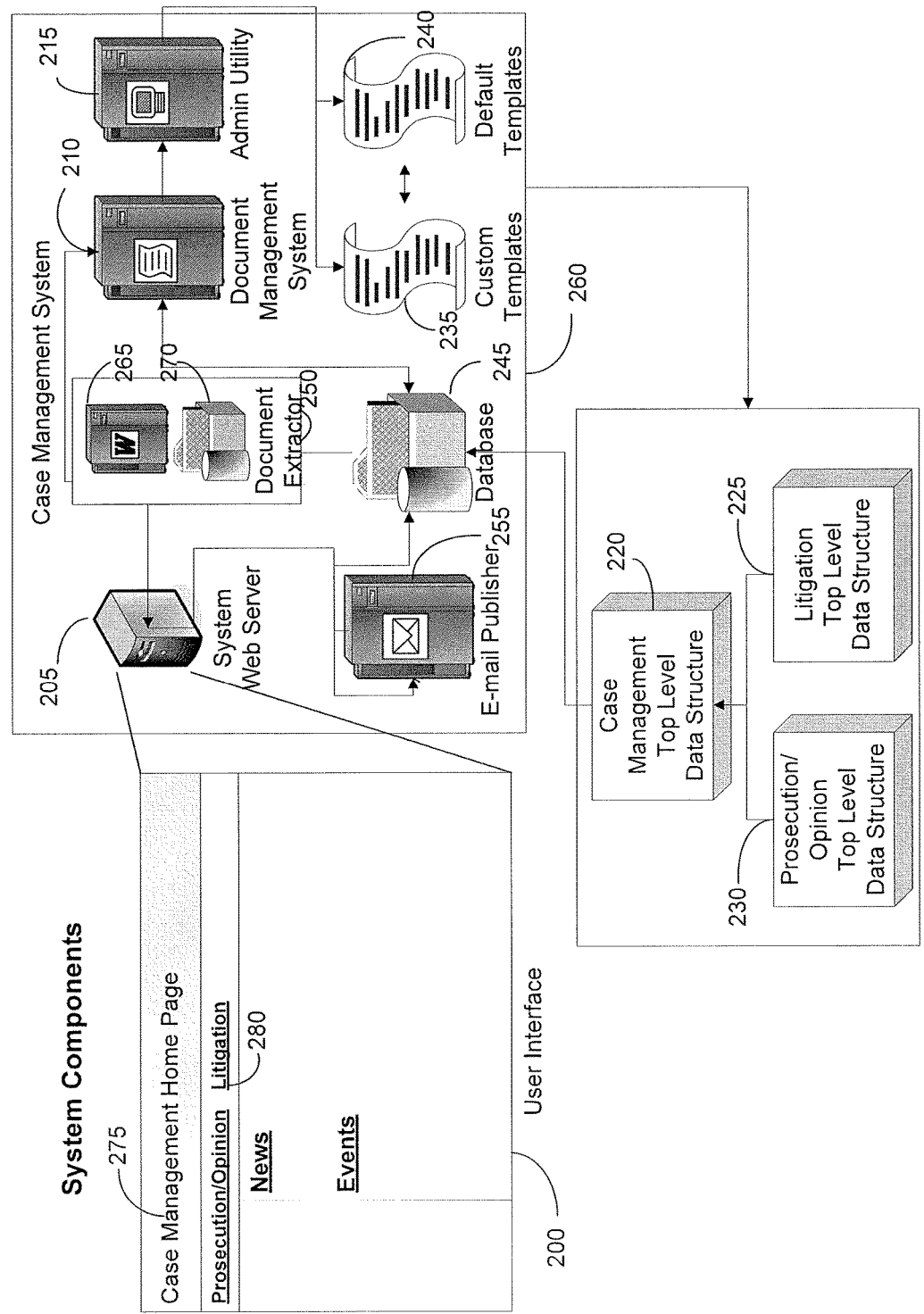
FIG. 2 is a system diagram illustrating the components of a case management system, in accordance with an exemplary embodiment.

FIG. 2 is a system diagram illustrating components of a case management system, in accordance with an exemplary embodiment. FIG. 2 illustrates different system components comprising a case management system 260. One system component is a generic representation of a user interface 200. The user interface 200 is the same user interface 100 described in FIG. 1. The user interface 200 is presented to a user by a web server 205. The web server 205 supports a user to create and store content within a document management system 210. For example, if, from a Case Management Home Page 275, a user seeks to access content from a Litigation Home Page, then a user selects a Litigation link 280 on the Case Management Home Page 275. The web server 205 then queries the document management system 210 to access a system database 245 to gather litigation content for the web server 205 to present via the user interface 200. FIG. 2 shows the content data structure 220, 225, and 230 and part of the system database 245. The content data structure that is accessed by the Case Management Home Page 275 is shown as a Case Management Top Level data structure 220. Underneath the Case Management Top Level Data Structure 220 are a Prosecution/Opinion Top Level data structure 230 and a Litigation Top Level data structure 225. When accessed by the user interface 200, they are viewed by a user as a Prosecution/Opinion Home Page and a Litigation Home Page. FIG. 2 also pictures other system components including an administration utility 215, custom 235 and default 240 templates, a document extractor 250, and an e-mail publisher 255. As discussed when describing FIG. 1, the document extractor 250 comprises of a software processor 265 that copies documents from the system database 245 to a flat file database 270. This allows a user easier access documents from the case management system 260 than from the database 245 directly. A user then copies files from the flat file database 270 to a local personal computer (or some other storage media). An e-mail publisher 255 allows a user to publish e-mails from a user's personal computer into the system 260. The e-mail publisher 255 stores messages into a content data structure within the system database 245.

Figure 34:
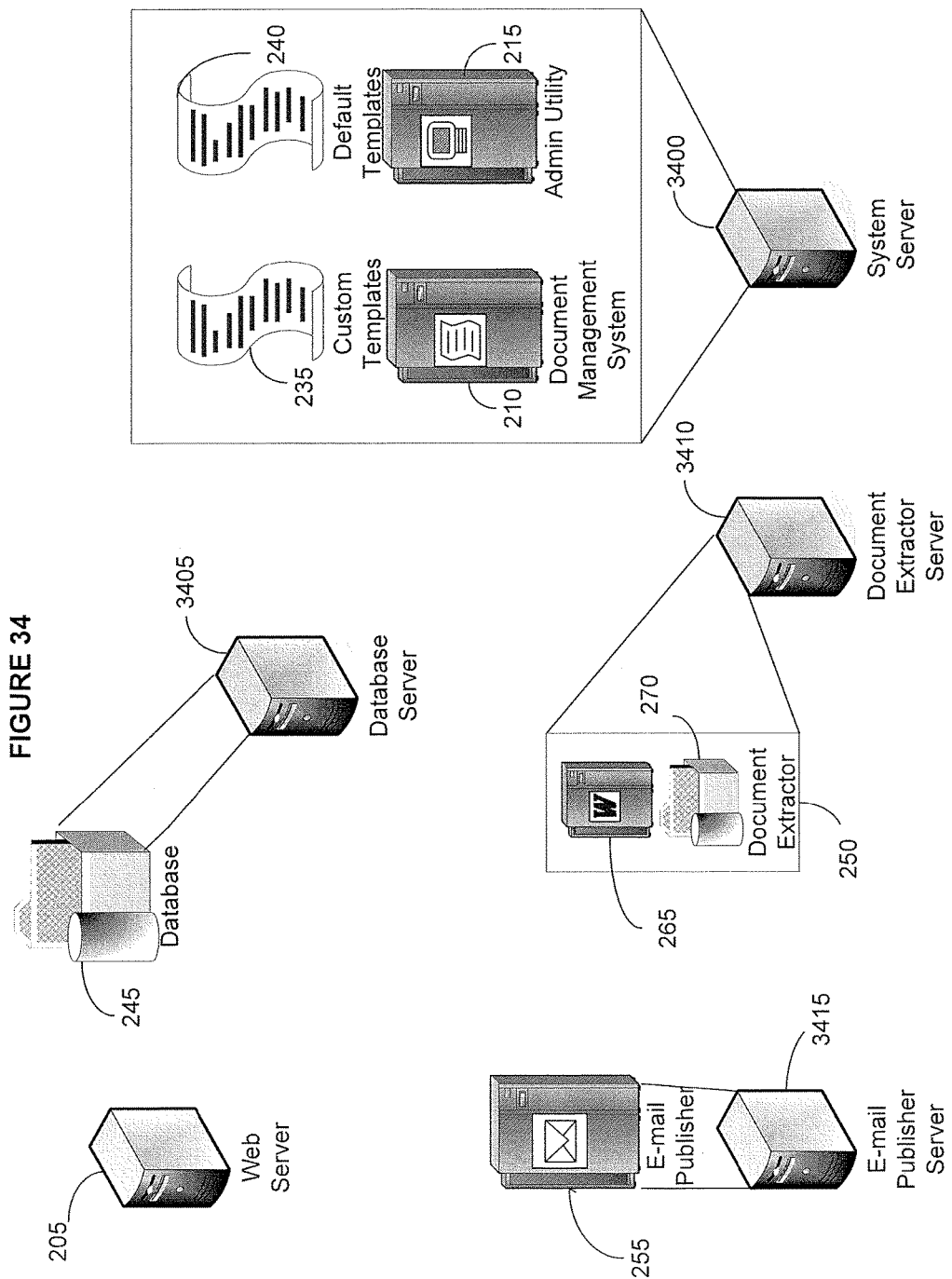
FIG. 34 is a general overview of the operation of a system contemplated by an exemplary embodiment.

FIG. 34 is a general overview of the operation of a system contemplated by an exemplary embodiment. FIG. 34 illustrates an embodiment that shows functional components of the case management system 260 (See FIG. 2) are split between several servers. Other embodiments may have all functional components of the system 260 contained in one server, or arranged where servers contain a different set of functions as depicted in FIG. 34. Specifically, in the embodiment pictured in FIG. 34, the system 260 comprises the web server 205, the database 245 contained in a database server 3405, and the e-mail publisher utility 255 contained in an e-mail publisher utility server 3415. In addition, FIG. 34 shows a system server 3400 containing the document management system 210, the administration utility 215, the custom 235, and default templates 240. Finally, FIG. 34 pictures a document extractor server 3410 containing the document extractor utility 265 and the flat file database 270.

Figure 35:
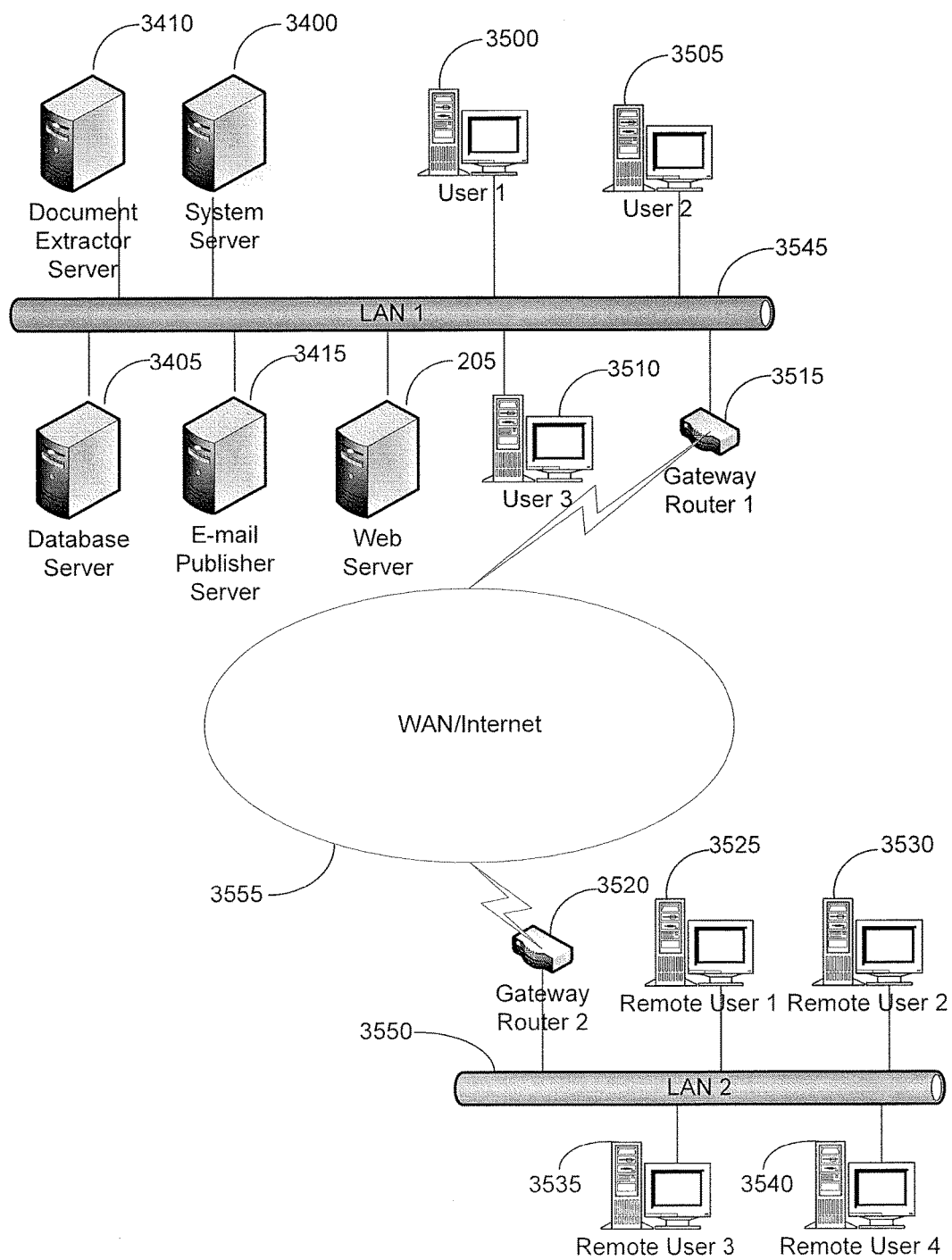
FIG. 35 is a general overview of the operation of a system contemplated by an exemplary embodiment

FIG. 35 is a general overview of the operation of a system contemplated by an exemplary embodiment. FIG. 35 shows an embodiment where system components are located on a local area network (LAN 1) 3545. System components on LAN 1 3545 include the system server 3400, the web server 205, the database server 3405, the document extractor server 3410, and the e-mail publisher server 3415. Also on LAN 1 3545 are several system users User 1 3500, User 2 3505, and User 3 3510 who can access the system 260 (See FIG. 2) across LAN 1 3545. Another network component on LAN 1 3545 is a gateway router 3515 that connects the LAN to the Internet or wide area network (WAN) 3555. The gateway router 3515 allows remote users 3525, 3530, 3535, and 3540 to remotely access the case management system 260 from LAN 1 3545 across the Internet 3555. A second gateway router 3520 connects a second local area network (LAN 2) 3550 to access the system 260 through the Internet or WAN 3555.

Figure 20:
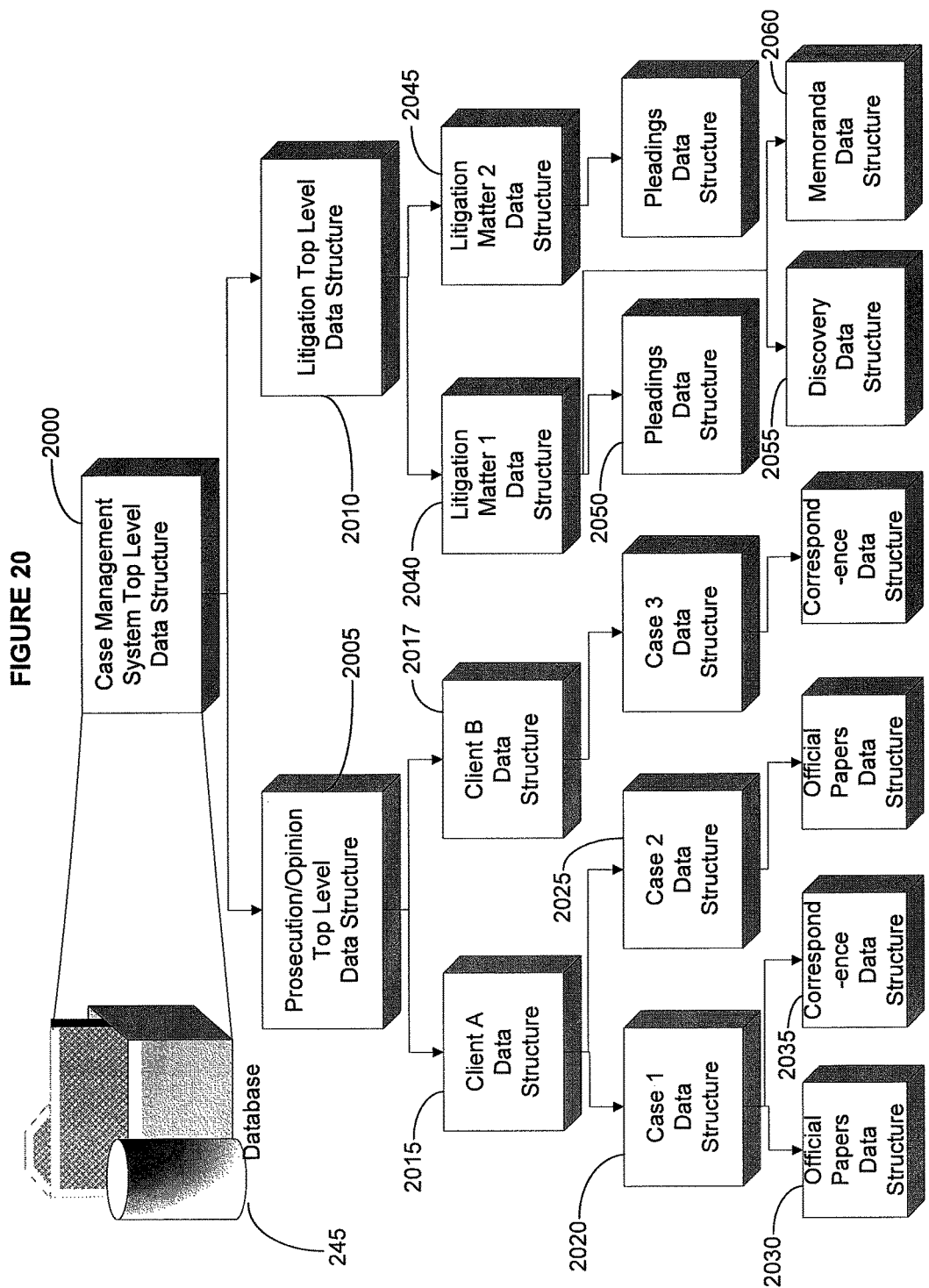
FIG. 20 is a functional block diagram illustrating a data structure of the database within the case management system, in accordance with an exemplary embodiment.

FIG. 20 is a functional block diagram illustrating a data structure of the database 245 within the case management system 260 (See FIG. 2), in accordance with an exemplary embodiment. The system database 245 is organized in a hierarchical tree structure comprising several levels. The database 245 can be contained on one server or span across several servers. Each data structure contains content relative to its place in the tree and connects to a corresponding client, case, or litigation matter. Each data structure is accessed via the user interface 200. A data structure accessible through the user interface 200 is called a site. This term comes from user interfaces and servers used in the embodiments of the system. Data accessible by a user interface that include, but are not limited to, web or any other inter-network, intra-network or local area network, wide area network, Internet, browser, or viewer user interfaces are called "websites" or "sites" for short. Sites are also called "web pages" or "pages" for short. "Websites", "sites", "web pages" and "pages" refer to the ability of accessing content stored in data structures contained within the system database 245 through the user interface 200.

At the top level of the database tree structure is a Case Management Top Level Data Structure 2000. When accessed by the user interface 200 (See FIG. 2) it is displayed as a Case Management System Home Page 400 (See FIG. 4). The next level of the database tree structure contains both Opinion Top Level 2005 and Litigation Top Level data structures 2010. Similar to the system top level 2000, these data structures, when accessed by the user interface 200 are displayed as a Prosecution/Opinion Home Page 500 and a Litigation Home Page 1600, respectively (See FIGS. 5 and 16). The next level of the data tree structure, underneath a Prosecution/Opinion data structure 2005, is a level of client data structures 2015. Each client data structure contains case data structures 2020, and 2025 underneath it, corresponding to each opinion matter for the client. Finally, the bottom level of the tree structure contains data structures for each case. The bottom level includes data structures that contain official papers 2030 and correspondence 2035. Again, each data structure when accessed by the user interface 200 is displayed as web pages or web sites. Underneath a Litigation data structure 2010 are Litigation matter data structures 2040 and 2045. Litigation matter data structures 2040 and 2045 contain content for each litigation matter stored in the system 260 (See FIG. 2). Underneath each Litigation matter data structure 2040 and 2045 are content data structures typically needed in any litigation. These include Pleadings 2050, Discovery 2055, and Memoranda 2060 data structures. Again, each data structure when accessed by the user interface 200 is displayed as web pages or as web sites. The Pleadings 2050, Discovery 2055, and Memoranda 2060 data structures within the Litigation Top Level 2010 portion of the database tree are at the same level of the data structure tree as the case sites 2020 and 2025 in the Prosecution/Opinion Top Level 2005 portion of the database.

Figure 3:
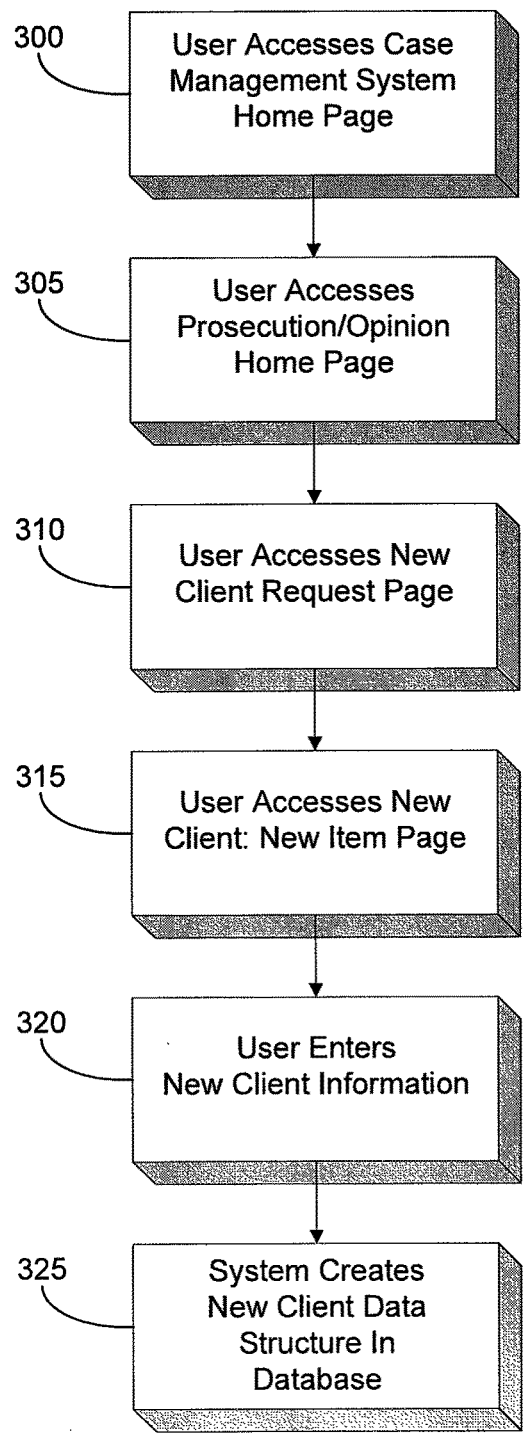
FIG. 3 is a flow diagram illustrating the steps in creating a client site, in accordance with an exemplary embodiment.

FIG. 3 is a flow diagram illustrating steps in creating a client site, in accordance with an exemplary embodiment. A user of the case management system 260 (See FIG. 2)

creates new content for a particular client, then stores and manages content in the system 260. To achieve this, a user creates data structures that are accessible from user interfaces 200 (See FIG. 2). For example, data structures contain content for a particular client or for a particular case for a client. Client and case content are accessed through the user interface 200 and stored in different data structures within the case management system 260 called client and case sites, respectively. FIG. 3 illustrates a progression of steps incorporating functional components of an exemplary embodiment that allow a user to create client sites. At step 300, a user accesses a Case Management System Home Page 400 (See FIG. 4) via the user interface 200. At step 305, a user accesses a Prosecution/Opinion Home Page 500 (See FIG. 5). An "Opinion" encompasses a variety of opinions attorneys render in writing on such matters as whether to sue, settle, or negotiate certain client interests. "Prosecution" relates to the process of applying for patents and trademarks from the United State patent and trademark Office (USPTO). The Prosecution/Opinion Home Page 500 accesses content related to these matters in the case management system 260. At step 310, a user accesses a New Client Request Page 600 (See FIG. 6). Thereafter at step 315, a user accesses a New Client Request: New Item Page 700 (See FIG. 7). At step 320, a user enters client information to be stored into the case management system 260. Finally, at step 325, the system 260 creates a new client data structure for new content and stores it into the system database 245 (See FIG. 2).

Figure 7:
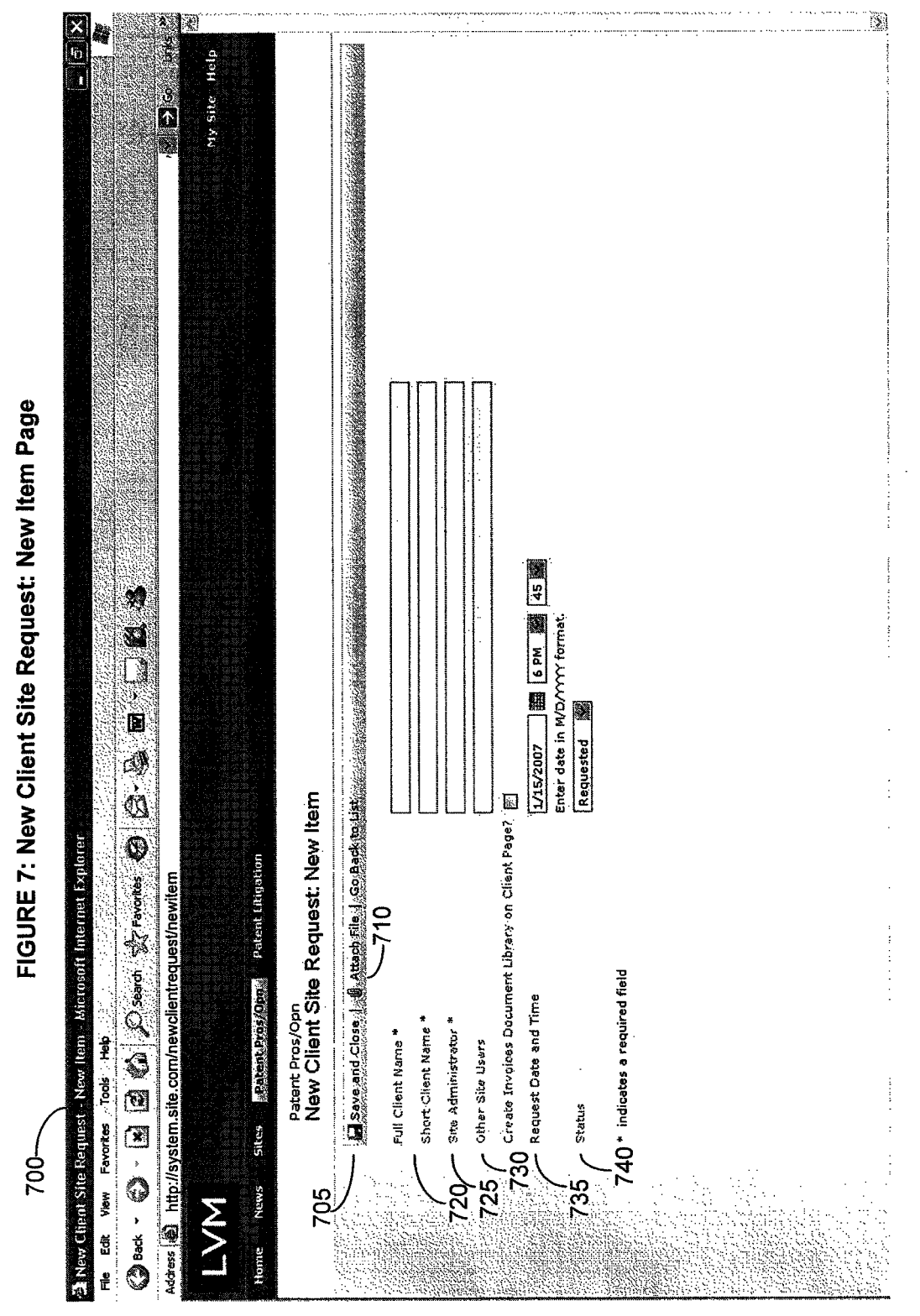

FIGS. 4-7 are diagrams of exemplary user interfaces, each incorporated into an exemplary embodiment. FIG. 4 is a screen shot of an exemplary web or inter-network user interface of an exemplary Case Management System Home Page 400. The exemplary user interface depicted in FIG. 4 provides users management capabilities for content contained within the case management system 260 (See FIG. 2). A user selects a Patent Pros/Opn link 405 to access the Prosecution/Opinion Home Page 500 displayed in FIG. 5 to create and manage content related to client opinions and prosecution matters. Litigation content is accessed by selecting a Litigation link 410. FIG. 5 is a diagram of an exemplary user interface of an exemplary Opinion Home Page 500. Similar to the Case Management Home Page 400, the Prosecution/Opinion Home Page 500 enables a user to manage client content for prosecution and opinion matters. The bottom of the Prosecution/Opinion Home Page 500 displays a client list identifying clients 510 that have prosecution and opinion content contained within the case management system 260. In order to create new client content, a user selects the "New Client Site Request" link 505. The link allows a user to access a New Client Site Request Page 600 displayed in FIG. 6. FIG. 6 is a diagram of an exemplary user interface of the New Client Site Request Page 600. The page 600 lists New Client Site Requests 610 and statuses in a column 615. The status columns 615 shows whether client sites have been created or their creation is pending before the system. In order to create a new client site and then add new client content into the case management system 260 (See FIG. 2), a user selects a New Item link 605. Selecting the link 605 accesses a New Client Site Request: New Item Page 700 displayed in FIG. 7. FIG. 7 is a diagram of an exemplary user interface of the New Client Site Request: New Item Page 700. To create a new client site data structure that contains new client prosecution or opinion content in the case management system 260 (See FIG. 2), a user enters necessary information into the system 260. The information includes a Client Name 720, a site administrator 725, other site users 730, a request date and time 735, and a status 740 of a site. The site administrator 725 and site users 730 allow content to be confidential to a group of listed users. Restricting access to the group of site users 730 is part of the security and confidentiality feature of the case management system 260. Security and confidentiality is restricted to separate groups of users at various levels. Client sites, cases sites, and litigation sites can restrict access to specified groups of users. In addition, sections within these sites such as correspondence, pleadings, or discovery sections are restricted to subset groups of users or to other groups of users of the parent site. The system 260 (See FIG. 2) is capable of restricting access to a particular document or another piece of content contained in the particular section of a site (such as correspondence, pleadings, or discovery).

Figure 8:
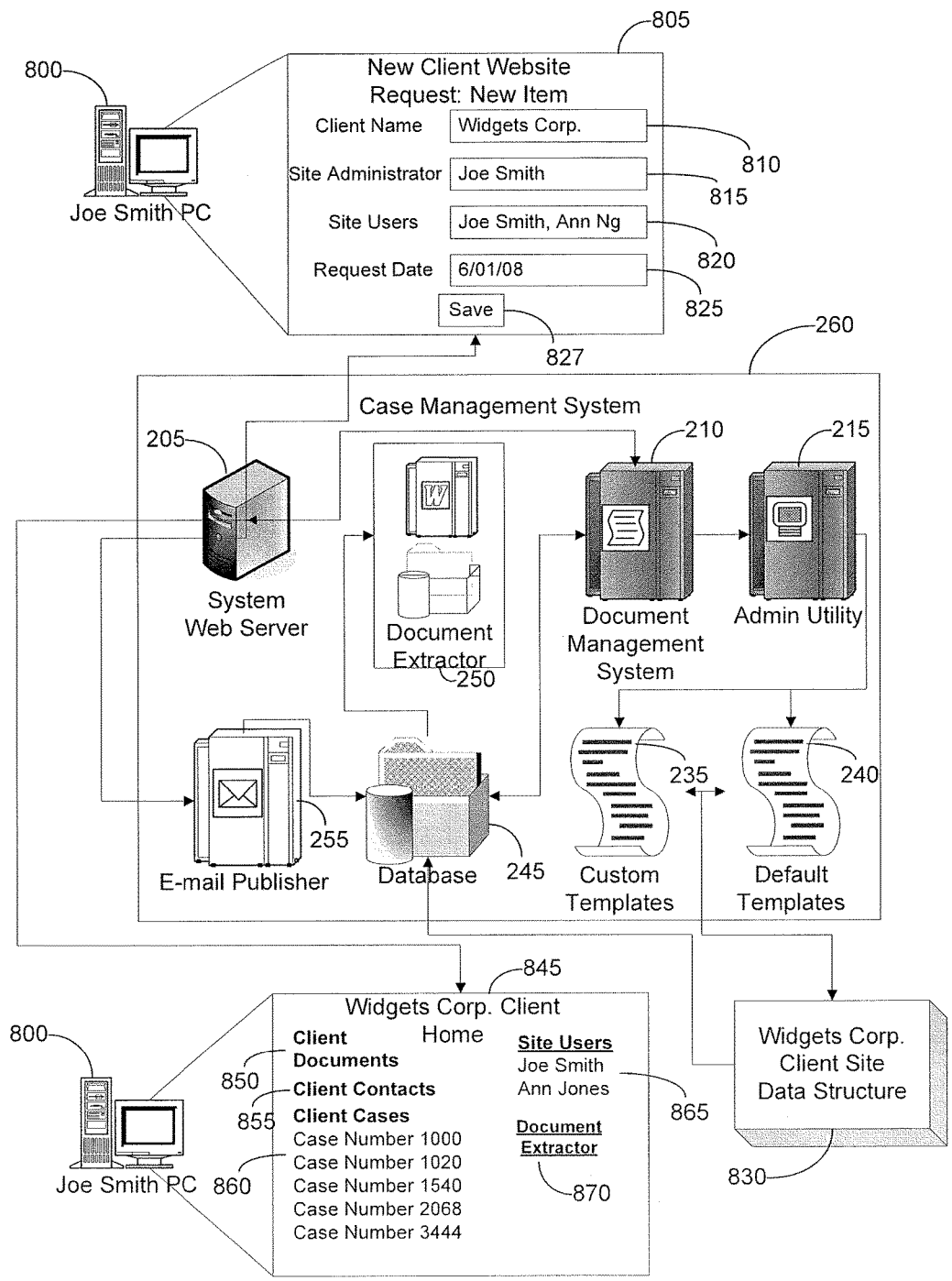
FIG. 8 is a general overview of the operation of a system contemplated by an exemplary embodiment.

Once data is entered, a user has the option to attach a file to the information via an attach file link 710, or simply save the data and close the web page 700 to initiate a new client site creation process via the save and close link 705. FIG. 8 is a general overview of the operation of a system contemplated by an exemplary embodiment. A logged on user (Joe Smith), through a personal computer 800, creates a new client site by accessing a New Client Site Request: New Item Page 805 (See FIG. 7). As previously discussed, the user interface 200 (See FIG. 2) is presented by the system web server 205. After a user (Joe Smith) enters necessary information into the user interface 200, a user saves information via a save push button 827 to initiate creation of a client site. For the case management system 260 to create a new client site, the web server 205 takes the information gathered by the New Client Site Request: New Item Page 805 and sends the information to the document management system 210. Next, the document management system 210 prompts the administration utility 215 to create a new client data structure 830 using the custom 235 and default templates 240. Once the administration utility 215, and templates 235, and 240, create a new client data structure 830, the system 260 stores the new client data structure 830 into its database 245. A user (Joe Smith) 800 accesses the new client data structure 830 through the user interface 845 to create and manage content. Some capabilities offered by the system 260 for a client site include storing client documents 850, and client contacts 855. The new client site 845 also lists cases 860 and a group of site users 865 for a client. Finally, the user interface 845 allows a user to extract documents 870 from the case management system 260.

Figure 9:
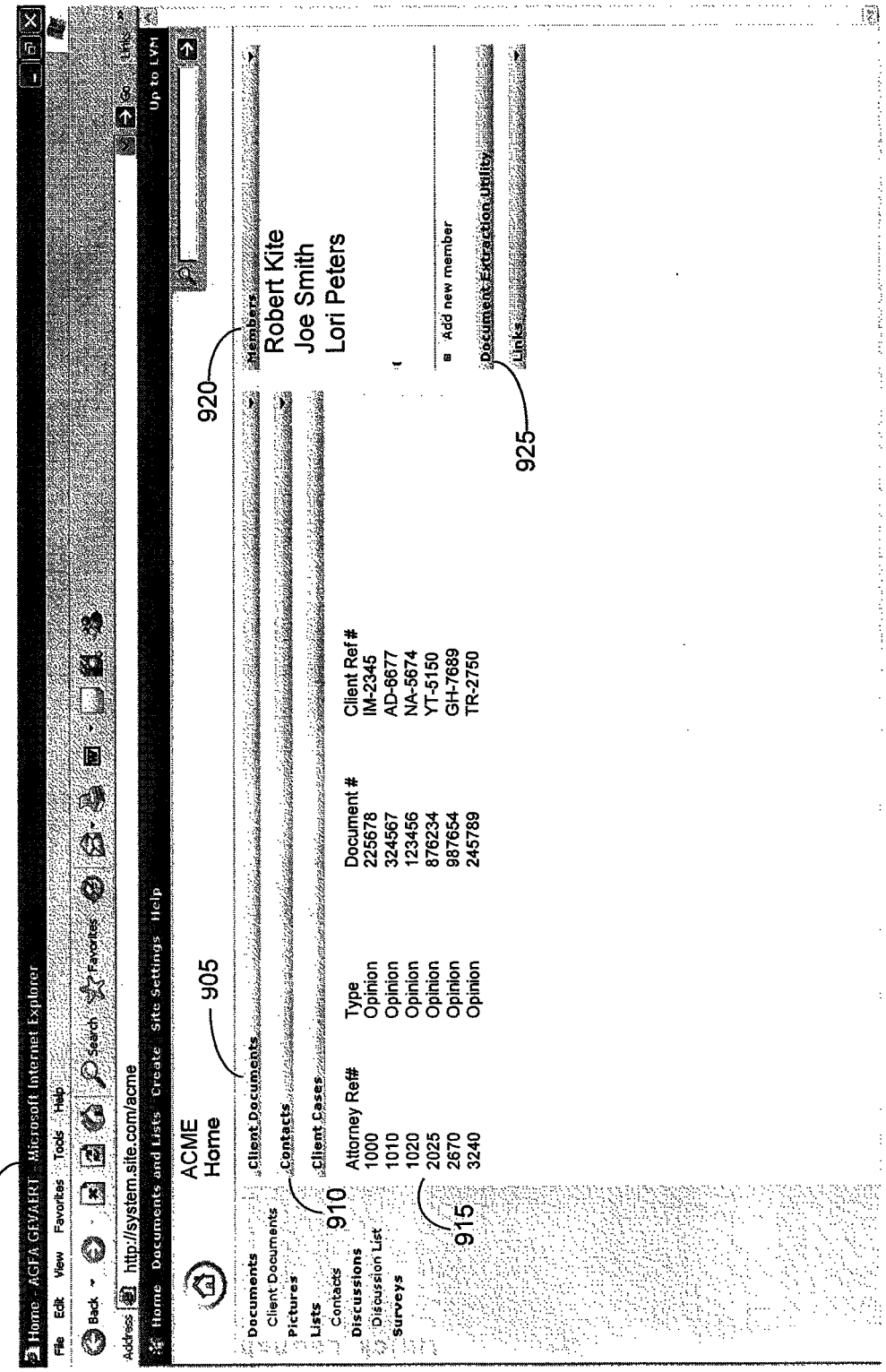
FIG. 9 is a diagram of an exemplary user interface incorporated into an exemplary embodiment.

An example of a user interface to a new client site is displayed in FIG. 9. FIG. 9 is a diagram of an exemplary user interface of a Client Site Home Page 900. Similar to the general overview diagram presented in FIG. 8, the user interface 200 (See FIG. 2) provides access to client documents 905, client contacts 910, and client case information 915. The Client Site Home Page 900 also lists a group of site users 920 and provides a link to the document extractor 925 for a user to access client content from the case management system 260 (See FIG. 2).

Figure 10:
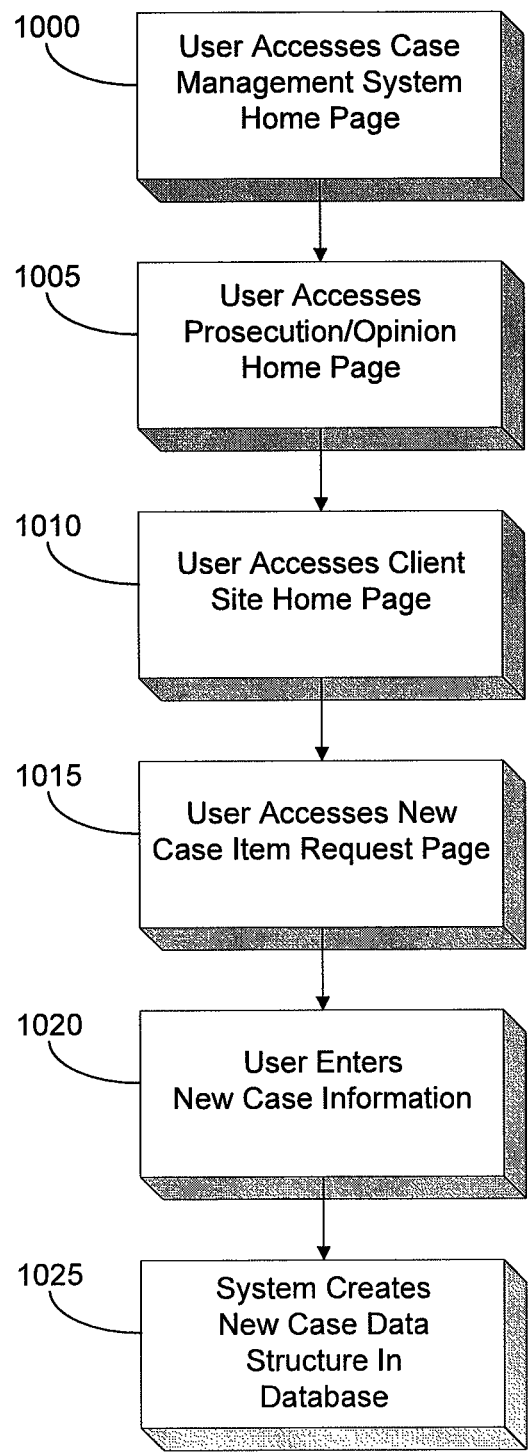
FIG. 10 is a flow diagram illustrating the steps in creating a case site, in accordance with an exemplary embodiment.

FIG. 10 is a flow diagram illustrating the steps in creating a case site, in accordance with an exemplary embodiment. Case sites contain data for particular cases for a client and are accessible from client sites. Thus, some functional components for creating a site are similar to some functional components for creating a client site. To create a case site, a user progresses through a number of steps and accesses a series of web pages from a system user interface 200. In the exemplary embodiment, the use accesses a Case Management System Home Page during step 1000. At step 1005, the user accesses a Prosecution/Opinion Home Page 1005, and at step 1010, the user accesses a Client Site Home Page. Thereafter, at step 1015, a user accesses a New Case Item Request Page. At step 1020, a user enters new case information. At step 1025, a user submits data to the system, to initiate creating of a new case data structure in the system database 245 (See FIG. 2).

FIGS. 11-12 depict exemplary user interfaces, each incorporated into an exemplary embodiment. FIG. 11 is a screen shot of an exemplary user interface of an exemplary Client Site Home Page with an Add Case Feature 1100. A user creates a case site then adds case content to that site into the case management system 260 (See FIG. 2). To add a case site, a user chooses a case type by selecting one of "Prosecution", "Opinion", "Litigation", or some other selection from a drop down menu in the middle of the page 1105. Thereafter, a user selects an Add Case link 1110 to access a New Case Site Request Page 1200 displayed in FIG. 12. FIG. 12 is a screen shot of an exemplary user interface of a New Case Site Request Page 1200. A user enters information to create a case site that includes a case category 1205, firm and client reference numbers 1210, and a description of a case 1215. Once a user enters information, a user selects an "Add Opinion" push button 1220 to initiate the creation process of a case site. If, however, a user wants to discontinue a case site creation process, a user simply selects a "Cancel" push button 1225.

FIG. 13 is a general overview of the operation of a system contemplated by an exemplary embodiment. A logged on user (Joe Smith), through a personal computer 800, creates a new case site by accessing a New Case Site Request Page 1300 (See FIG. 11). As previously discussed, user interfaces 1300 are presented by a system web server 205. After a user (Joe Smith) 800 enters information into the user interface 1300, the user 800 saves information by pressing a save push button 1327 to initiate creation of a case site. Next, the case management system 260 creates a new case site by having the web server 205 take information gathered by a New Case Site Request user interface 1300 and send the information to the document management system 210. Next, the document management system 210 prompts the administration utility 215 to create a new case site data structure 1325 using the custom 235 and default 240 templates. Once the administration utility 215, and custom 235 and default 240 templates create a new case site data structure 1325, the system 260 stores the case site data structure 1325 into a database 245. A user (Joe Smith) 800 then accesses a new case data structure 1325 through a user interface 1330 to create and manage the new case site data structure's content. Some capabilities offered by the system 260 include storing and managing, in a case of the following: official papers 1340, correspondence 1345, internal notes 1350, and client contacts 1355. A case site also lists a group of site users 1360 for a client. Finally, a user interface 1330 allows a user to extract documents 1365 from a case management system 260. An example of a user interface to a new case site is displayed in FIG. 14. FIG. 14 is a screen shot of an exemplary user interface of a Case Site Home Page 1400. Similar to the user interface 1300 presented in FIG. 13, the user interface presented, by way of example, in FIG. 14 provides access to the following: client official papers 1405, correspondence 1410, internal notes 1415, and client contacts 1420. The Case Site Home Page 1400 also lists a group of site users 1425 and provides a user a link to the document extractor 1430 to access case content from the case management system 260 (See FIG. 2). The copy reference utility can be accessed by selecting a link 1427. The copy reference utility allows a user to copy content from one content data structure in the system database 245 (See FIG. 2) to another.

FIG. 15 is a flow diagram illustrating steps in creating a litigation site, in accordance with an exemplary embodiment. Litigation sites contain data for particular litigation matters for a client. In order to create a litigation site, a user progresses through a series of steps that include accessing the Case Management System Home Page 400 during step 1500 (See FIG. 4). At step 1505, a user accesses a Litigation Home Page, and then at step 1510, accesses a New Litigation Request Page. Thereafter at step 1515, a user enters new litigation information. After submitting new litigation data, a content management system creates a new litigation data structure in a database containing the information 1520.

Figure 17:
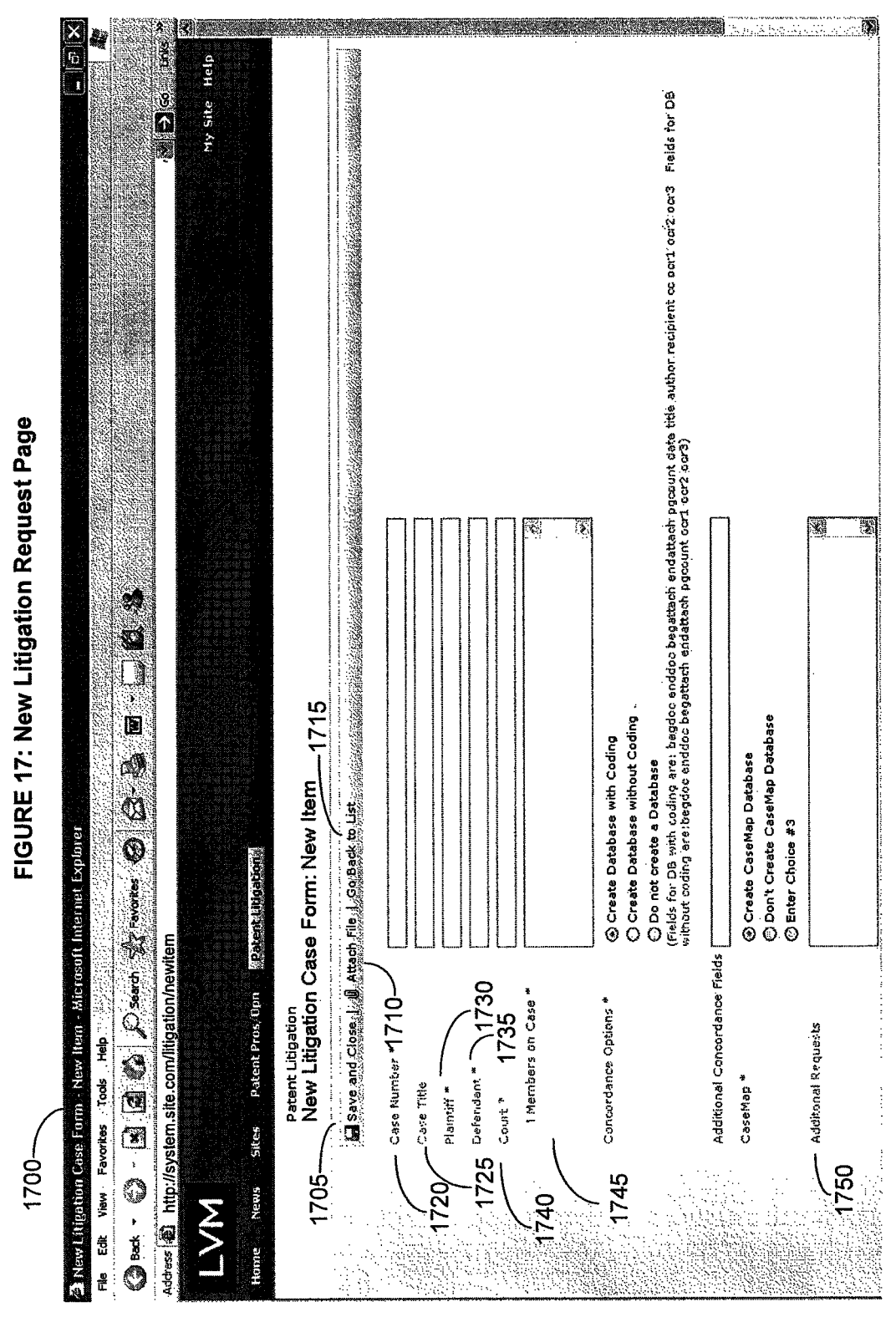

FIGS. 16-17 depict exemplary user interfaces, each incorporated into an exemplary embodiment. FIG. 16 is a screen shot of an exemplary user interface of a Litigation Home Page 1600. For a user to create a new litigation site, a user selects a New Item link 1605 in the middle of the Litigation Home Page 1600 to access a New Litigation Request Page 1700 displayed in FIG. 17. FIG. 17 is a screen shot of an exemplary user interface of a New Litigation Request Page 1700. A user enters information through a user interface to create a new litigation site. The information includes a case number 1720, a case title 1725, a plaintiff 1730, a defendant 1735, and a court 1740. A user also enters a group of site users for a litigation 1745. Finally, a user enters any additional requests 1750 for a site from a case management system 260 (See FIG. 2).

Figure 18:
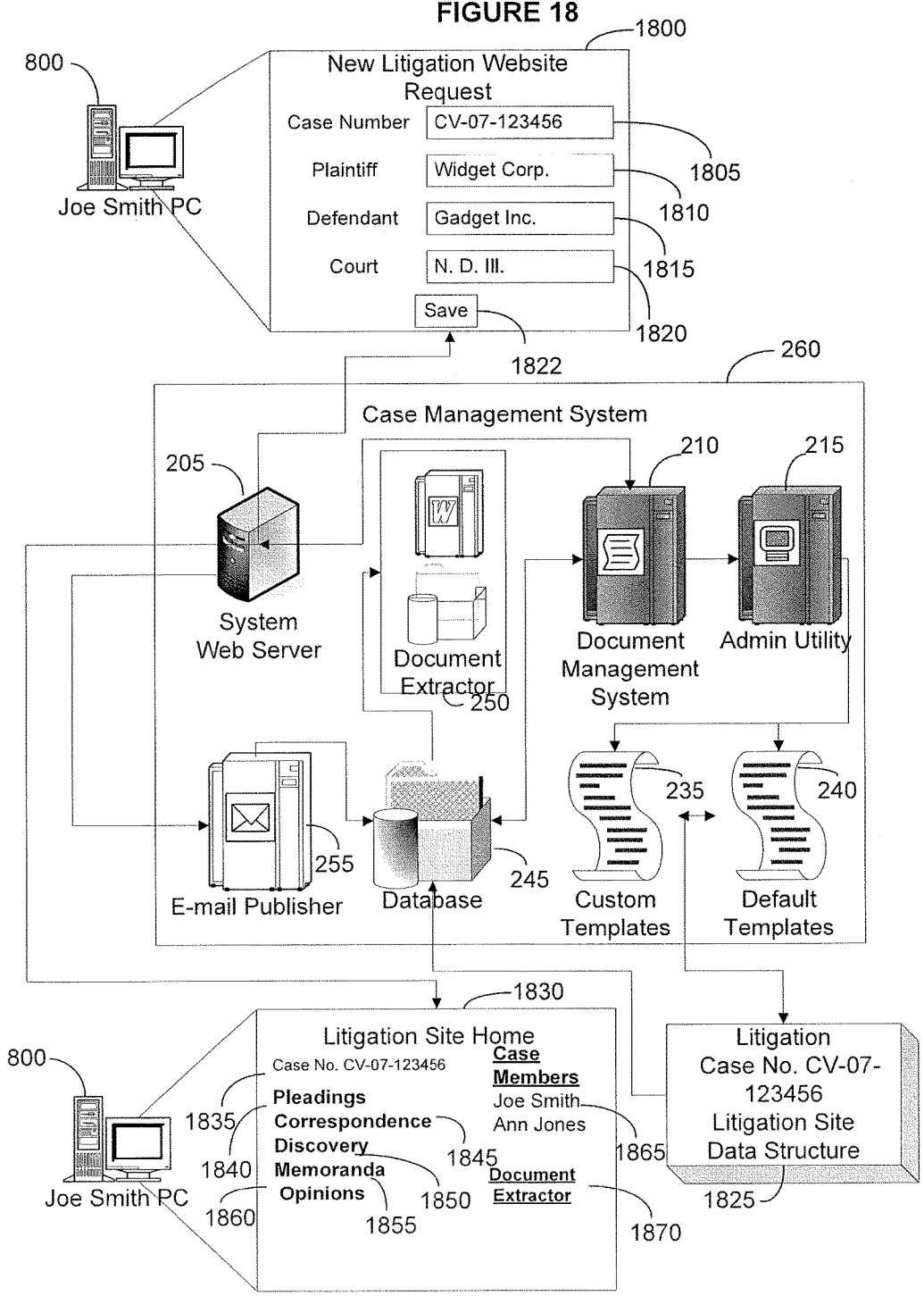
FIG. 18 is a general overview of the operation of a system contemplated by an exemplary embodiment.
Figure 19:
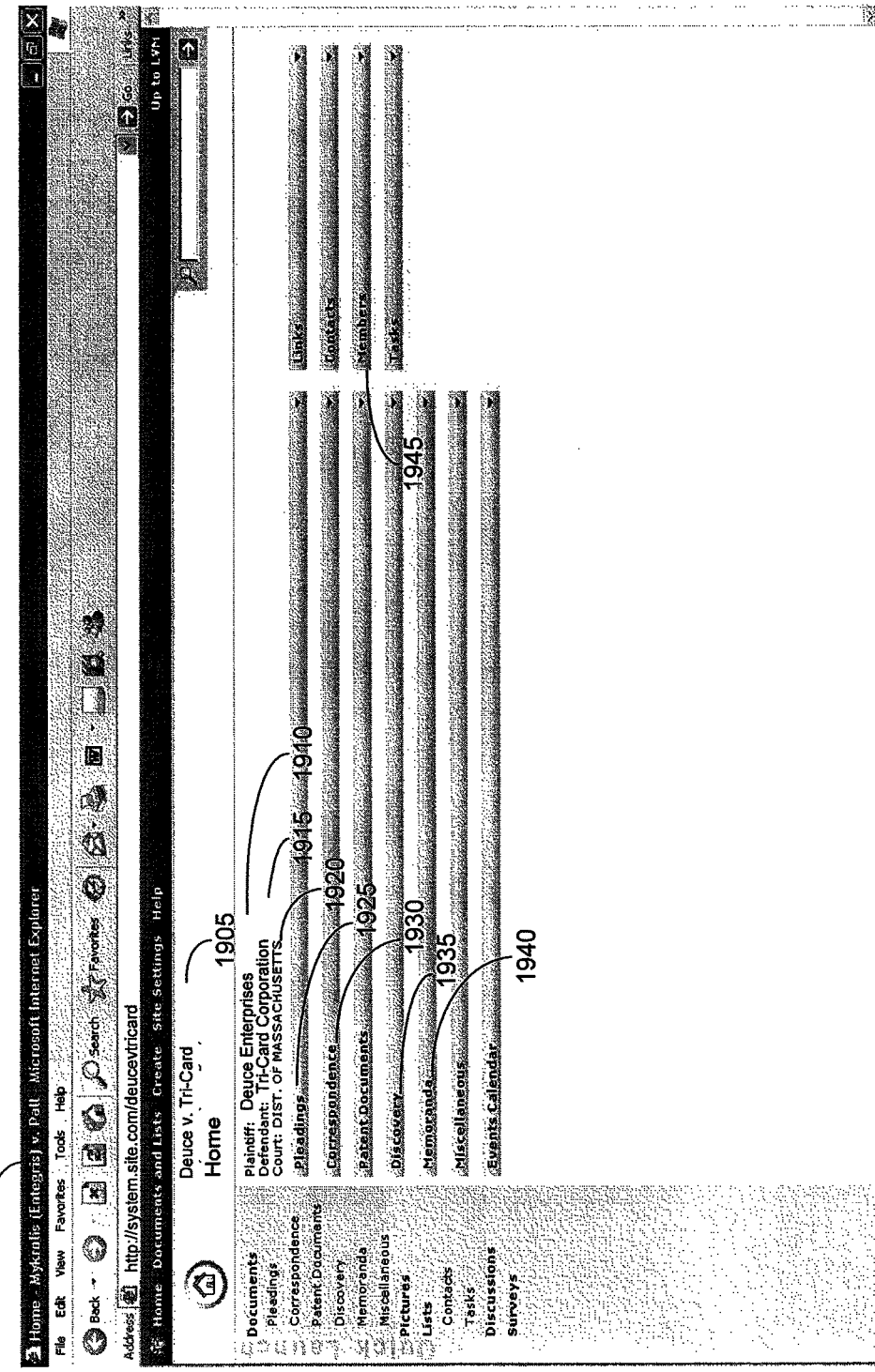
FIG. 19 is a diagram of an exemplary user interface incorporated into an exemplary embodiment.

FIG. 18 is a general overview of the operation of a system contemplated by an exemplary embodiment A logged on user (Joe Smith), through a personal computer 800, creates a new litigation site by accessing a New Litigation Site Request Page 1800 (See FIG. 17). As previously discussed, web user interfaces 1800 are presented by a system web server 205. After a user (Joe Smith) enters information into a user interface 1800, a user saves the information by pressing the save push button 1822 to initiate creation of a litigation site. Thereafter, the case management system 260 creates a new litigation site by having the web server 205 take information gathered by a "New Litigation Site Request" user interface 1800 and send it to the document management system 210. Next, the document management system 210 prompts the administration utility 215 to create a new litigation site data structure 1325 using the custom 235 and default 240 templates. Once the administration utility 215, and custom 235 and default 240 templates create a new litigation site data structure 1825, the system 260 stores the new litigation site data structure 1825 into a database 245. A user (Joe Smith) 800 accesses a new litigation data structure through a user interface to create and manage content 1830. Some capabilities offered by a system include storing and managing the following: pleadings 1840, correspondence 1845, discovery 1850, memoranda 1855, and court opinions 1860. A litigation site also lists a group of site users 1865 for a litigation. Finally, the user interface 1830 allows a user to extract documents from a case management system by selecting a link 1870. An example of a new litigation site 1900 is displayed in FIG. 19. FIG. 19 is a screen shot of an exemplary user interface of a New Litigation Site Home Page 1900. Across the top of the page 1900, a case title 1905 is displayed along with a plaintiff 1910, a defendant 1915, and a court 1920. Similar to the user interface 1830 presented in FIG. 18, a user interface provides access to pleadings 1925, correspondence 1930, discovery 1935, and memoranda 1940. A New Litigation Site Home Page 1900 also lists a group of site users 1945.

Figure 21:
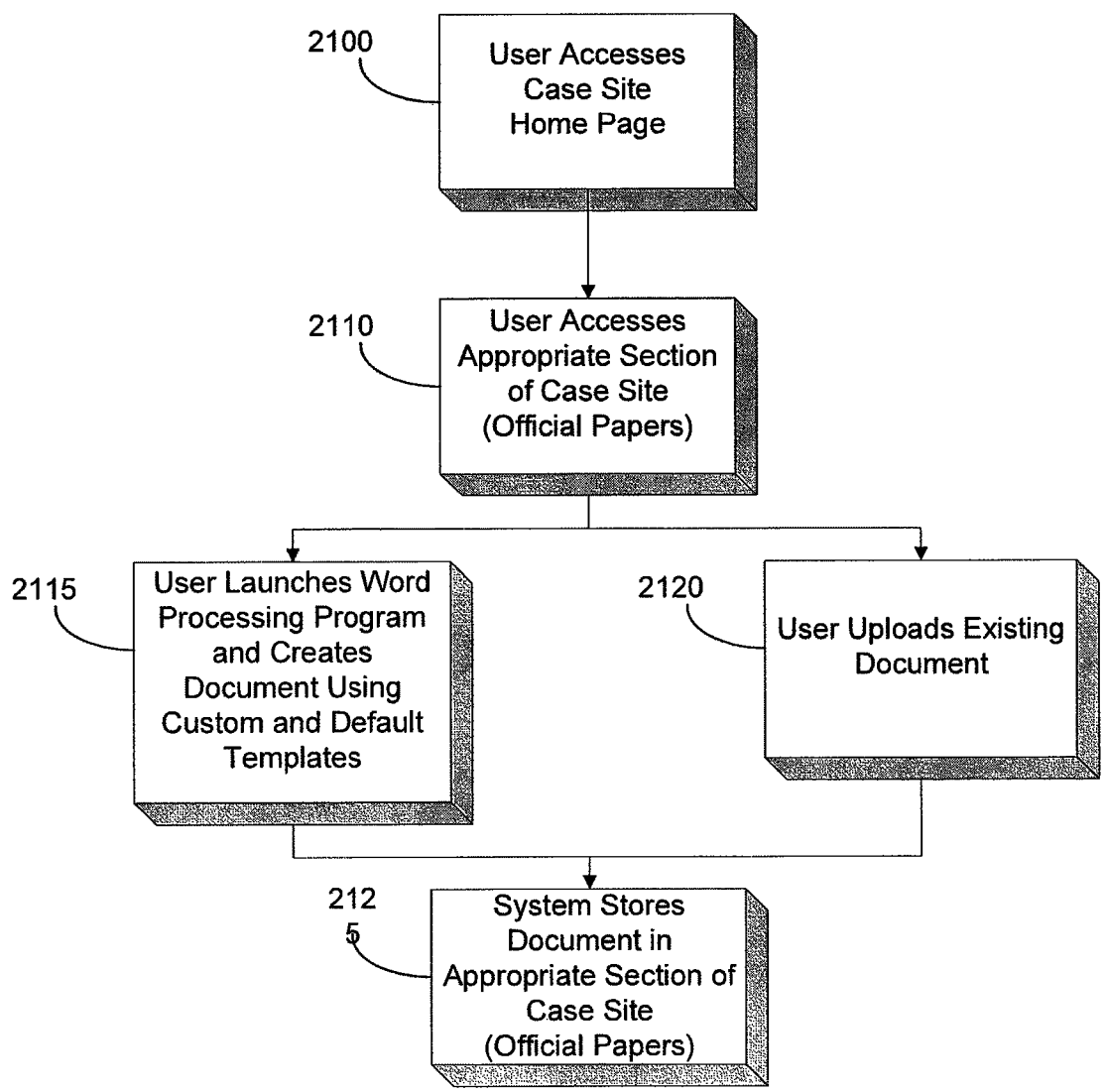
FIG. 21 is a flow diagram illustrating the steps in creating and storing content in the system, in accordance with an exemplary embodiment.

FIG. 21 is a flow diagram illustrating steps in creating and storing content in a case site, in accordance with an exemplary embodiment. A user progresses through a series of steps to create and store content in a case site. These steps include a step 2100 where a user accesses the Case Site Home Page 1400 (See FIG. 14). At step 2110, a user accesses an appropriate section of a case site that a user wants to generate or store content. At this point, a user has an option to perform one of two actions. At step 2115, a user launches a personal computer's word processing program and creates document content, or at step 2120, a user uploads an existing document using one of the software tools 2120 available within a system 260 (See FIG. 2). When launching a word processing program at step 2115, the system 245 (See FIG. 2) creates basic content with a document using the pre-existing custom 235 (See FIG. 2) and default 240 (See FIG. 2) templates for user convenience. After editing a document, at step 2125, a user stores content into a section (such as official papers) 2125 of a case site.

Figure 22:
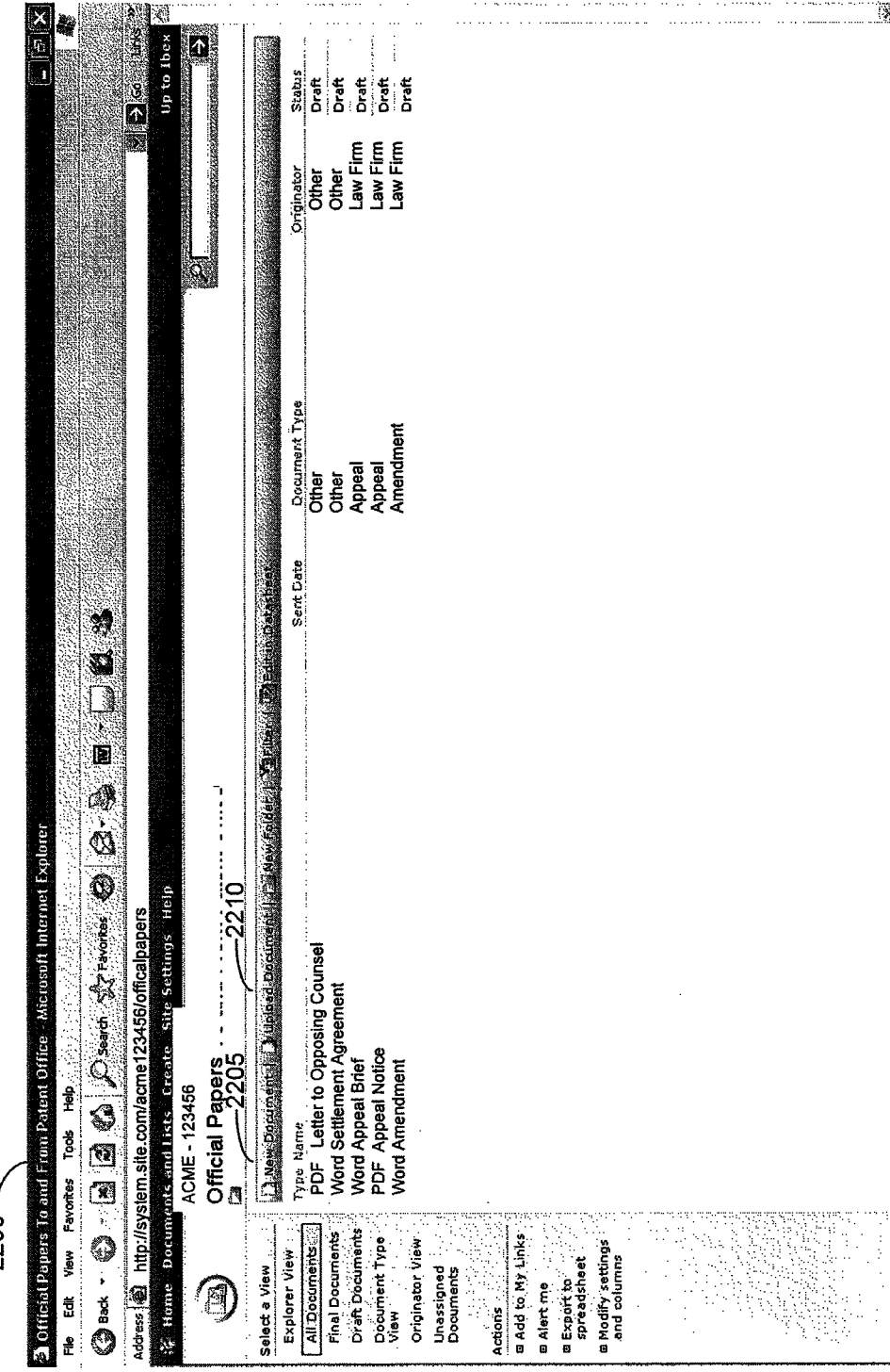
FIG. 22 is a diagram of an exemplary user interface incorporated into an exemplary embodiment
Figure 23:
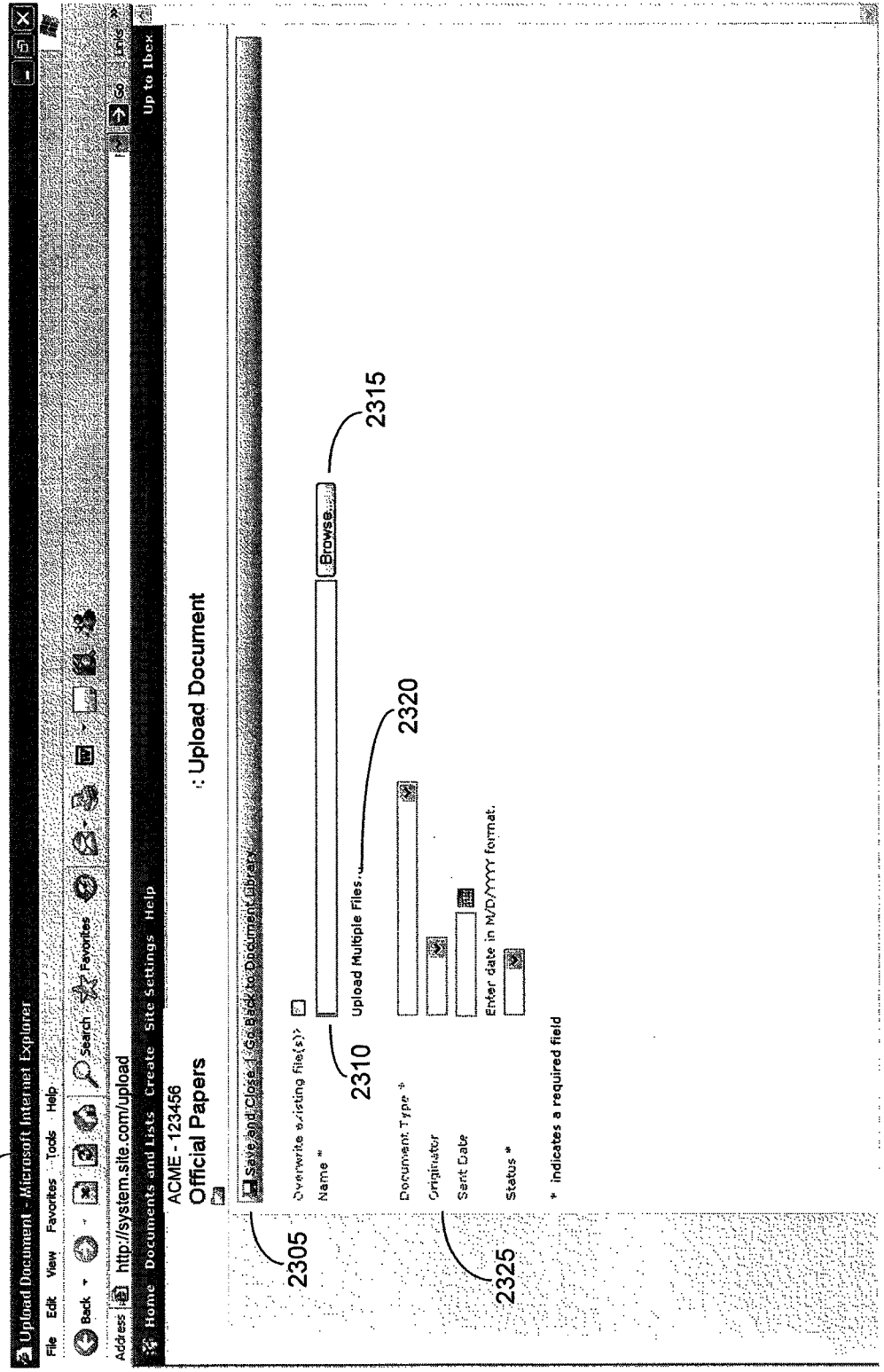
FIG. 23 is a diagram of an exemplary user interface incorporated into an exemplary embodiment.

FIGS. 22-23 depict exemplary user interfaces, each incorporated into an exemplary embodiment. FIG. 22 is a screen shot of an exemplary user interface of a Case Site Official Papers Page 2200. From the Case Site Official Papers Page 2200, a user launches a personal computer's word processing program to create and store content into a system 2205, or a user accesses an upload document software tool 2210 to store an existing document into a system 260 (See FIG. 2). When launching a word processing program by selecting the New Document link 2205, the system 245 (See FIG. 2) creates some content with a document using custom 235 or default 240 templates for user convenience. FIG. 23 is a screen shot of an exemplary user interface of an Upload Document Page 2300. At an Upload Document Page 2300, a user uploads a document by entering a name 2310 or browsing through storage media 2315 (e.g. hard drive, flash drive, DVD, or CD). A user also has the ability to upload multiple files by selecting a link 2320. Finally, a user enters other identifiers for an uploaded document 2325. Once a user selects a document to upload, a user selects a save and close link 2305 to store documents into the system 260.

Figure 24:
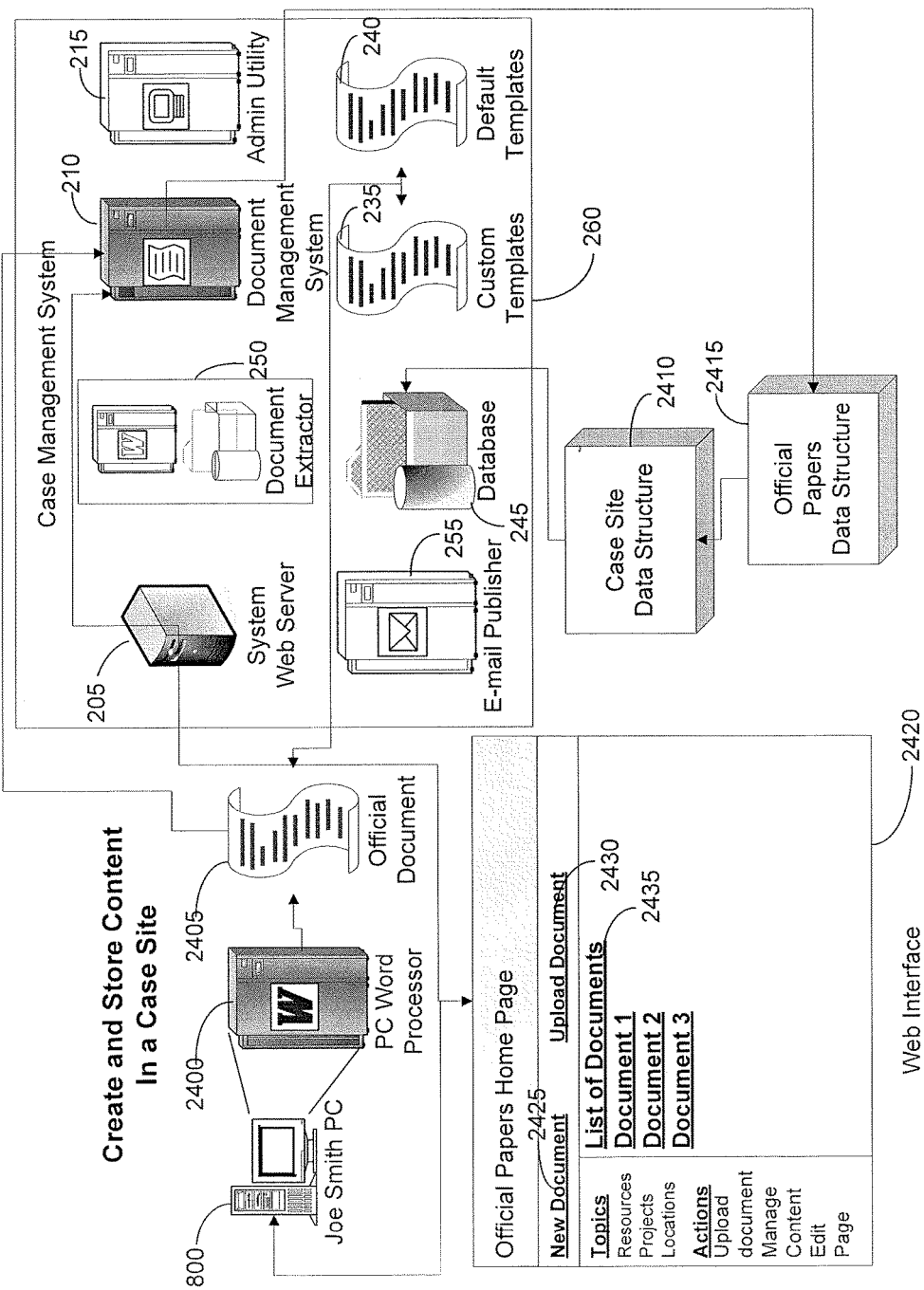
FIG. 24 is a general overview of the operation of a system contemplated by an exemplary embodiment.

FIG. 24 is a general overview of the operation of a system contemplated by an exemplary embodiment. In this embodiment, a user (Joe Smith) 800 accesses an Official Papers Home Page 2420 of a case site to create and store a new document. A user (Joe Smith) selects a New Document link 2425 to launch a personal computer's word processor 2400. When launching a word processing program by selecting the New Document link 2425, the system 245 creates some content with a document using custom 235 or default 240 templates for user convenience. Then a user creates an official document 2405. Next, a user saves a document into the system 260. The document management system 210 stores content within an Official Papers data structure 2415 underneath a Case Site data structure 2410 into the system database 245. When a user next accesses the Official Papers Home Page 2420, the official document is listed underneath "List of Documents" 2435.

Figure 25:
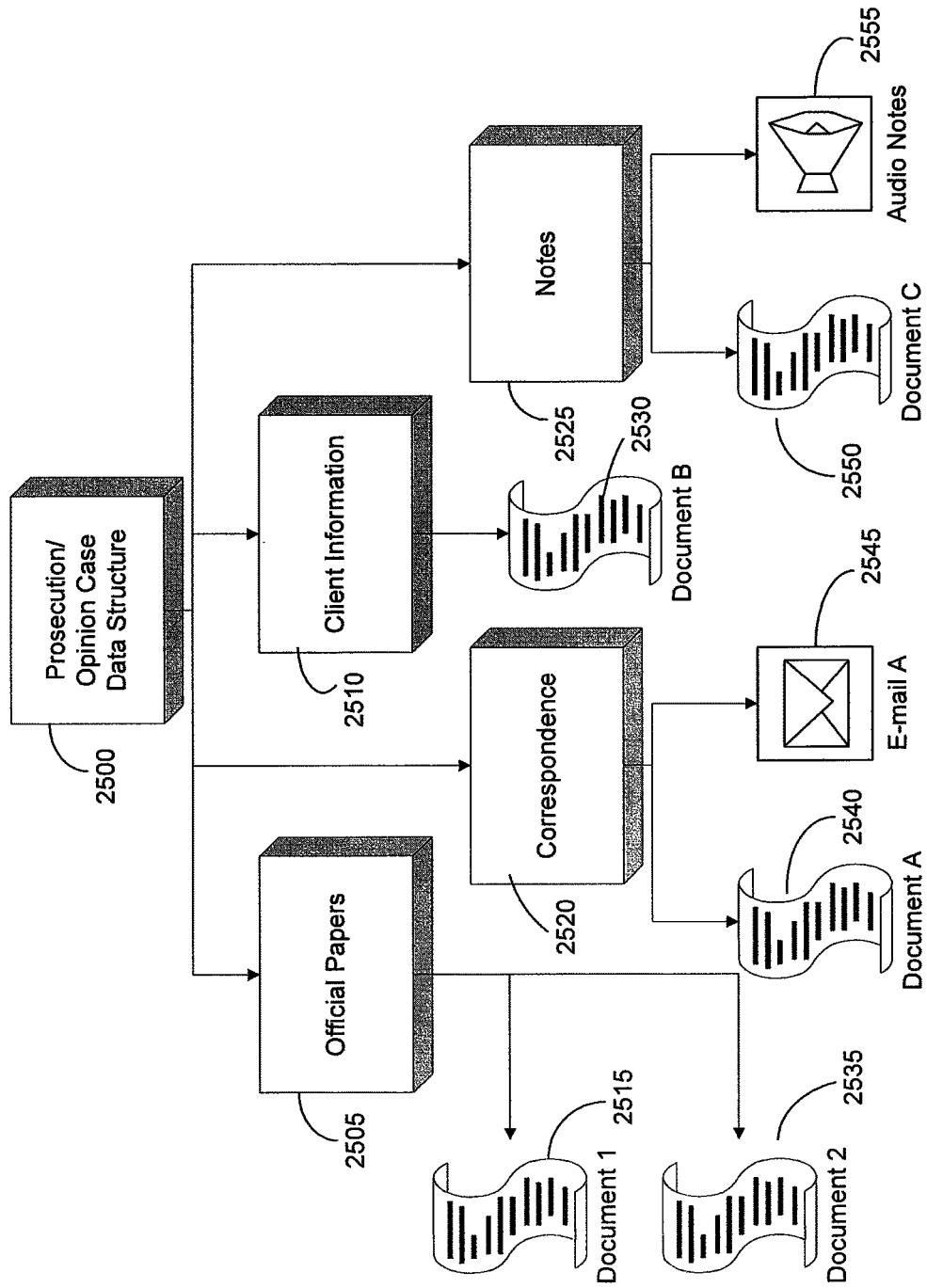
FIG. 25 is a functional block diagram illustrating the data structure of the database within the case management system, in accordance with an exemplary embodiment.

FIG. 25 is a functional block diagram illustrating data structure of the database within the case management system 260 (See FIG. 2), in accordance with an exemplary embodiment. The part of the system database 245 (See FIG. 2) underneath a Prosecution/Opinion Case data structure 2500 contains several data structures that include official papers 2505, client information 2510, correspondence 2520, and notes 2525. Each of these data structures can contain content. Content is not only text documents 2515, 2530, 2535, 2540, and 2550 but also other media such as e-mails 2545 and audio files 2555.

Figure 26:
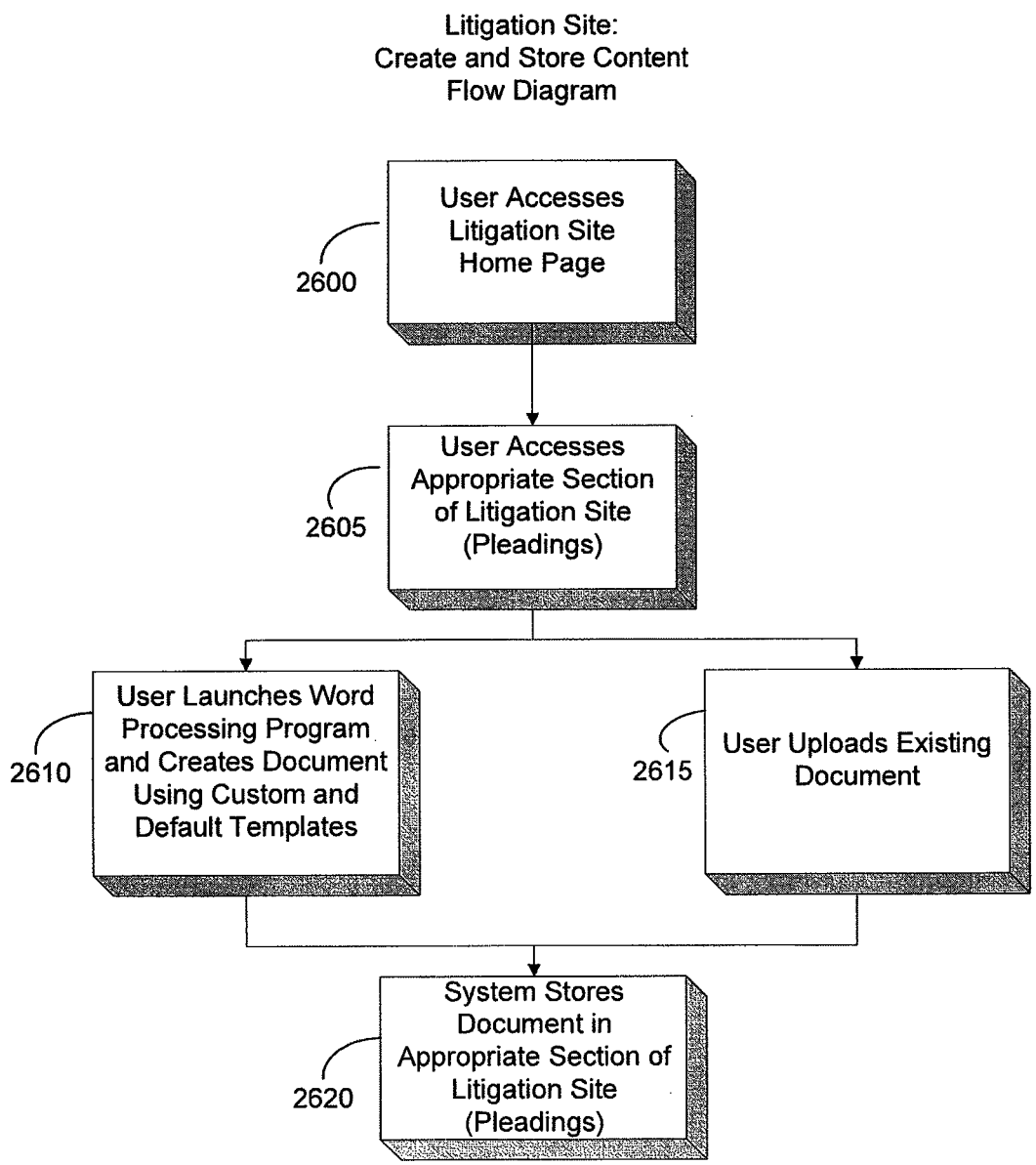
FIG. 26 is a flow diagram illustrating the steps in creating and storing content in the system, in accordance with an exemplary embodiment.

FIG. 26 is a flow diagram illustrating steps in creating and storing content within a litigation site, in accordance with an exemplary embodiment. FIG. 26 displays a series of progressive steps, the first step 2600 having a user access a Litigation Home Page (See FIG. 16). At step 2605, a user accesses a section of a litigation site where a user wants to generate or store content. At this point, a user has the option to perform one of two actions. Either at step 2610, a user launches a personal computer's word processing program and creates document content, or at step 2615, a user uploads an existing document using one of the software tools contained within the system 260 (See FIG. 2). When launching a word processing program at step 2610, the system 245 (See FIG. 2) creates some content with a document using custom 235 (See FIG. 2) or default 240 (See FIG. 2) templates for user convenience. At step 2620, a user stores content into a litigation site section (such as pleadings section).

Figure 27:
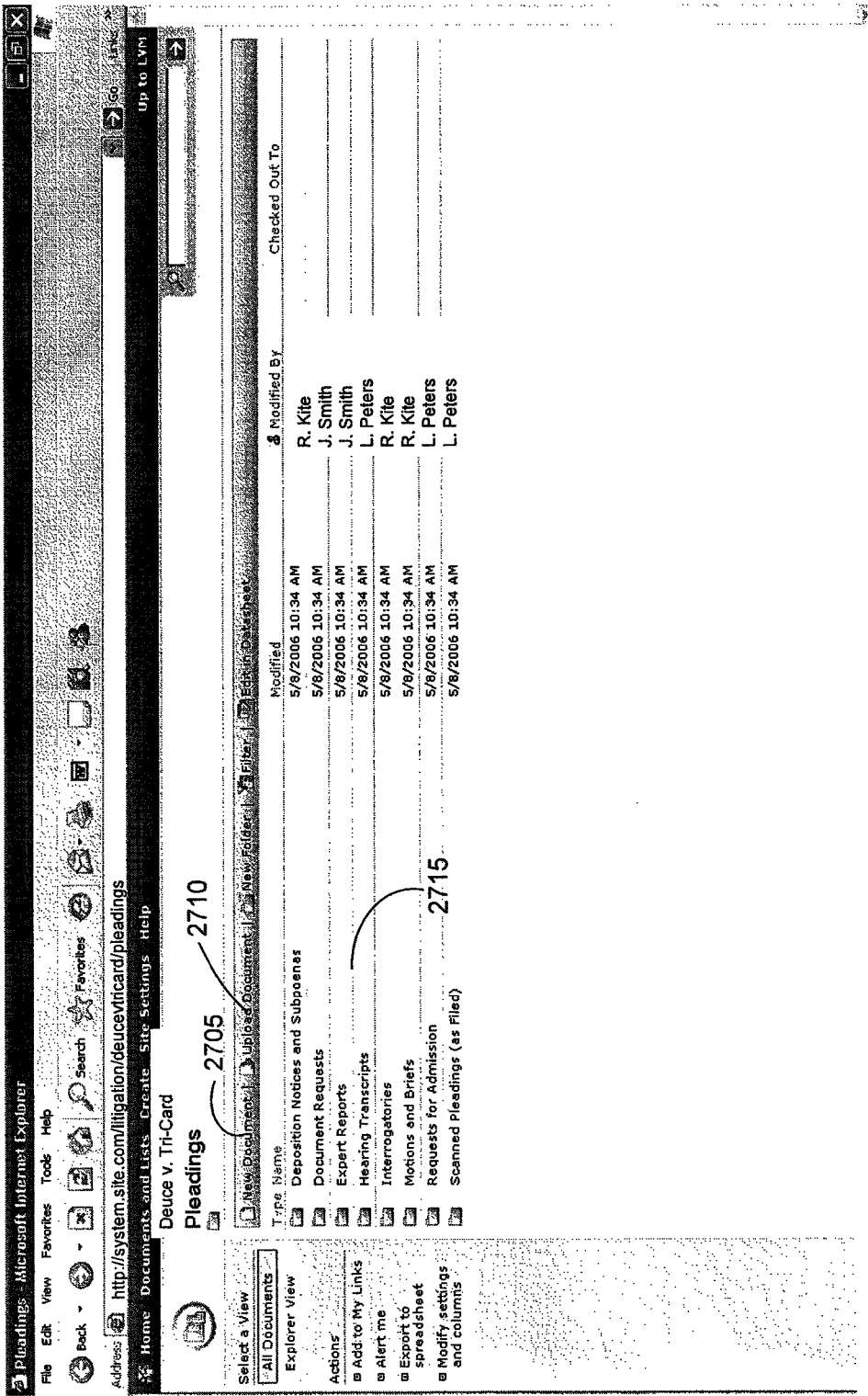
FIG. 27 is a diagram of an exemplary user interface incorporated into an exemplary embodiment.
Figure 28:
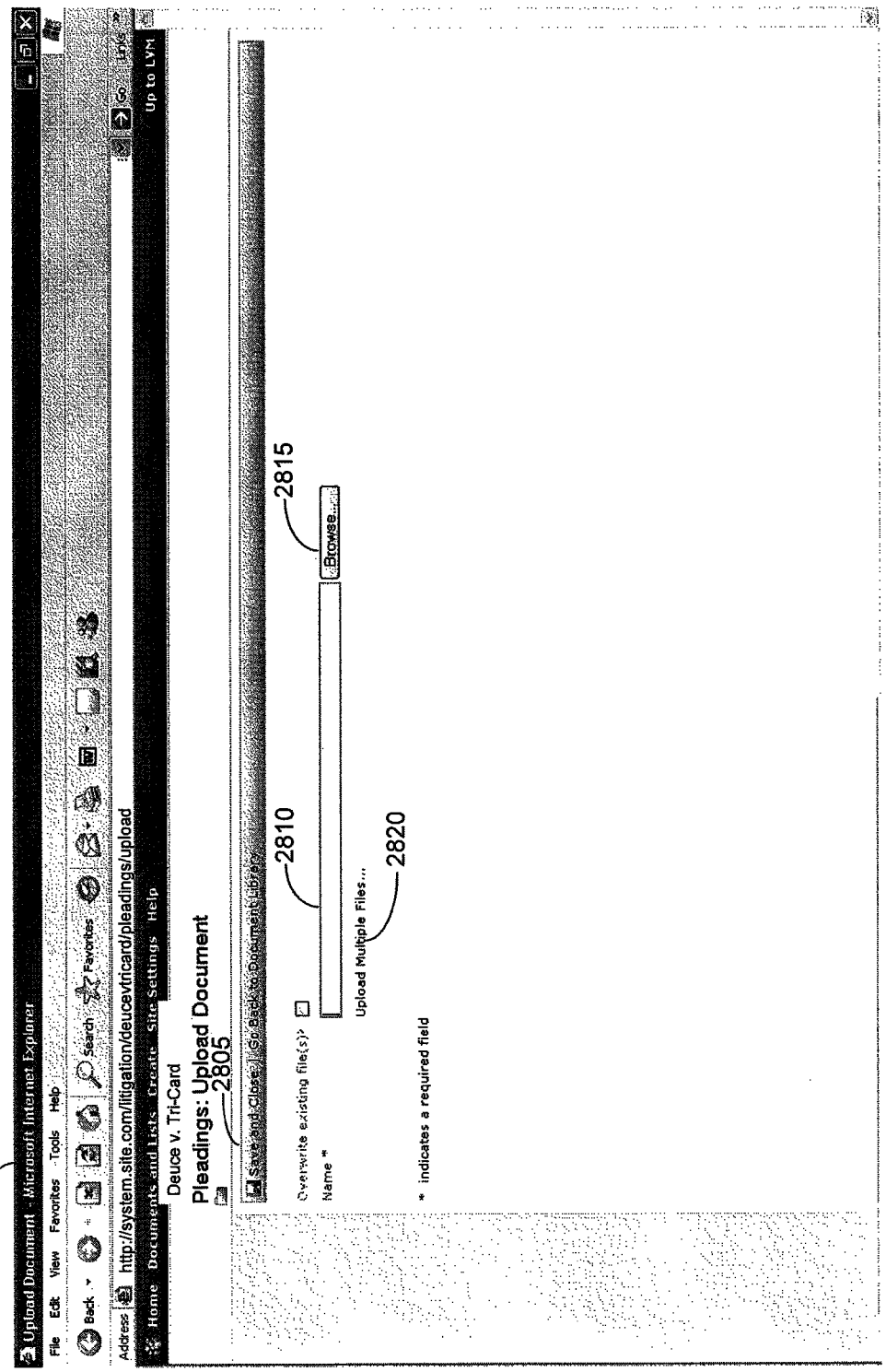
FIG. 28 is a diagram of an exemplary user interface incorporated into an exemplary embodiment.

FIG. 27-28 depict exemplary user interfaces, each incorporated into an exemplary embodiment FIG. 27 is a screen shot of an exemplary user interface of a Litigation Site Pleadings Page 2700. From Litigation Site Pleadings Page 2700, a user either launches a word processing program to create and store content 2705 into the system 260 (See FIG. 2), or accesses an "upload document" software tool 2710 to store an existing document into the system 260. When launching a word processing program by selecting the New Document link 2705, the system 245 (See FIG. 2) creates some content with a document using custom 235 (See FIG. 2) or default 240 (See FIG. 2) templates for user convenience. FIG. 28 is a screen shot of an exemplary user interface of an Upload Document Page 2800. At the Upload Document Page 2800, a user uploads a document by entering a document name 2810, or by browsing through a storage media 2815. In addition, a user has the ability to upload multiple files by selecting a link 2820. Finally, once a user selects documents to upload, a user selects a save and close link 2085 to store documents into the system 260.

Figure 29:
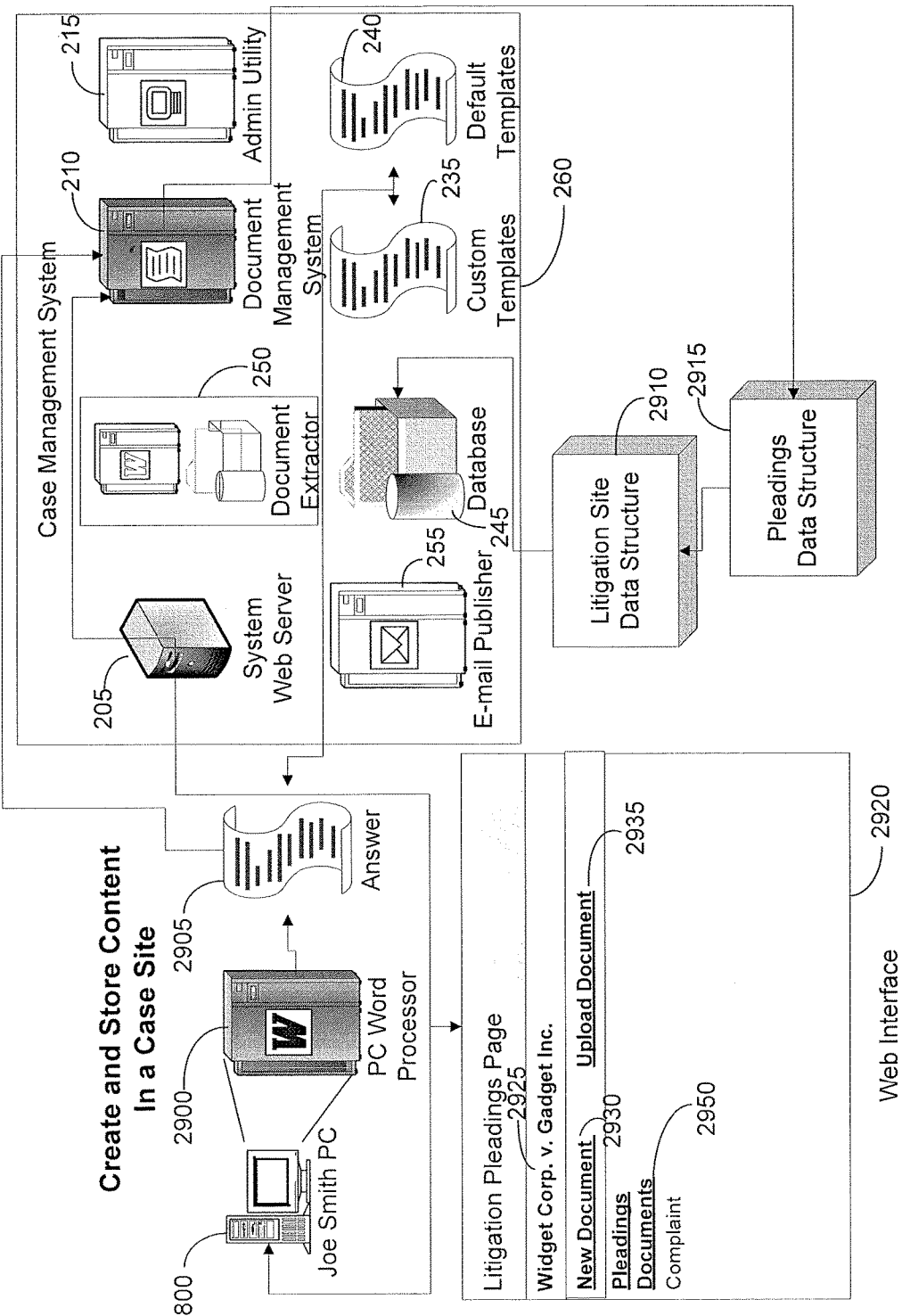
FIG. 29 is a general overview of the operation of system contemplated by an exemplary embodiment.

FIG. 29 is a general overview of the operation of a system contemplated by an exemplary embodiment. A logged on user (Joe Smith) 800 accesses a Litigation Pleadings Page 2920 of a litigation site to create and store a new document. The user (Joe Smith) selects a New Document link 2930 to launch a personal computer's word processor 2900. The user creates a document such as an answer to a complaint 2905. When launching a word processing program by selecting the New Document link 2930, the system 245 creates content with a document potentially using a custom 235 or default 240 template for user convenience. After editing the document, the user saves the document 2905 into the system 260. Thereafter, the document management system 210 stores the saved content within a Pleadings data structure 2915, underneath a Litigation Site data structure 2910 within the system database 245. Subsequently, when a user (Joe Smith) accesses the Litigation Pleadings Page 2920, the answer to the complaint 2905 is listed underneath "Pleadings Documents" 2950.

Figure 30:
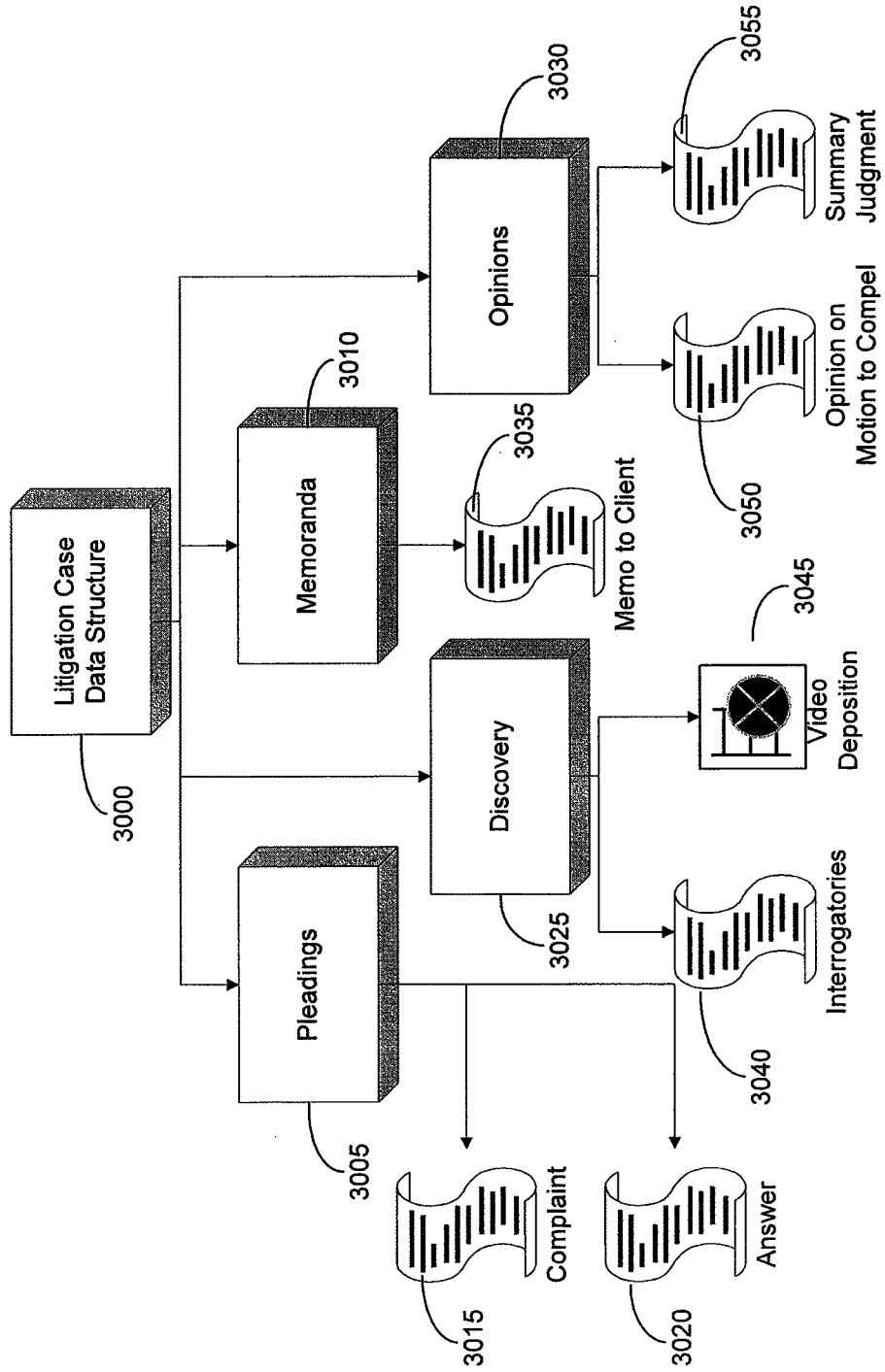
FIG. 30 is a functional block diagram illustrating the data structure of the database within the case management system, in accordance with an exemplary embodiment.

FIG. 30 is a functional block diagram illustrating data structure of the database 245 (See FIG. 2) within the case management system 260 (See FIG. 2), in accordance with an exemplary embodiment. The system database 245 underneath a Litigation data structure 3000 contains several data structures that include pleadings 3005, discovery 3025, memoranda 3010, and opinions 3030. Each data structure contains content that is not only documents 3015, 3020, 3040, 3050, and 3055 but also other media such as video 3045 or photographs.

Figure 31:
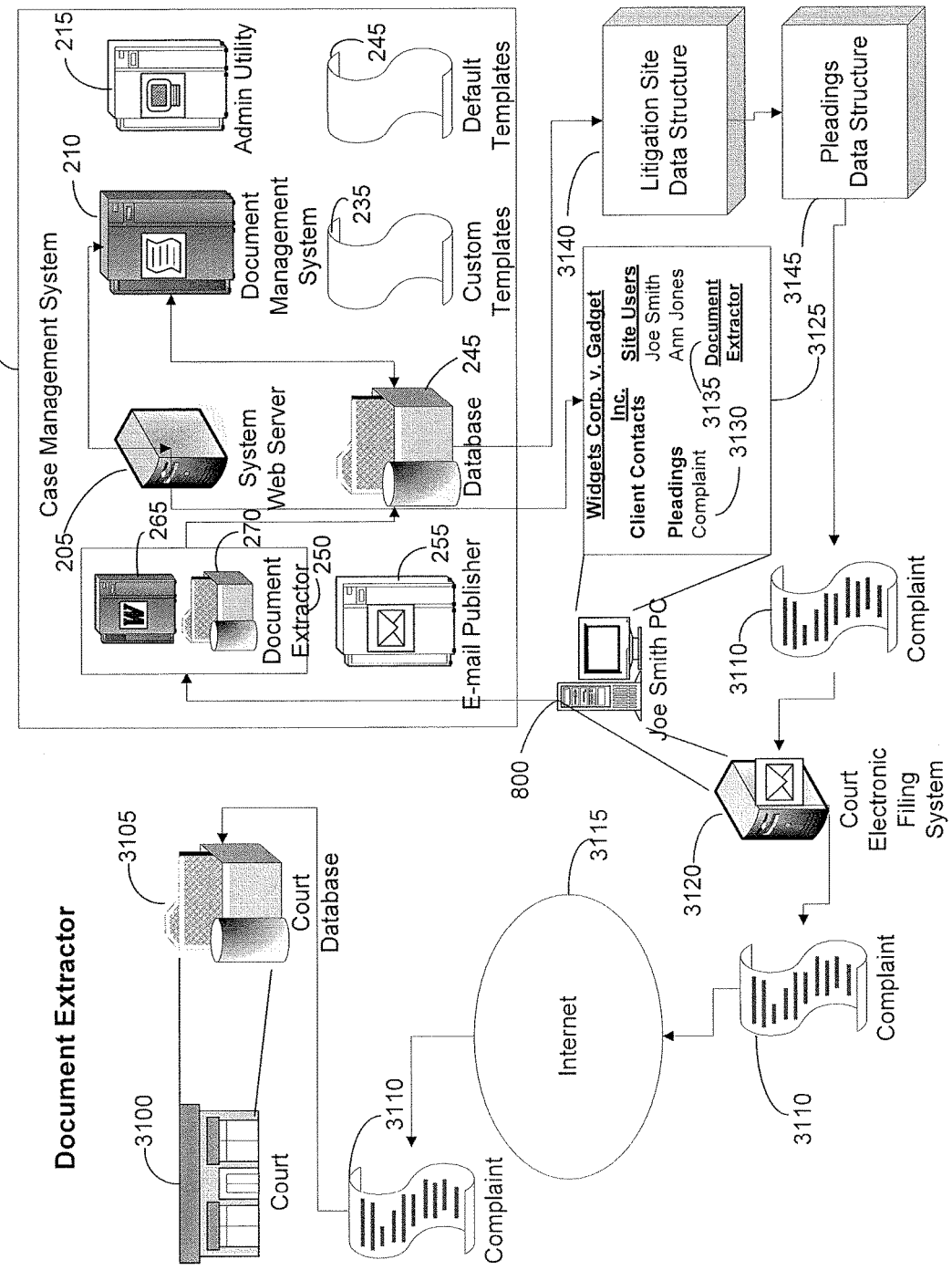
FIG. 31 is a general overview of the operation of a system contemplated by an exemplary embodiment.

FIG. 31 is a general overview of the operation of a system contemplated by an exemplary embodiment. This diagram illustrates a use of the document extractor 250 in an exemplary embodiment. A logged on user (Joe Smith) 800 extracts a Complaint document 3110 from the case management system 260 to electronically file the Complaint 3110 to a court 3100. The user 800 performs an extraction by accessing a Litigation site 3125 and selecting a Document Extractor link. 3135. Selecting the Document Extractor link 3135 initiates the document extractor utility 250 of the case management system 260. A software tool 265 extracts a document from the system database 245 and copies the Complaint document 3110 from a Pleadings data structure 3145 to the flat file database 270. The document extractor 250 allows the user (Joe Smith) 800 to save the Complaint 3110 on the personal computer 800. Subsequently, the user (Joe Smith) 800 accesses a court electronic filing system program 3120, sends an extracted Complaint 3110 to court 3100 through the Internet 3115, and stores the Complaint 3110 into a court's database 3105. The document extractor 250 also allows a user to browse and then extract documents from the system 260 to electronically file into a court database 3105.

Figure 32:
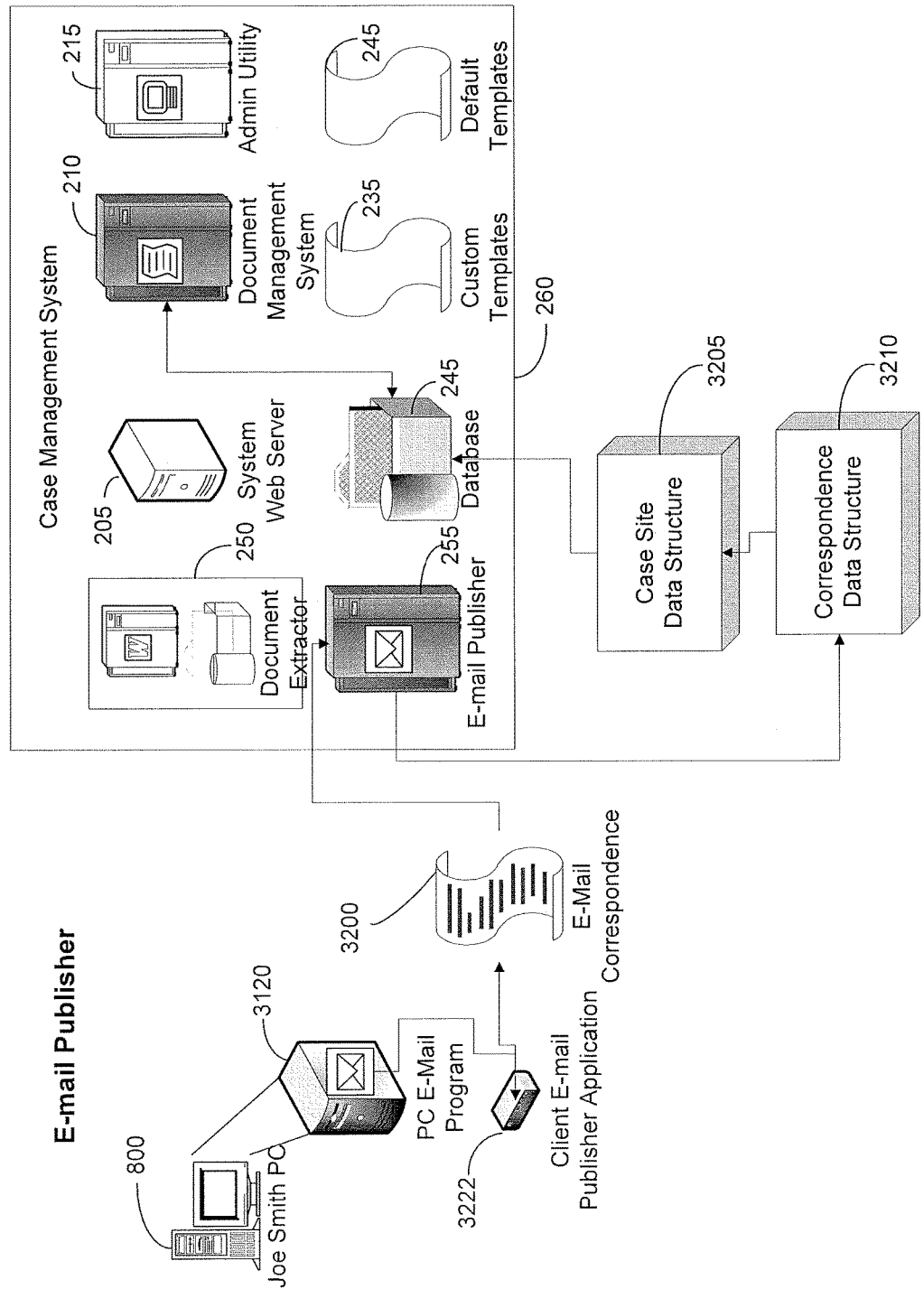
FIG. 32 is a general overview of the operation of a system contemplated by an exemplary embodiment.

FIG. 32 is a general overview of the operation of a system contemplated by an exemplary embodiment. This diagram illustrates a use of the e-mail publisher 255 utility of the case management system 260. A user (Joe Smith) 800 initiates a personal computer's e-mail program 3120. The user (Joe Smith) 800 then accesses the client e-mail publisher application program 3222 to send certain e-mail correspondence 3200 from a personal computer to the system's e-mail publisher 255. The e-mail publisher 255 stores e-mail correspondence 3200 in a Correspondence data structure 3210 in the database 245, contained within a Case Site data structure 3205 in the system database 245.

Figure 33:
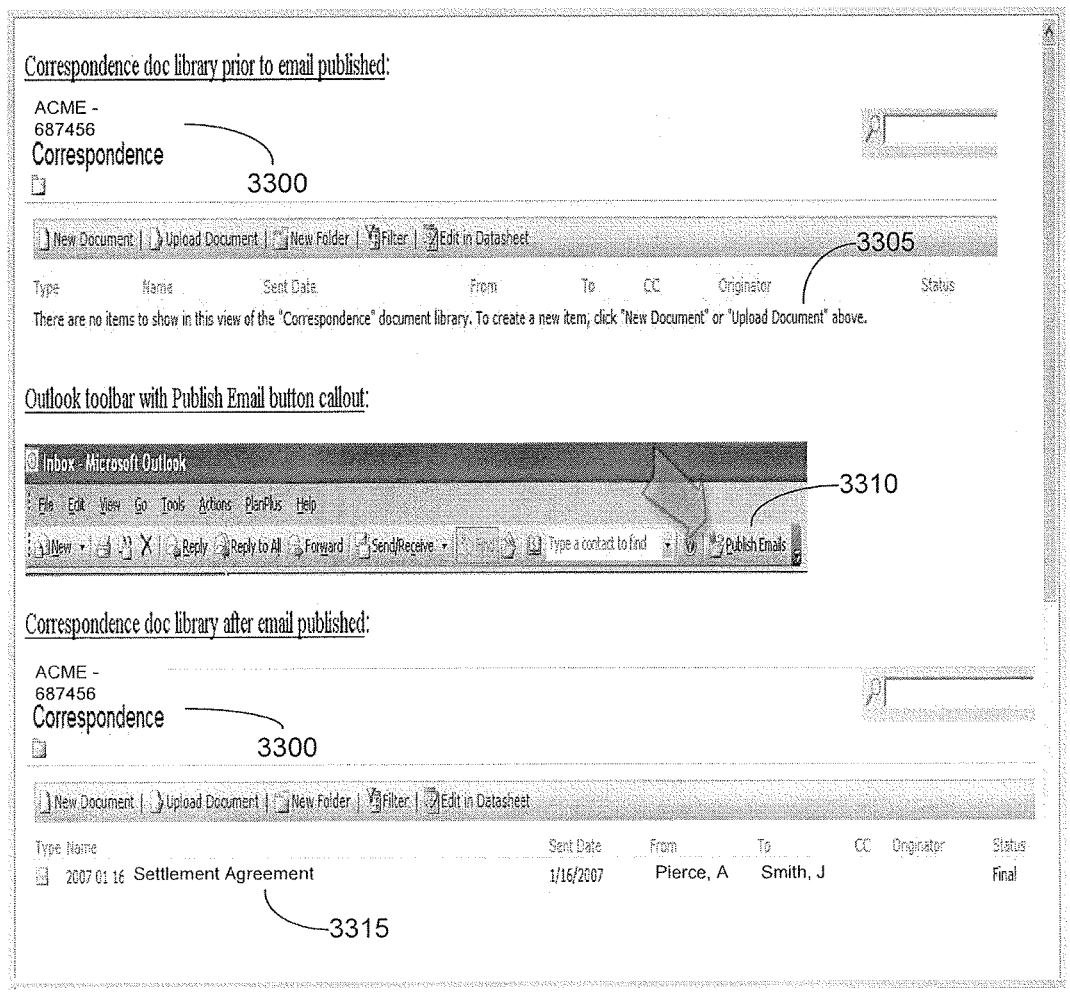
FIG. 33 is a diagram of exemplary user interfaces incorporated into an exemplary embodiment.

FIG. 33 depicts exemplary user interfaces, each incorporated into exemplary embodiments. A Correspondence Page 3300 of a case site contains no documents 3305. A user with a personal computer's e-mail program accesses the client e-mail publisher application 3222 selecting the "Publish E-mails" 3310 link on an e-mail program toolbar. A user then selects an e-mail message to be stored into a Correspondence data structure 3210. The client e-mail publisher application 3222 sends the e-mail message across a network to the e-mail publisher 255 that stores a selected e-mail into the appropriate data structure in the system database 245 (See FIG. 2). When a user next accesses a Correspondence Page 3300, a user sees a selected published e-mail 3315 listed on a Correspondence Page 3300.

Figure 36:
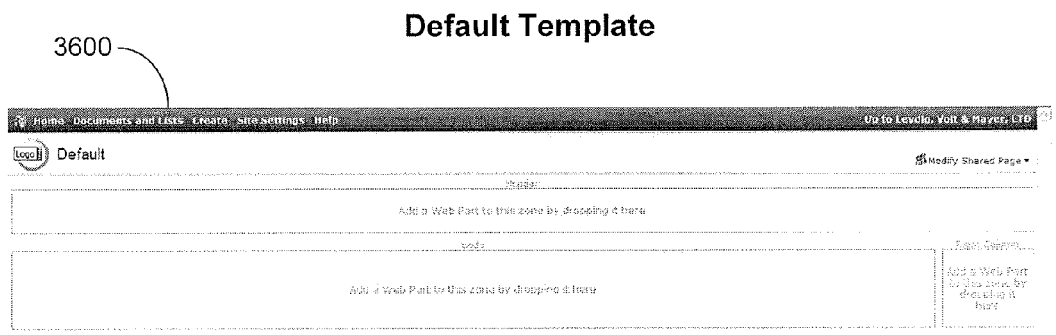
FIG. 36 is a diagram of a template incorporated into an exemplary embodiment.
Figure 37:
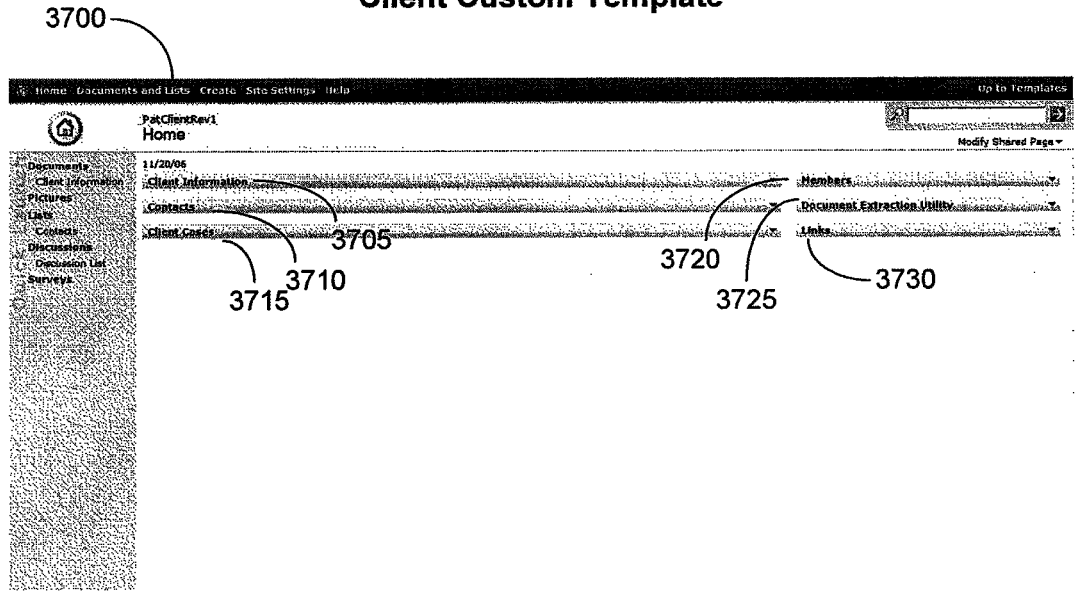
FIG. 37 is a diagram of a template incorporated into an exemplary embodiment.
Figure 38:
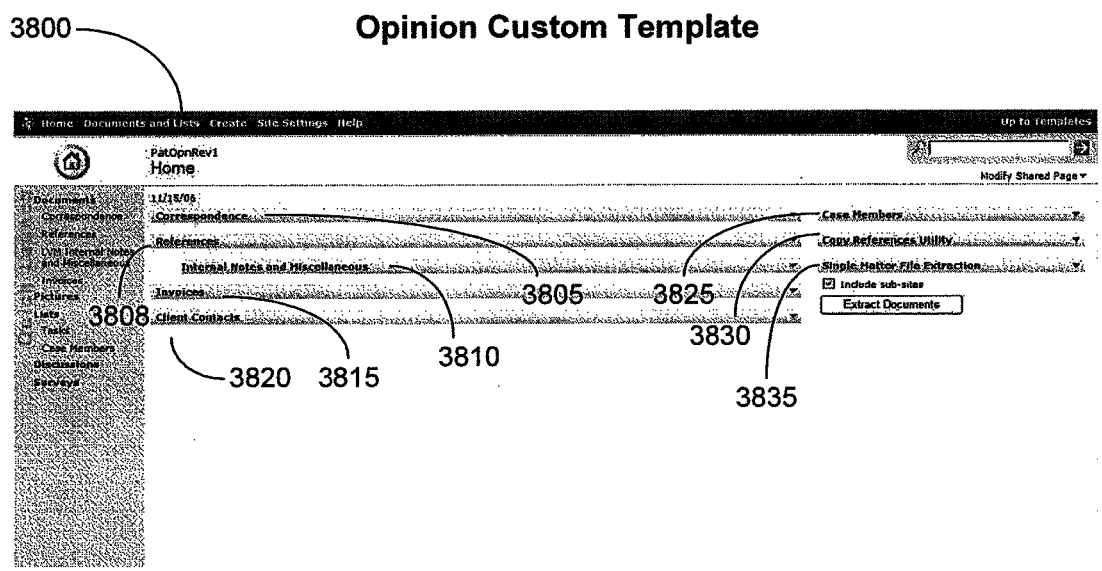
FIG. 38 is a diagram of a template incorporated into an exemplary embodiment.
Figure 39:
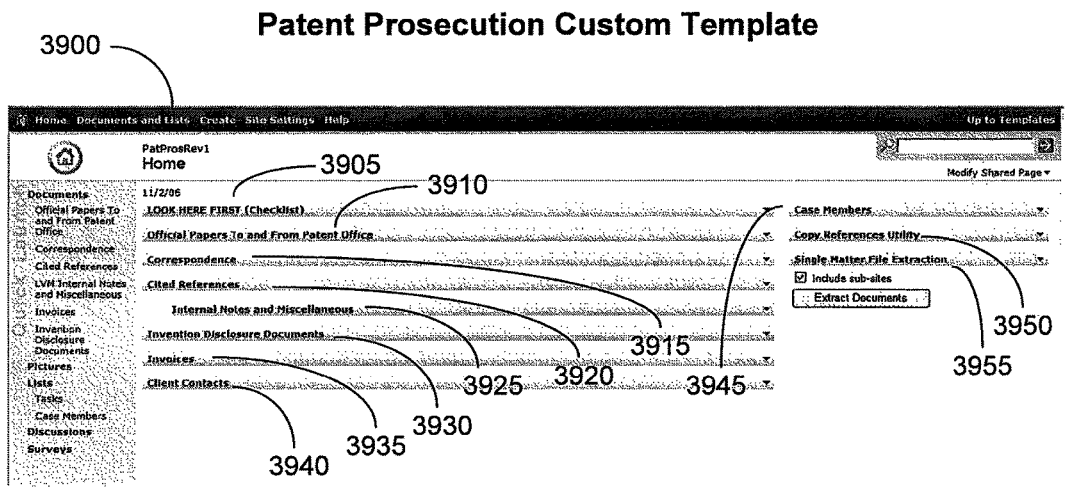
FIG. 39 is a diagram of a template incorporated into an exemplary embodiment.
Figure 40:
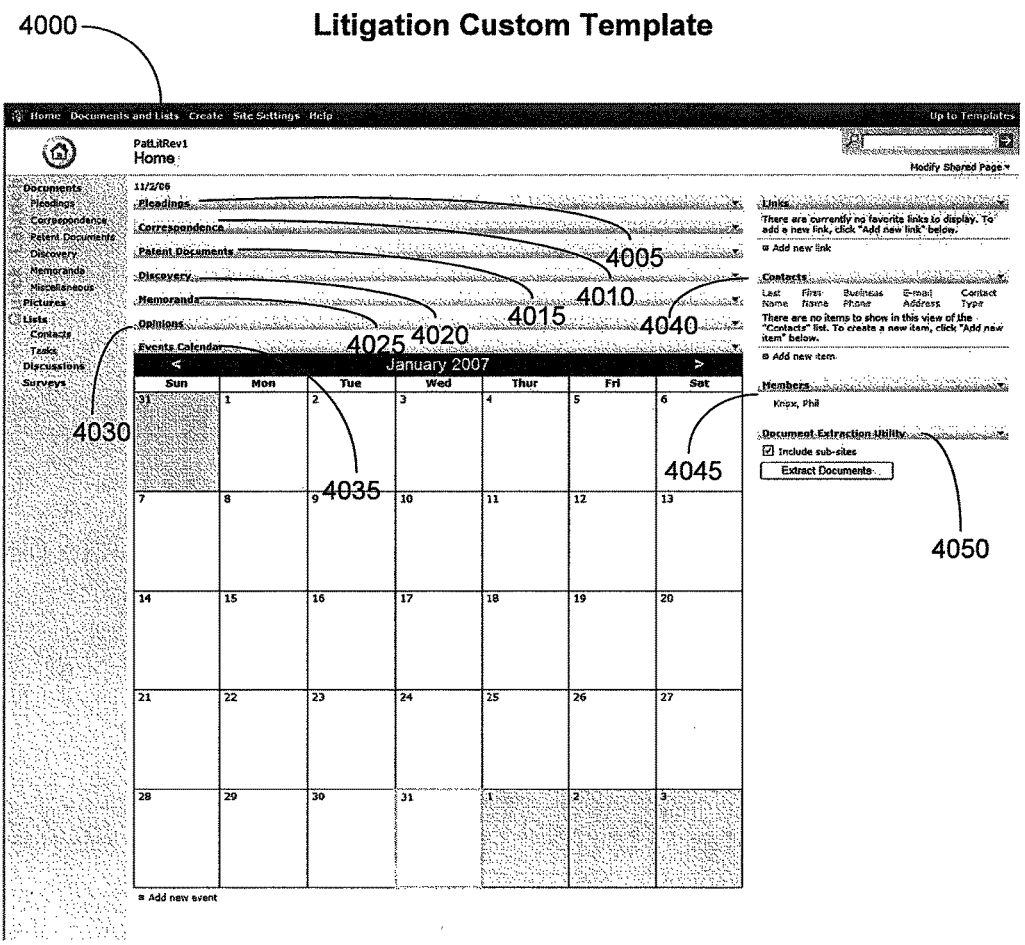
FIG. 40 is a diagram of a template incorporated into an exemplary embodiment.
Figure 41:
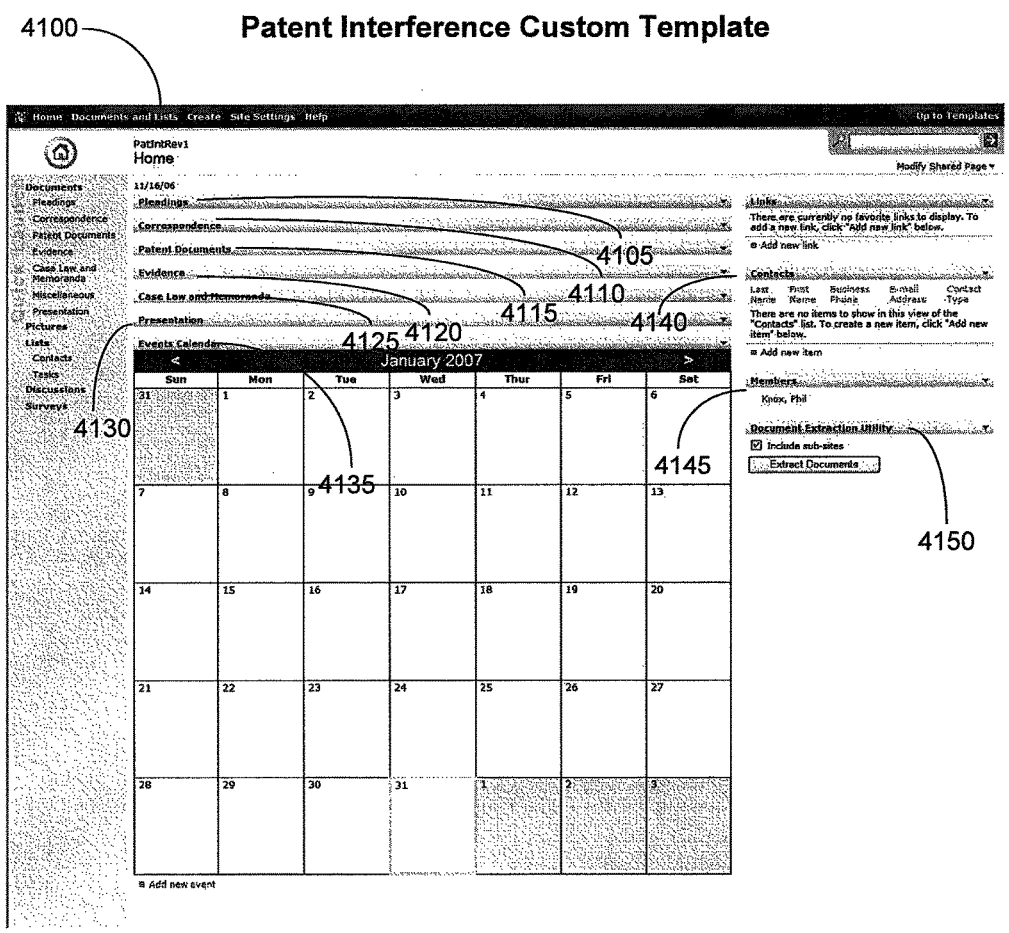
FIG. 41 is a diagram of a template incorporated into an exemplary embodiment.

FIGS. 36-41 are diagrams of custom and default templates incorporated into an exemplary. FIG. 36 shows an embodiment of a default template 3600. The default template 3600 provides a foundation and underlying content of a data structure contained in the system database 245 (See FIG. 2). FIG. 37 shows an embodiment of a client custom template 3700 used in creating a client site. The client custom template 3700 is overlaid on top of the default template 3600 to create a client site. Also, the client custom template 3700 populates a content data structure with foundational information and sections that include Client Information 3705, Contact 3710, Client Cases 3715, site user (members) 3720, a link to the document extractor 3725, and other links 3730. FIG. 38 shows an embodiment of an opinion custom template 3800 used in creating a client site. The opinion custom template 3800 is overlaid on top of the default template 3600 to create an opinion client site. Also, the opinion custom template 3800 populates a content data structure with foundational information and sections that include Correspondence 3805, References 3808, Internal Notes 3810, Invoices 3815, Client Contacts 3820, site user (members) 3825, a link to the copy reference utility 3830, and a link to the document extractor 3835. FIG. 39 shows an embodiment of a patent prosecution custom template 3900 used in creating a client site. The patent prosecution custom template 3900 is overlaid on top of the default template 3600 to create a patent prosecution client site. Also, the patent prosecution custom template 3900 populates a content data structure with foundational information and sections that include a Checklist 3905, Official Papers 3910, Correspondence 3915, References 3920, Internal Notes 3925, Invention Disclosure Documents, 3930, Invoices 3935, Client Contacts 3940, site user (members) 3945, a link to the copy reference utility 3950, and a link to the document extractor 3955. FIG. 40 shows an embodiment of a litigation custom template 4000 used in creating a litigation site. The litigation custom template 4000 is overlaid on top of the default template 3600 to create a litigation site. Also, the litigation custom template 4000 populates a content data structure with foundational information and sections that include Pleadings 4005, Correspondence 4010, Patent Documents 4015, Discovery 4020, Memoranda 4025, Opinions 4030, Events Calendar 4035, Contacts 4040, site users (members) 4045, and a link 4050 to the document extractor 250. FIG. 41 shows an embodiment of a patent interference custom template 4100 used in creating a patent interference site. The patent interference custom template 4100 is overlaid on top of the default template 3600 to create a patent interference site. Also, the patent interference custom template 4100 populates a content data structure with foundational information and sections that include Pleadings 4105, Correspondence 4110, Patent Documents 4115, Discovery 4120, Memoranda 4125, Opinions 4130, Events Calendar 4135, Contacts 4140, site users (members) 4145, and a link 4150 to the document extractor 250.

The following tables list the attributes and method functions that use the document management system's 210 (See FIG. 2) application programming interface and the .net and asp.net software development framework.

Table 1 lists exemplary attributes for certain user interface features (i.e. textboxes, error dialog boxes, etc.) when a user add a new client into the case management system.

TABLE 1

| AddClients Attributes | | |
| --- | --- | --- |
| Attribute | Type | Notes |
| txtBxName | protected: System.Web.UI. WebControls.TextBox | Textbox to enter client name. |
| txtBxAlias | protected: System.Web.UI. WebControls.TextBox | Textbox to enter client alias name. |

TABLE 1-continued

AddClients Attributes

| Attribute | Type | Notes |
|---|---|---|
| txtBxUrl | protected: System.Web.UI. WebControls.TextBox | Textbox to enter URL. |
| lblInfo | protected: System.Web.UI. WebControls.Label | Label display the error if any occurs and the status. |
| btnAdd | protected: System.Web.UI. WebControls.Button | Button When clicked adds the client. |
| lblpgTitleId | protected: System.Web.UI. WebControls.Label | Label to display the current action and link to the admin menu. |
| chkIsLargeEntity | protected: System.Web.UI. WebControls.CheckBox | Checkbox to check if the client is small entity. |
| dao | protected: DAO | Initial Value: new DAO( ); Instance of the DAO class. |
| btnCancel | protected: System.Web.UI. WebControls.Button | Button When clicked cancels the current action. |
| ospSites | private: SPSiteCollection | Initial Value: null; |
| ospSite | private: SPSite | Initial Value: null; |
| ospGlobalAdmin | private: SPGlobalAdmin | Initial Value: null; |
| ADLookupDomainStr | private static: string | Initial Value: ConfigurationSettings.AppSettings; Domain string name is stored from the web.config file |
| ADLookupUserID | private static: string | Initial Value: ConfigurationSettings.AppSettings; Domain User name is stored from the web.config file |
| ADLookupPassword | private static: string | Initial Value: ConfigurationSettings.AppSettings; Domain User password is stored from the web.config file |
| ADLookupDomainName | private static: string | Initial Value: ConfigurationSettings.AppSettings; Domain name is stored from the web.config file |

Table 2 lists exemplary method functions that are invoked when a user adds a client to the case management system across a user interface. For example, the CreateSiteUsingAdminSrvc method creates a client site using the Admin Utility. A further example is the RegisterinSite Directory method, which registers the new client site into the data structure of the database.

TABLE 2

AddClients Methods

| Method | Type | Notes |
|---|---|---|
| CreateSiteUsingAdminSrvc (string, string, string, string, string, string, string, string, string, string, string, string) | private: bool | param: adminSrvcUrl [string - in] param: portalSiteURL [string - in] param: siteUrl [string - in] param: siteName [string - in] param: siteTitle [string - in] param: siteDescription [string - in] param: siteTemplate [string - in] param: siteOwnerLogin [string - in] param: siteOwnerName [string - in] param: siteOwnerEmail [string - in] param: OwnerPwd [string - in] param: siteDomain [string - in] param: PortalName [string - in] Creates the client site using the admin webservice. Calls RegisterInSiteDirectory( ) |
| RegisterInSiteDirectory (string, string, string, string, string, string, Hashtable) | public: void | param: siteDirectoryAreaName [string - in] param: siteDirectoryName [string - in] param: title [string - in] param: description [string - in] param: siteUrl [string - in] param: ownerLogin [string - in] param: itemData [Hashtable - in] Registers the created site in the site directory. |

TABLE 2-continued

AddClients Methods

| Method | Type | Notes |
| --- | --- | --- |
| Page_Load (object, System.EventArgs) | private: void | param: sender [object - in]<br>param: e [System.EventArgs - in]<br>Session["Admin"] is checked.<br>_REQUESTDIGEST hidden field is registered.<br>lblpgTitleId is filled |
| OnInit (EventArgs) | private: void | param: e [EventArgs - in]<br>override = 'true'<br>InitializeComponent( ) is called |
| InitializeComponent ( ) | private: void | Required method for Designer support - |
| btnAdd_Click (object, System.EventArgs) | public: void | param: sender [object - in]<br>param: e [System.EventArgs - in]<br>dao.addClient( ) is called to update the of the database(Clients table)<br>CreateSiteUsingAdminSrvc( ) is called<br>If the site is not created then the added record is deleted from the database by using dao.deleteCase ( ) method.<br>obj.addUserToSite ( ) is called. |
| btnCancel_Click (object, System.EventArgs) | private: void | param: sender [object - in]<br>param: e [System.EventArgs - in]<br>Redirects to previous page. |

Table 3 lists exemplary attributes that provide user interface features when a user adds a case into the case management system.

TABLE 3

AddCases Attributes

| Attribute | Type | Notes |
| --- | --- | --- |
| txtBxLVMRef | protected: System.Web.UI.WebControls.TextBox | Textbox to enter the LVM Reference Number |
| lblError | protected: System.Web.UI.WebControls.Label | Label to display errors if any occurs and the status |
| txtBxFamilyID | protected: System.Web.UI.WebControls.TextBox | Textbox to enter FamilyId. |
| txtBxTitle | protected: System.Web.UI.WebControls.TextBox | Textbox to enter case title. |
| txtBxClientRef | protected: System.Web.UI.WebControls.TextBox | Textbox to enter client reference number. |
| txtBxDesc | protected: System.Web.UI.WebControls.TextBox | Textbox to enter case description. |
| ddlCountry | protected: System.Web.UI.WebControls.DropDownList | Dropdown List displays all the countries. |
| ddlCategory | protected: System.Web.UI.WebControls.DropDownList | Dropdown list displays the case category types Patent, Trademark |
| btnCancel | protected: System.Web.UI.WebControls.Button | Button When clicked Cancels the current action and redirects to the previous page. |
| btnAdd | protected: System.Web.UI.WebControls.Button | Button When clicked Adds the Prosecution case. |
| lblpgTitleId | protected: System.Web.UI.WebControls.Label | Label to display the current action and link to the admin menu. |
| dao | protected: DAO | Initial Value: new DAO( );<br>Instance for the DAO class. |
| ospGlobalAdmin | private: SPGlobalAdmin | Instance for SPGlobalAdmin class. |
| txtBxAppno | protected: System.Web.UI.WebControls.TextBox | Textbox to enter application number. |
| ADLookupDomainStr | private static: string | Initial Value: ConfigurationSettings.AppSettings;<br>Domain string name is stored from the web.config file. |
| ADLookupUserID | private static: string | Initial Value: ConfigurationSettings.AppSettings;<br>Domain Admin user name is stored from the web.config file |
| ADLookupPassword | private static: string | Initial Value: ConfigurationSettings.AppSettings;<br>Domain Admin user password is stored from the web.config file |
| ADLookupDomainName | private static: string | Initial Value: ConfigurationSettings.AppSettings;<br>Domain name is stored from the web.config file |

Table 4 lists exemplary method functions that are invoked when a user adds a case to the case management system across a user interface. For example, the CreateSubSite method creates a client site using the Admin Utility. A further example is the RegisterinSite Directory method, which registers the new case site into the data structure of the database.

TABLE 4

AddCases Methods

| Method | Type | Notes |
|---|---|---|
| CreateSubSite (string, string, string, string, string, string, string, string, string) | public: bool | param: topLevelSiteUrl [string - in]<br>param: newSiteRelativeUrl [string - in]<br>param: title [string - in]<br>param: description [string - in]<br>param: siteTemplate [string - in]<br>param: userName [string - in]<br>param: displayName [string - in]<br>param: email [string - in]<br>param: notes [string - in]<br>Creates the site in the Sharepoint portal<br>Calls RegisterInSiteDirectory. |
| RegisterInSiteDirectory (string, string, string, string, string, string, string) | public: void | param: siteDirectoryAreaName [string - in]<br>param: siteDirectoryName [string - in]<br>param: title [string - in]<br>param: description [string - in]<br>param: siteUrl [string - in]<br>param: subSiteName [string - in]<br>param: ownerLogin [string - in]<br>Registers the created site in the site directory |
| Page_Load (object, System.EventArgs) | private: void | param: sender [object - in]<br>param: e [System.EventArgs - in]<br>_REQUESTDIGEST hidden field is registered.<br>Here the request is from SharePoint portal site or not is checked.<br>If the request is from SharePoint portal site then fillinSessions( ) is called<br>LoadPage( ) is called. |
| fillinSessions (string, string) | private: void | param: clientaliais [string - in]<br>param: error [string - out]<br>dao.getClients( ) is called and sessions are filled.<br>Session["clientID"], Session["name"], Session["alias"], Session["islargeEntity"] |
| loadPage ( ) | private: void | lblpgTitleId is filled.<br>Clears the controls values.<br>BindCountry( ) is called. |
| BindCountry ( ) | private: void | Fills the ddlCountry dropdown list from the LVMcountires table of the database. |
| OnInit (EventArgs) | private: void | param: e [EventArgs - in]<br>override = 'true'<br>InitializeComponent( ) is called |
| InitializeComponent ( ) | private: void | Required method for Designer support - |
| btnAdd_Click (object, System.EventArgs) | public: void | param: sender [object - in]<br>param: e [System.EventArgs - in]<br>Description ( ) is called.<br>Dao. AddCases( ) is called which updates the database.(Prosecution _Cases table).<br>CreateSubSite ( ) is called.<br>If the site is not successfully created the then added record is deleted from the database by using dao.deleteCase( ) method.<br>obj.addUserToSite ( ) is called which adds the Domain Users of the active directory to the site created. |
| Description (string) | private: string | param: isLargeEntity [string - out]<br>Builds the description for the site to be created. |
| btnCancel_Click (object, System.EventArgs) | private: void | param: sender [object - in]<br>param: e [System.EventArgs - in]<br>Cancels the current action. |

Table 5 lists exemplary attributes that provide user interface features when a user adds an opinion case into the case management system.

TABLE 5

AddOpinionCases Attributes

| Attribute | Type | Notes |
|---|---|---|
| txtBxLVMRef | protected: System.Web.UI.WebControls.TextBox | Textbox to enter the LVM reference number |
| lblError | protected: System.Web.UI.WebControls.Label | Label display the error if any occurs and the status |
| txtBxClientRef | protected: System.Web.UI.WebControls.TextBox | Textbox to enter client reference number. |
| txtBxDesc | protected: System.Web.UI.WebControls.TextBox | Textbox to enter case description. |
| btnCancel | protected: System.Web.UI.WebControls.Button | Button when clicked cancels the action. |
| btnAdd | protected: System.Web.UI.WebControls.Button | Button when clicked adds the case. |
| lblpgTitleId | protected: System.Web.UI.WebControls.Label | Label to display the current action and link to the admin menu |
| dao | protected: DAO | Initial Value: new DAO( ); Instance of the Dao class. |
| ADLookupDomainStr | private static: string | Initial Value: ConfigurationSettings.AppSettings; Domain string name is stored from the web.config file |
| ADLookupUserID | private static: string | Initial Value: ConfigurationSettings.AppSettings; Domain User name is stored from the web.config file |
| ADLookupPassword | private static: string | Initial Value: ConfigurationSettings.AppSettings; Domain User Password is stored from the web.config file |
| ADLookupDomainName | private static: string | Initial Value: ConfigurationSettings.AppSettings; Domain name is stored from the web.config file |
| ospSites | private: SPSiteCollection | Initial Value: null; |
| ospSite | private: SPSite | Initial Value: null; |
| ddlCategory | protected: System.Web.UI.WebControls.DropDownList | Dropdown list displays the case category types Patent, Trademark |
| ospGlobalAdmin | private: SPGlobalAdmin | |

Table 6 lists exemplary method functions that are invoked when a user adds an opinion case to the case management system across a user interface.

TABLE 6

AddOpinionCases Methods

| Method | Type | Notes |
|---|---|---|
| CreateSubSite (string, string, string, string, string, string, string, string, string) | public: bool | param: topLevelSiteUrl [string - in]<br>param: newSiteRelativeUrl [string - in]<br>param: title [string - in]<br>param: description [string - in]<br>param: siteTemplate [string - in]<br>param: userName [string - in]<br>param: displayName [string - in]<br>param: email [string - in]<br>param: notes [string - in]<br>Creates the site in the SharePoint portal<br>Calls RegisterInSiteDirectory. |
| RegisterInSiteDirectory (string, string, string, string, string, string, string) | public: void | param: siteDirectoryAreaName [string - in]<br>param: siteDirectoryName [string - in]<br>param: title [string - in]<br>param: description [string - in]<br>param: siteUrl [string - in]<br>param: subSiteName [string - in]<br>param: ownerLogin [string - in]<br>Registers the created site in the site directory |
| Page_Load (object, System.EventArgs) | private: void | param: sender [object - in]<br>param: e [System.EventArgs - in]<br>_REQUESTDIGEST hidden field is registered.<br>Here the request is from SharePoint portal site or not is checked.<br>If the request is from SharePoint portal site then fillinSessions( ) is called.<br>LoadPage ( ) is called. |

TABLE 6-continued

AddOpinionCases Methods

| Method | Type | Notes |
| --- | --- | --- |
| fillinSessions (string, string) | private: void | param: clientaliais [string - in]<br>param: error [string - out]<br>dao.getClients ( ) is called and sessions are filled.<br>Session["clientID"], Session["name"], Session["alias"] |
| loadPage ( ) | private: void | lblpgTitleId is filled.<br>Clears the controls values. |
| OnInit (EventArgs) | private: void | param: e [EventArgs - in]<br>override = 'true'<br>calls InitializeComponent ( ) |
| InitializeComponent ( ) | private: void | Required method for Designer support |
| btnAdd_Click (object, System.EventArgs) | public: void | param: sender [object - in]<br>param: e [System.EventArgs - in]<br>Dao. AddCases( ) is called which updates the database.(Prosecution_Cases table).<br>CreateSubSite ( ) is called.<br>If the site is not successfully created the then added record is deleted from the database by using dao.deleteCase( ) method.<br>obj.addUserToSite ( ) is called which adds the Domain Users of the active directory to the site created |
| btnCancel_Click (object, System.EventArgs) | private: void | param: sender [object - in]<br>param: e [System.EventArgs - in]<br>Redirects to previous page. |

Table 7 lists exemplary attributes that provide user interface features when a user adds a litigation case into the case management system.

TABLE 7

AddLCase Attributes

| Attribute | Type | Notes |
| --- | --- | --- |
| lblpgTitleId | protected: System.Web.UI.WebControls.Label | Label to display the current action and link to the admin menu |
| txtBxLVMRef | protected: System.Web.UI.WebControls.TextBox | Textbox to enter the LVM reference number |
| btnAdd | protected: System.Web.UI.WebControls.Button | Button when clicked adds the case. |
| btnCancel | protected: System.Web.UI.WebControls.Button | Button when clicked cancels the action. |
| txtBxPlaintiff | protected: System.Web.UI.WebControls.TextBox | Textbox to enter Plaintiff |
| txtBxDefendant | protected: System.Web.UI.WebControls.TextBox | Textbox to enter Defendant |
| lblError | protected: System.Web.UI.WebControls.Label | Label display the error if any occurs and the status |
| txtBxCourt | protected: System.Web.UI.WebControls.TextBox | Textbox to enter the court |
| txtBxTitle | protected: System.Web.UI.WebControls.TextBox | Textbox to enter the Title. |
| dao | private: DAO | Initial Value: new DAO( );<br>Instance of the Dao class. |
| ospSites | private: SPSiteCollection | Initial Value: null; |
| ospSite | private: SPSite | Initial Value: null; |
| ospGlobalAdmin | private: SPGlobalAdmin | Initial Value: null; |
| ADLookupDomainStr | private static: string | Initial Value: ConfigurationSettings.AppSettings;<br>Domain string name is stored from the web.config file |
| ADLookupUserID | private static: string | Initial Value: ConfigurationSettings.AppSettings;<br>Domain User name is stored from the web.config file |
| ADLookupPassword | private static: string | Initial Value: ConfigurationSettings.AppSettings;<br>Domain User Password is stored from the web.config file |
| ADLookupDomainName | private static: string | Initial Value: ConfigurationSettings.AppSettings;<br>Domain name is stored from the web.config file |

Table 8 lists exemplary method functions that are invoked when a user adds a litigation case to the case management system across a user interface.

TABLE 8

AddLCase Methods

| Method | Type | Notes |
| --- | --- | --- |
| CreateSiteUsingAdminSrvc (string, string, string, string, string, string, string, string, string, string, string) | private: bool | param: adminSrvcUrl [string - in]<br>param: portalSiteURL [string - in]<br>param: siteUrl [string - in]<br>param: siteName [string - in]<br>param: siteTitle [string - in]<br>param: siteDescription [string - in]<br>param: siteTemplate [string - in]<br>param: siteOwnerLogin [string - in]<br>param: siteOwnerName [string - in]<br>param: siteOwnerEmail [string - in]<br>param: OwnerPwd [string - in]<br>param: siteDomain [string - in]<br>param: PortalName [string - in]<br>Creates the client site using the admin webservice.<br>Calls RegisterInSiteDirectory( ) |
| UpdateCaseSite (string, string, string) | public: bool | param: SiteUrl [string - in]<br>param: NewTitle [string - in]<br>param: NewDescription [string - in]<br>Updates the case site. |
| RegisterInSiteDirectory (string, string, string, string, string, string, Hashtable) | private: void | param: siteDirectoryAreaName [string - in]<br>param: siteDirectoryName [string - in]<br>param: title [string - in]<br>param: description [string - in]<br>param: siteUrl [string - in]<br>param: ownerLogin [string - in]<br>param: itemData [Hashtable - in]<br>Registers the created site in the site directory. |
| fillCaseDetails (string) | private: void | param: caseno [string - in]<br>Fills the textbox values from the database for the case number. |
| Page_Load (object, System.EventArgs) | private: void | param: sender [object - in]<br>param: e [System.EventArgs - in]<br>Session["Admin"] is checked.<br>_REQUESTDIGEST hidden field is registered.<br>lblpgTitleId is filled<br>QueryString ["Action"] is checked. If QueryString ["Action"] is "Edit" then fillCaseDetails( ) is called. |
| OnInit (EventArgs) | private: void | param: e [EventArgs - in]<br>override = 'true'<br>calls InitializeComponent ( ) |
| InitializeComponent ( ) | private: void | Required method for Designer support |
| btnCancel_Click (object, System.EventArgs) | private: void | param: sender [object - in]<br>param: e [System.EventArgs - in]<br>Redirects to previous page. |
| btnAdd_Click (object, System.EventArgs) | private: void | param: sender [object - in]<br>param: e [System.EventArgs - in]<br>If btnAdd.Text=="Update" then UpdateCaseSite( ) is called.<br>If the site is updated then UpdateCase ( ) is called.<br>If btnAdd.Text is not "Update" then Addcase( ) is called. |
| AddCase (string, short, string, string, string, string) | private: void | param: LVMRef [string - in]<br>param: caseType [short - in]<br>param: Title [string - in]<br>param: Plaintiff [string - in]<br>param: Defendant [string - in]<br>param: Court [string - in]<br>dao.addcases ( ) is called.<br>CreateSiteUsingAdminSrvc( ) is called.<br>If the site is not created then the added record is deleted from the database by using dao.deleteCase( ) method.<br>obj.addUserToSite ( ) is called. |
| UpdateCase (string, short, string, string, string, string) | private: void | param: CaseNo [string - in]<br>param: CaseType [short - in]<br>param: Title [string - in]<br>param: Plaintiff [string - in]<br>param: Defendant [string - in]<br>param: Court [string - in]<br>dao.updateCases( ) is called |

Table 9 lists exemplary method functions that are implemented to add a user to the case management system.

TABLE 9

| AddUsers Methods | | |
|---|---|---|
| Method | Type | Notes |
| AddUsers ( ) | public: | |
| addUserToSite (string, string, string, string, string) | public: void | param: domain [string - in]<br>param: userName [string - in]<br>param: Role [string - in] |

TABLE 9-continued

| AddUsers Methods | | |
|---|---|---|
| Method | Type | Notes |
| | | param: SiteUrl [string - in]<br>param: error [string - out]<br>Adds the domain users to "Reader" group of the sharepoint site created. |

Table 10 lists exemplary attributes that provide user interface features when a user is interfacing with the Admin Menu.

TABLE 10

| AdminMenu Attributes | | |
|---|---|---|
| Attribute | Type | Notes |
| btnClients | protected: System.Web.UI.WebControls.Button | Button when clicked redirects to Clients.aspx |
| btnCases | protected: System.Web.UI.WebControls.Button | Button when clicked redirects to ViewLitigationCases.aspx |
| ADLookupDomainStr | private static: string | Initial Value: ConfigurationSettings.AppSettings; Domain string name is stored from the web.config file |
| ADLookupUserID | private static: string | Initial Value: ConfigurationSettings.AppSettings; Domain user name is stored from the web.config file |
| ADLookupPassword | private static: string | Initial Value: ConfigurationSettings.AppSettings; Domain user password is stored from the web.config file |
| ADLookupDomainName | private static: string | Initial Value: ConfigurationSettings.AppSettings; Domain name is stored from the web.config file |

Table 11 lists exemplary method functions that are implemented when the user is interfacing with the Admin Menu.

TABLE 11

| AdminMenu Methods | | |
|---|---|---|
| Method | Type | Notes |
| Page_Load (object, System.EventArgs) | private: void | param: sender [object - in]<br>param: e [System.EventArgs - in]<br>calls ifuserexistsin( )<br>if the login user not belongs to "LVMAdminTool" group of the Active Directory the page is redirected to "NotAuthorised.aspx" |
| ifuserexistsin (string) | private: bool | param: logonuser [string - in]<br>checks if the login user belongs to "LVMAdminTool" group of the Active Directory. |
| OnInit (EventArgs) | private: void | param: e [EventArgs - in]<br>override = 'true'<br>calls InitializeComponent ( ) |
| InitializeComponent ( ) | private: void | Required method for Designer support |
| btnClient_Click (object, EventArgs) | public: void | param: sender [object - in]<br>param: e [EventArgs - in]<br>Redirects to "Clients.aspx" |
| btnCases_Click (object, EventArgs) | public: void | param: sender [object - in]<br>param: e [EventArgs - in]<br>Redirects to "ViewLitigationCases.aspx" |

Table 12 lists exemplary attributes for the clients data structure within the case management system.

TABLE 12

| Clients Attributes | | |
|---|---|---|
| Attribute | Type | Notes |
| dgClients | Protected: System.Web.UI.WebControls.DataGrid | Datagrid shows all the clients from Clients table of the database. |

TABLE 12-continued

| Clients Attributes | | |
|---|---|---|
| Attribute | Type | Notes |
| lblError | Protected: System.Web.UI.WebControls.Label | Label to display if any error occurs and the status. |
| btnCancel | Protected: System.Web.UI.WebControls.Button | Button when clicked cancels the current action. |
| btnAdd | Protected: System.Web.UI.WebControls.Button | Button when clicked redirects to "AddClients.aspx" |
| lblpgTitleId | Protected: System.Web.UI.WebControls.Label | Label to display the current action and link to the admin menu |
| ds | private: DataSet | Dataset |

Table 13 lists exemplary method functions for the clients data structure within the case management system.

TABLE 13

| Clients Methods | | |
|---|---|---|
| Method | Type | Notes |
| Page_Load (object, System.EventArgs) | private: void | param: sender [object - in] param: e [System.EventArgs - in] Session["Admin"] is checked. lblpgTitleId is filled. Calls dao.getclients( ) Binds the datagrid. |
| OnInit (EventArgs) | private: void | param: e [EventArgs - in] override = 'true' calls InitializeComponent( ) |
| InitializeComponent ( ) | private: void | Required method for Designer support |
| btnView_Click (object, DataGridCommandEvent Args) | public: void | param: sender [object - in] param: e [DataGridCommandEventArgs - in] Session is filled. Session["clientID"], Session["name"], Session["alias"], Session ["url"], Session["islargeEntity"] Redirects to "ViewClients.aspx". |
| btnChangePage_Click (object, DataGridPageChanged EventArgs) | public: void | param: sender [object - in] param: e [DataGridPageChangedEventArgs - in] Datagrids CurrentPageIndex is set. |
| btnAdd_Click (object, System.EventArgs) | public: void | param: sender [object - in] param: e [System.EventArgs - in] Redirects "AddClients.aspx". |
| btnCancel_Click (object, System.EventArgs) | private: void | param: sender [object - in] param: e [System.EventArgs - in] Redirects to AdminMenu.aspx |

Table 14 lists an exemplary attribute for Data Access Object (DAO) that performs database transactions within the case management system.

TABLE 14

| DAO Attributes | | |
|---|---|---|
| Attribute | Type | Notes |
| _errMsg | private: string | Initial Value: string.Empty; Used by ErrMg property. |

Table 15 lists exemplary method functions for Data Access Objects that performs database transactions within the case management system.

TABLE 15

DAO Methods

| Method | Type | Notes |
| --- | --- | --- |
| DAO ( ) | public: | Constructor. |
| ErrMsg ( ) | «property» public: string | Property ErrMsg. _errMsg is set by this property when any exception is fired. _errMsg is by this property as a parameter to InsertCodeError( ) |
| InsertCodeError (string) | public: void | param: errText [string - in] To insert into lvmCodeErrors table of the database when any exception occurs using "USP_InsertCodeError" procedure |
| deleteClient (int) | public: bool | param: pk [int - in] Deletes client from client table of the database. |
| addClient (string, int, string, string, string, int) | public: bool | param: error [string - out] param: pk [int - out] param: name [string - in] param: alias [string - in] param: url [string - in] param: isLargeEntity [int - in] Inserts client details into Client table of the database. |
| updateClient (string, string, string, string, int) | public: bool | param: error [string - out] param: name [string - in] param: alias [string - in] param: url [string - in] param: islargeEntity [int - in] Updates client details. |
| getClients (string, string, string, string) | public: void | param: alias [string - in] param: error [string - out] param: clientID [string - out] param: name [string - out] Returns the clientId, name from clients table of the database when alias is passed. |
| getClients (string, string, string, string, bool) | public: void | param: alias [string - in] param: error [string - out] param: clientID [string - out] param: name [string - out] param: islargeEntity [bool - out] Returns the clientId, name,islargeentity from clients table of the database when alias is passed |
| getClients (string) | public: DataSet | param: error [string - out] Returns all the rows from the client table of the database |
| deleteCase (string, int) | public: bool | param: caseno [string - in] param: caseType [int - in] Delete the case from case table, Prosecution_cases, LVMOpinion_cases, Litigation_cases tables of the database based on caseno and the casetype.using "USP_DeleteCase" procedure. |
| addcases (string, string, string, string, string, string, string) | public: bool | param: error [string - out] param: caseno [string - in] param: casetype [string - in] param: clientID [string - in] param: clientRef [string - in] param: desc [string - in] param: fullurl [string - in] Adds the case to LVMOpinion_cases table of the database using "USP_InsertLVMOpinionCase" procedure. |
| addcases (string, string, short, string, string, string, string, string) | public: bool | param: error [string - out] param: caseno [string - in] param: casetype [short - in] param: title [string - in] param: plaintiff [string - in] param: defendant [string - in] param: court [string - in] param: fullurl [string - in] Adds the case to Litigation _cases table of the database using "USP_InsertLitigationCase" procedure. |
| addcases (string, string, string, string, string, string, string, string, string, string, string) | public: bool | param: error [string - out] param: casetype [string - in] param: reference [string - in] param: familyID [string - in] param: clientID [string - in] param: clientRef [string - in] param: entryCode [string - in] param: title [string - in] param: desc [string - in] param: fullurl [string - in] param: isLargeEntity [string - in] param: ApplicationNo [string - in] |

TABLE 15-continued

DAO Methods

| Method | Type | Notes |
| --- | --- | --- |
| updateCases (string, string, string, string) | public: bool | Adds the case to Prosecution _cases table of the database using "USP_InsertProsecutionCase" procedure.<br>param: error [string - out]<br>param: clientRef [string - in]<br>param: desc [string - in]<br>param: reference [string - in]<br>Updates the LVMOpinion_cases table of the database for the given caseno. |
| updateCases (string, short, string, string, string, string, string) | public: bool | param: error [string - out]<br>param: casetype [short - in]<br>param: reference [string - in]<br>param: title [string - in]<br>param: plaintiff [string - in]<br>param: defendant [string - in]<br>param: court [string - in]<br>Updates the Litigation_cases table of the database for the caseno using "USP_UpdateLitigationCase" procedure |
| updateCases (string, string, string, string, string, string, string, string, string) | public: bool | param: error [string - out]<br>param: casetype [string - in]<br>param: reference [string - in]<br>param: familyID [string - in]<br>param: clientRef [string - in]<br>param: entryCode [string - in]<br>param: title [string - in]<br>param: desc [string - in]<br>param: ApplicationNo [string - in]<br>Updates the Prosecution_cases table of the database for the given caseno. |
| getCases (string, string) | public: DataSet | param: error [string - out]<br>param: clientID [string - in]<br>Gets all the prosecution cases from Prosecution_cases table of the database for the given clientId. Using "USP_GetProsecutionCases" procedure. |
| getCases (string) | public: DataSet | param: error [string - out]<br>Gets all the litigation cases from the Litigation_Cases table of the database. |
| getCases (string, string, string, string, string, string, string) | public: void | param: _error [string - out]<br>param: _caseType [string - out]<br>param: _clientRefNum [string - out]<br>param: _caseDesc [string - out]<br>param: _clientName [string - out]<br>param: _alias [string - out]<br>param: _caseno [string - in]<br>Gets all the opinion cases from LVMOpinion_cases table and the clients table of the database when the request is from webpart. |
| getCases (string, string, string, string, string, string, string, string, string, string) | public: void | param: _error [string - out]<br>param: _caseType [string - out]<br>param: _country [string - out]<br>param: _familyID [string - out]<br>param: _clientRefNum [string - out]<br>param: _caseDesc [string - out]<br>param: _title [string - out]<br>param: _clientName [string - out]<br>param: _alias [string - out]<br>param: _ApplicationNo [string - out]<br>param: _caseno [string - in]<br>Gets all the Prosecution cases from Prosecution_cases table and the clients table of the database when the request is from webpart. |
| getCaseDetails (string, string) | public: DataSet | param: error [string - out]<br>param: caseno [string - in]<br>Gets the litigation case details from Litigation_cases table of the database for the given caseno. |
| getCountry (string, int) | public: DataSet | param: error [string - out]<br>param: usaID [int - out]<br>Gets all the countries from lvmCountries table of the database and returns the US country ID |
| getEntityType (int) | public: string | param: caseNo [int - in]<br>Gets the IsLargeEntity from prosecution_cases table of the database for the given caseno. |

Table 16 lists exemplary global attributes for the case management system.

TABLE 16

Global Attributes

| Attribute | Type | Notes |
|---|---|---|
| components | private: System.ComponentModel.IContainer | Required designer variable. Initial Value: null; |

Table 17 lists exemplary global method functions for the case management system.

TABLE 17

Global Methods

| Method | Type | Notes |
|---|---|---|
| Global ( ) | public: | |
| Application_Start (Object, EventArgs) | protected: void | param: sender [ Object - in ] param: e [ EventArgs - in ] |

TABLE 17-continued

Global Methods

| Method | Type | Notes |
|---|---|---|
| Session_Start (Object, EventArgs) | protected: void | param: sender [ Object - in ] param: e [ EventArgs - in ] |
| Application_BeginRequest (Object, EventArgs) | protected: void | param: sender [ Object - in ] param: e [ EventArgs - in ] |
| Application_EndRequest (Object, EventArgs) | protected: void | param: sender [ Object - in ] param: e [ EventArgs - in ] |
| Application_AuthenticateRequest (Object, EventArgs) | protected: void | param: sender [ Object - in ] param: e [ EventArgs - in ] |
| Application_Error (Object, EventArgs) | protected: void | param: sender [ Object - in ] param: e [ EventArgs - in ] |
| Session_End (Object, EventArgs) | protected: void | param: sender [ Object - in ] param: e [ EventArgs - in ] |
| Application_End (Object, EventArgs) | protected: void | param: sender [ Object - in ] param: e [ EventArgs - in ] |
| InitializeComponent ( ) | private: void | Required method for Designer support - do not modify the contents of this method with the code editor. |

Table 18 lists exemplary attributes that are used to impersonate a login user within the case management system.

TABLE 18

Impersonate Attributes

| Attribute | Type | Notes |
|---|---|---|
| impersonationContext | private: WindowsImpersonationContext | |
| LOGON32_LOGON_NETWORK | public const: int | Initial Value: 3; |
| LOGON32_LOGON_INTERACTIVE | public const: int | Initial Value: 2; |
| LOGON32_PROVIDER_DEFAULT | public const: int | Initial Value: 0; |

Table 19 lists exemplary method functions that are used to impersonate a login user within the case management system.

TABLE 19

Impersonate Methods

| Method | Type | Notes |
|---|---|---|
| LogonUserA (String, String, String, int, int, IntPtr) | public static: int | param: lpszUserName [ String - in ] param: lpszDomain [ String - in ] param: lpszPassword [ String - in ] param: dwLogonType [ int - in ] param: dwLogonProvider [ int - in ] param: phToken [ IntPtr - inout ] Attribute = '[DllImport("advapi32.dll")]' extern = 'true' |
| DuplicateToken (IntPtr, int, IntPtr) | public static: int | param: hToken [ IntPtr - in ] param: impersonationLevel [ int - in ] param: hNewToken [ IntPtr - inout ] Attribute = '[DllImport("advapi32.dll", CharSet=CharSet.Auto, SetLastError=true)]' extern = 'true' |
| RevertToSelf ( ) | public static: bool | Attribute = '[DllImport("advapi32.dll", CharSet=CharSet.Auto, SetLastError=true)]' extern = 'true' |
| CloseHandle (IntPtr) | public static: bool | param: handle [ IntPtr - in ] Attribute = '[DllImport("kernel32.dll", CharSet=CharSet.Auto)]' extern = 'true' |

TABLE 19-continued

Impersonate Methods

| Method | Type | Notes |
|---|---|---|
| impersonate ( ) | public: | |
| impersonateValidUser (String, String, String) | public: bool | param: userName [ String - in ]<br>param: domain [ String - in ]<br>param: password [ String - in ] |
| undoImpersonation ( ) | public: void | |

Table 20 lists exemplary attributes that are used to determine an unauthorized user of the case management system.

TABLE 20

NotAuthorised Attributes

| Attribute | Type | Notes |
|---|---|---|
| lblMsg | protected: System.Web.UI.-WebControls.Label | Label to display not authorized message. |
| uxBack | protected: System.Web.UI.-WebControls.LinkButton | LinkButton when clicked redirects to previous page. |
| ADLookupDomainStr | private static: string | Initial Value: ConfigurationSettings.AppSettings; Domain string name is stored from the web.config file |
| ADLookupUserID | private static: string | Initial Value: ConfigurationSettings.AppSettings; Domain user name is stored from the web.config file |
| ADLookupPassword | private static: string | Initial Value: ConfigurationSettings.AppSettings; Domain user password is stored from the web.config file |
| ADLookupDomainName | private static: string | Initial Value: ConfigurationSettings.AppSettings; Domain name is stored from the web.config file |

Table 21 lists exemplary method functions that are used to determine an unauthorized user of the case management system.

TABLE 21

NotAuthorised Methods

| Method | Type | Notes |
|---|---|---|
| Page_Load (object, System.EventArgs) | private: void | param: sender [ object - in ]<br>param: e [ System.EventArgs - in ]<br>checks Session["alias"] |
| OnInit (EventArgs) | private: void | param: e [ EventArgs - in ]<br>override = 'true'<br>calls InitializeComponent ( ) |
| InitializeComponent ( ) | private: void | Required method for Designer support |
| uxBack_Click (object, System.EventArgs) | private: void | param: sender [ object - in ]<br>param: e [ System.EventArgs - in ]<br>Redirects to previous page. |

Table 22 lists exemplary attributes that are used to view cases across a user interface within a case management system.

TABLE 22

ViewCases Attributes

| Attribute | Type | Notes |
|---|---|---|
| lblCaseType | protected: System.Web.UI.-WebControls.Label | Label displays the case type patent or trademark |
| lblLVMRefNum | protected: System.Web.UI.-WebControls.Label | Label displays the LVMRefNum |
| lblError | protected: System.Web.UI.-WebControls.Label | Label displays the errors if any occurs and status. |
| txtBxFamilyID | protected: System.Web.UI.-WebControls.TextBox | Textbox to enter family id. |
| txtBxTitle | protected: System.Web.UI.-WebControls.TextBox | Textbox to enter case title. |

TABLE 22-continued

ViewCases Attributes

| Attribute | Type | Notes |
| --- | --- | --- |
| txtBxClientRef | protected: System.Web.UI.-WebControls.TextBox | Textbox to enter client ref. Number |
| txtBxDesc | protected: System.Web.UI.-WebControls.TextBox | Textbox to enter case description |
| ddlCountry | protected: System.Web.UI.-WebControls.DropDownList | Drop downlist contains all the countries. |
| btnCancel | protected: System.Web.UI.-WebControls.Button | Button when clicked cancels the current action |
| btnUpdate | protected: System.Web.UI.-WebControls.Button | Button when clicked updates the case. |
| lblpgTitleId | protected: System.Web.UI.-WebControls.Label | Label to display the current action and link to the admin menu |
| lblPortalUrlText | protected: System.Web.UI.-WebControls.Label | Label displays the portal URL |
| dao | protected: DAO | initial Value: new DAO( ); Instance of the DAO class. |
| tempObj | private: LVMAdmin.AddLCase | Initial Value: new LVMAdmin.AddLCase( ); Instance of AddLCase( ) class. |
| ADLookupDomainStr | private static: string | Initial Value: ConfigurationSettings.AppSettings; Domain string name is stored from the web.config file |
| ADLookupUserID | private static: string | Initial Value: ConfigurationSettings.AppSettings; Domain user name is stored from the web.config file |
| ADLookupPassword | private static: string | Initial Value: ConfigurationSettings.AppSettings; Domain user name is stored from the web.config file |
| txtBxAppno | protected: System.Web.UI.-WebControls.TextBox | Textbox to enter Application number. |
| ADLookupDomainName | private static: string | Initial Value: ConfigurationSettings.AppSettings; Domain name is stored from the web.config file |

Table 23 lists exemplary method functions that are used to view cases across a user interface within a case management system.

TABLE 23

ViewCases Methods

| Method | Type | Notes |
| --- | --- | --- |
| Page_Load (object, System.EventArgs) | private: void | param: sender [ object - in ] param: e [ System.EventArgs - in ] Here the request is from Sharepoint portal site or not is checked. If the request is from Sharepoint portal site then fillinSessions( ) is called LoadPage( ) is called. |
| fillinSessions (string, string) | private: void | param: lvmRefNum [ string - in ] param: error [ string - out ] dao.getCases( ) is called . sessions are filled. Session["clientRefNum"], Session["case_type"],Session["country"],Session["familyID"],Session["lvmRefNum"],Session["case_desc"],Session["title"],Session["name"], Session["alias"], Session["ApplicationNo"] |
| LoadPage ( ) | private: void | lblpgTitleId,lblCaseType, lblLVMRefNum,txtBxFamilyID, txtBxClientRef,txtBxTitle txtBxDesc.Text ,txtBxAppno,lblPortalUrlText are set based on the caseno |
| OnInit (EventArgs) | private: void | param: e [ EventArgs - in ] override = 'true' calls InitializeComponent ( ) |
| InitializeComponent ( ) | private: void | Required method for Designer support - do not modify the contents of this method with the code editor. |

TABLE 23-continued

ViewCases Methods

| Method | Type | Notes |
| --- | --- | --- |
| BindCountry ( ) | private: void | Fills the dropdown list with the countries. |
| btnUpdate_Click (object, System.EventArgs) | public: void | param: sender [ object - in ] <br> param: e [ System.EventArgs - in ] <br> calls tempObj.UpdateCaseSite( ) <br> calls dao.updateCases( ). |
| Description ( ) | private: string | Sets the description for the site being modified. |
| btnCancel_Click (object, System.EventArgs) | public: void | param: sender [ object - in ] <br> param: e [ System.EventArgs - in ] <br> Redirects to previous page. |

Table 24 lists exemplary attributes that are used to view clients across a user interface within a case management system.

TABLE 24

ViewClients Attributes

| Attribute | Type | Notes |
| --- | --- | --- |
| lblName | protected: System.Web.UI.WebControls.Label | Label displays the client name |
| lblAlias | protected: System.Web.UI.WebControls.Label | Label displays the client alias |
| txtBxUrl | protected: System.Web.UI.WebControls.TextBox | Textbox to enter client URL |
| btnUpdate | protected: System.Web.UI.WebControls.Button | Button when clicked updates the client details. |
| lblInfo | protected: System.Web.UI.WebControls.Label | Label displays the status of the updated information. |
| btnBack | protected: System.Web.UI.WebControls.Button | Button when clicked redirects to the previous page. |
| lblError | protected: System.Web.UI.WebControls.Label | Label displays the errors if any . |
| dgCases | protected: System.Web.UI.WebControls.DataGrid | Datagrid shows all case details.. |
| dao | protected: DAO | Initial Value: new DAO( ); <br> Instance of Dao class. |
| lblpgTitleId | protected: System.Web.UI.WebControls.Label | Label to display the current action and link to the admin menu. |
| lblpgSubTitleId | protected: System.Web.UI.WebControls.Label | Label to display the sub page title id |
| lblPortalUrlText | protected: System.Web.UI.WebControls.Label | Label displays the portal URL |
| chkIsLargeEntity | protected: System.Web.UI.WebControls.CheckBox | Checkbox isLargeEntity |
| ds | private: DataSet | Dataset |
| ADLookupDomainStr | private static: string | Initial Value: ConfigurationSettings.AppSettings; <br> Domain string name is stored from the web.config file |
| ADLookupUserID | private static: string | Initial Value: ConfigurationSettings.AppSettings; <br> Domain User name is stored from the web.config file |
| ADLookupPassword | private static: string | Initial Value: ConfigurationSettings.AppSettings; <br> Domain user password is stored from the web.config file |
| drpCaseTypes | protected: System.Web.UI.WebControls.DropDownList | Drop down list contains Case Types. |
| btnClients | protected: System.Web.UI.WebControls.Button | Button when clicked adds the prosecution or opinion cases |

TABLE 24-continued

ViewClients Attributes

| Attribute | Type | Notes |
|---|---|---|
| ADLookupDomainName | private static: string | Initial Value: ConfigurationSettings.AppSettings; Domain name is stored from the web.config file |
| ospGlobalAdmin | private: SPGlobalAdmin | Initial Value: null; |

Table 25 lists exemplary attributes that are used to view clients across a user interface within a case management system.

TABLE 25

ViewClients Methods

| Method | Type | Notes |
|---|---|---|
| Page_Load (object, System.EventArgs) | private: void | param: sender [ object - in ]<br>param: e [ System.EventArgs - in ]<br>Session["name"]is checked.<br>lblpgTitleId.Text ,lblpgTitleId.Text,<br>lblpgSubTitleId.Text, lblName.Text,lblAlias.Text,<br>txtBxUrl.Text are filled.<br>Calls dao.getCases( ). |
| OnInit (EventArgs) | private: void | param: e [ EventArgs - in ]<br>override = 'true'<br>calls InitializeComponent ( ) |
| InitializeComponent ( ) | private: void | Required method for Designer |
| btnUpdate_Click (object, System.EventArgs) | public: void | param: sender [ object - in ]<br>param: e [ System.EventArgs - in ]<br>calls dao.updateClient( )<br>Updates the site information in the portal. |
| btnView_Click (object, DataGridCommandEventArgs) | public: void | param: sender [ object - in ]<br>param: e [ DataGridCommandEventArgs - in ]<br>sessions are filled<br>Session["clientRefNum"],Session["case_type"],Session["country"], Session["familyID"],<br>Session["lvmRefNum"]Session["case_desc"]<br>Session["title"],Session["ApplicationNo"]<br>Redirects to "ViewCases.aspx" or<br>Redirects to "ViewOpinionsCases.aspx" based on case type. |
| btnChangePage_Click (object, DataGridPageChangedEventArgs) | public: void | param: sender [ object - in ]<br>param: e [ DataGridPageChangedEventArgs - in ]<br>Datagrid page index is set. |
| btnBack_Click (object, System.EventArgs) | public: void | param: sender [ object - in ]<br>param: e [ System.EventArgs - in ]<br>Redirects to previous page. |
| btnAdd_Click (object, System.EventArgs) | private: void | param: sender [ object - in ]<br>param: e [ System.EventArgs - in ]<br>Redirects to addcases.aspx or addopinioncases.aspx based on the case type selected in the dropdown list. |

Table 26 lists exemplary attributes that are used to view litigation cases across a user interface within a case management system.

TABLE 26

ViewLitigationCases Attributes

| Attribute | Type | Notes |
|---|---|---|
| dgCases | protected: System.Web.UI.WebControls.DataGrid | Datagrid shows all the litigation cases. |
| lblError | protected: System.Web.UI.WebControls.Label | Label displays the errors if any occurs and the status. |
| lblpgTitleId | protected: System.Web.UI.WebControls.Label | Label to display the current action and link to the admin menu |

TABLE 26-continued

ViewLitigationCases Attributes

| Attribute | Type | Notes |
| --- | --- | --- |
| btnAdd | protected: System.Web.UI.-WebControls.Button | Button when clicked redirects to AddLCase.aspx |
| ADLookupDomainStr | private static: string | Initial Value: ConfigurationSettings.AppSettings; Domain string name is stored from the web.config file |
| ADLookupUserID | private static: string | Initial Value: ConfigurationSettings.AppSettings; Domain user name is stored from the web.config file |
| ADLookupPassword | private static: string | Initial Value: ConfigurationSettings.AppSettings; Domain user password is stored from the web.config file |
| ADLookupDomainName | private static: string | Initial Value: ConfigurationSettings.AppSettings; Domain name is stored from the web.config file |

Table 27 lists exemplary method functions that are used to view litigation cases across a user interface within a case management system.

TABLE 27

ViewLitigationCases Methods

| Method | Type | Notes |
| --- | --- | --- |
| Page_Load (object, System.EventArgs) | private: void | param: sender [ object - in ]<br>param: e [ System.EventArgs - in ]<br>checks Session["Admin"]<br>calls dao.getcases( ) |
| OnInit (EventArgs) | private: void | param: e [ EventArgs - in ]<br>override = 'true'<br>calls InitializeComponent ( ) |
| InitializeComponent ( ) | private: void | Required method for Designer support |
| btnAdd_Click (object, System.EventArgs) | private: void | param: sender [ object - in ]<br>param: e [ System.EventArgs - in ]<br>Redirects to "AddLCase.aspx" |
| btnView_Click (object, DataGridCommandEventArgs) | public: void | param: sender [ object - in ]<br>param: e [ DataGridCommandEventArgs - in ]<br>Session["lvmRefNum"] is filled.<br>Redirects to AddLCase.aspx with query string "Action=Edit" |
| btnChangePage_Click (object, DataGridPageChangedEventArgs) | public: void | param: sender [ object - in ]<br>param: e [ DataGridPageChangedEventArgs - in ] |

Table 28 lists exemplary attributes that are used to view opinion cases across a user interface within a case management system.

TABLE 28

ViewOpinionsCases Attributes

| Attribute | Type | Notes |
| --- | --- | --- |
| lblLVMRefNum | protected: System.Web.UI.-WebControls.Label | Label displays the LVMRefNum |
| lblError | protected: System.Web.UI.-WebControls.Label | Label displays the errors if any and status. |
| txtBxClientRef | protected: System.Web.UI.-WebControls.TextBox | Textbox to enter clientrefNum. |
| txtBxDesc | protected: System.Web.UI.-WebControls.TextBox | Textbox to enter client description. |
| btnCancel | protected: System.Web.UI.-WebControls.Button | Button when clicked cancels the current action. |
| btnUpdate | protected: System.Web.UI.-WebControls.Button | Button when clicked updates the case. |

TABLE 28-continued

ViewOpinionsCases Attributes

| Attribute | Type | Notes |
|---|---|---|
| lblpgTitleId | protected: System.Web.UI.-WebControls.Label | Label displays the current action and link to the admin menu |
| lblPortalUrlText | protected: System.Web.UI.-WebControls.Label | Label displays the portal url. |
| dao | protected: DAO | Initial Value: new DAO( ); Instance of DAO class. |
| ADLookupDomainStr | private static: string | Initial Value: ConfigurationSettings.AppSettings; Domain string name is stored from the web.config file |
| ADLookupUserID | private static: string | Initial Value: ConfigurationSettings.AppSettings; Domain User name is stored from the web.config file |
| ADLookupPassword | private static: string | Initial Value: ConfigurationSettings.AppSettings; Domain User password is stored from the web.config file |
| ADLookupDomainName | private static: string | Initial Value: ConfigurationSettings.AppSettings; Domain name is stored from the web.config file |
| lblCaseType | protected: System.Web.UI.-WebControls.Label | Label displays the case type. |
| tempObj | private: LVMAdmin.AddLCase | Initial Value: new LVMAdmin.AddLCase( ); Instance of AddLCase class. |

Table 29 lists exemplary method functions that are used to view opinion cases across a user interface within a case management system.

TABLE 29

ViewOpinionsCases Methods

| Method | Type | Notes |
|---|---|---|
| Page_Load (object, System.EventArgs) | private: void | param: sender [ object - in ] param: e [ System.EventArgs - in ] Session["fromcasewebpart"] is filled if the request is from portal site. fillinSessions( ) is called. Session["lvmRefNum"]is checked. Loadpage( ) is called. |
| fillinSessions (string, string) | private: void | param: lvmRefNum [ string - in ] param: error [ string - out ] dao.getCases is called. Sessions are filled Session["clientRefNum"],Session["case_type"],Session["lvm RefNum"],Session["case_desc"],Session["name"],Session["alias"]. |
| LoadPage ( ) | private: void | lblpgTitleId.Text is filled. ViewState["CaseSiteUrl"] is set. |
| OnInit (EventArgs) | private: void | param: e [ EventArgs - in ] override = 'true' calls InitializeComponent ( ) |
| InitializeComponent ( ) | private: void | Required method for Designer support |
| btnUpdate_Click (object, System.EventArgs) | public: void | param: sender [ object - in ] param: e [ System.EventArgs - in ] tempObj.UpdateCaseSite( ) is called dao.updateCases( ) is called. |
| btnCancel_Click (object, System.EventArgs) | public: void | param: sender [ object - in ] param: e [ System.EventArgs - in ] Redirects to previous page. |

Table 30 lists exemplary attributes that are used for a cases grid within a case management system.

TABLE 30

CasesGrid Attributes

| Attribute | Type | Notes |
|---|---|---|
| dgCases | private: DataGrid | Datagrid shows all the prosecution and opinion cases of a client |

TABLE 30-continued

CasesGrid Attributes

| Attribute | Type | Notes |
|---|---|---|
| lnkAddCase | private: HyperLink | Hyperlink |
| UserInSiteGroup | private: bool | Holds the value returned by . IsCurrentUserInSiteGroup ( ) method |
| IsuserReader | private: bool | Specifies whether the login user is in which group(administrator, contributor, webdesigner, reader) |
| ADLookupDomainStr | private static: string | Initial Value: ConfigurationSettings.AppSettings; Domain string name is stored from the web.config file |
| ADLookupUserID | private static: string | Initial Value: ConfigurationSettings.AppSettings; Domain User name is stored from the web.config file |
| ADLookupPassword | private static: string | Initial Value: ConfigurationSettings.AppSettings; Domain User password is stored from the web.config file |
| ADLookupDomainName | private static: string | Initial Value: ConfigurationSettings.AppSettings; Domain name is stored from the web.config file |

Table 31 lists exemplary method functions that are used for a cases grid within a case management system.

TABLE 31

CasesGrid Methods

| Method | Type | Notes |
|---|---|---|
| CreateChildControls ( ) | protected: void | override = 'true' All declared controls are build. Calls IsCurrentUserInSiteGroup( ) If the login user belongs to reader group then the lnkAddCase is visibled false. |
| dgCases_ItemCommand (object, DataGridCommandEventArgs) | private: void | param: source [ object - in ] param: e [ DataGridCommandEventArgs - in ] Redirects to asp.net solution when edit link is clicked |
| dgCases_SortCommand (object, DataGridSortCommandEventArgs) | private: void | param: source [ object - in ] param: e [ DataGridSortCommandEventArgs - in ] sets the sort expression and the sort direction for the datagrid. |
| CreateDataSource (string) | protected: DataSet | param: alias [ string - in ] Gets all the prosecution and opinion cases for the corresponding client from tables prosecution_Cases,LVMOpinion_cases table of the database using "USP_GetProsecutionCasesForClientAlias" procedure |
| OnPreRender (EventArgs) | protected: void | param: e [ EventArgs - in ] override = 'true' CreateDataSource( ) is called Datagrid datasource is set. |
| RenderWebPart (HtmlTextWriter) | protected: void | param: output [ HtmlTextWriter - in ] override = 'true' Controls are rendered HTML view is built. |
| dgCases_PageIndexChanged (object, DataGridPageChanged EventArgs) | private: void | param: source [ object - in ] param: e [ DataGridPageChangedEventArgs - in ] Datagrid page index is set. |
| buildgrid ( ) | private: void | CreateDataSource( ) is called Datagrid datasource is set. |
| IsCurrentUserInSiteGroup (string) | private: bool | param: TargetSiteGroup [ string - in ] Checks the login users security group. |

Table 32 lists exemplary attributes that are for the copy reference utility within a case management system.

TABLE 32

CopyDL Attributes

| Attribute | Type | Notes |
|---|---|---|
| _text | public: String | Initial Value: _defaultText; |
| btn «with events» | private: Button | objectInitialiser = 'true' - The default value is a parameter list for an object initialiser |
| txtB | private: TextBox | objectInitialiser = 'true' - The default value is a parameter list for a object initialiser |

TABLE 32-continued

| | CopyDL Attributes | | |
|---|---|---|
| Attribute | Type | Notes |
| lblC | private: Label | objectInitialiser = 'true' - The default value is a parameter list for a object initialiser |
| lblMsg | private: Label | objectInitialiser = 'true' - The default value is a parameter list for a object initialiser |
| tb | private: Table | Table |
| tr | private: TableRow | Table row |
| td | private: TableCell | Table column |
| str | private: String | |
| LOGON32_LOGON_INTERACTIVE | public: Integer | Private objImpersonator As New Impersonator Initial Value: 2; |
| LOGON32_PROVIDER_DEFAULT | public: Integer | Initial Value: 0; |
| moImpersonationContext | public: WindowsImpersonationContext | |
| ADLookupDomainStr | private static: String | Initial Value: Configuration Settings; Domain string name is stored from the web.config file |
| ADLookupUserID | private static: String | Initial Value: ConfigurationSettings; Domain User name is stored from the web.config file |
| ADLookupPassword | private static: String | Initial Value: ConfigurationSettings; Domain user password is stored from the web.config file |
| ADLookupDomainName | private static: String | Initial Value: ConfigurationSettings; Domain name is stored from the web.config file |
| m_filescount | private: Int16 | Total files copied |

Table 33 lists exemplary method functions that are for the copy reference utility within a case management system.

TABLE 33

| | CopyDL Methods | | |
|---|---|---|
| Method | Type | Notes |
| LogonUser ( ) | «import» public: | Lib = 'advapi32.dll' |
| DuplicateToken ( ) | «import» public: | Lib = 'advapi32.dll' |
| ImpersonateUser (String, String, String) | public: Boolean | param: userName [ String - in ] param: domain [ String - in ] param: password [ String - in ] |
| undoImpersonation ( ) | public: | |
| [Text] ( ) | «property» public: String | Attribute = '<Browsable(True), Category("Miscellaneous"), DefaultValue(_defaultText), WebPartStorage(Storage.Personal), FriendlyName("Text"), Description("Text Property")>' attribute_name = 'm_[Text]' Webpart property |
| RenderWebPart (System.Web.UI.HtmlTextWriter) | protected: | param: output [ System.Web.UI.HtmlTextWriter - in ] Render this Web Part to the output parameter specified. Overrides = 'true' Child controls are rendered and the HTML view is generated. |
| CreateChildControls ( ) | protected: | Overrides = 'true' Controls are built. |
| IsValidCaseNumber (String) | public: String | param: CaseCardNo [ String - in ] checks whether the given casecardno is valid or not. |
| btnClick (Object, EventArgs) | public: | param: obj [ Object - in ] param: e [ EventArgs - in ] calls CopyReferences( ) |
| FilesCount ( ) | «property» public: Int16 | attribute name = 'm_FilesCount' Property FilesCount |
| CopyReferences (String) | public: | param: relativepath [ String - in ] Dim desSite As SPSite = SPControl.GetContextSite(Context) Files under "References" document libraries are copied to current sites "References" document library |

Table 34 lists exemplary attributes that are for the document extractor utility within a case management system.

TABLE 34

SiteFileExtractor Attributes

| Attribute | Type | Notes |
| --- | --- | --- |
| chkRecurseSubSites | protected: CheckBox | Checkbox when checked includes sub sites. |
| btnExtractDocs | protected: Button | Button when clicked extracts documents. |
| lblStatusMsg | protected: Label | Label displays the status message or any error occurs during file copy. |
| m_RecurseWebs | private: bool | |
| m_RecurseFolders | private: bool | |
| lTotalSize | private: long | |
| m_iTotalFiles | private: long | |
| m_strExportDir | private: string | |
| logMessage | private: StringBuilder | Initial Value: new StringBuilder( ); |

Table 35 lists exemplary method functions that are for the document extractor utility within a case management system.

TABLE 35

SiteFileExtractor Methods

| Method | Type | Notes |
| --- | --- | --- |
| CreateChildControls ( ) | protected: void | override = 'true'<br>All controls are built. |
| btnExtractDocs_Click (object, System.EventArgs) | private: void | param: sender [ object - in ]<br>param: e [ System.EventArgs - in ]<br>calls ExtractSiteDocuments( ) |
| RenderWebPart (HtmlTextWriter) | protected: void | param: output [ HtmlTextWriter - in ]<br>override = 'true'<br>Controls are rendered and HTML view is generated. |
| ExtractSiteDocuments (SPSite, bool) | protected: long | param: siteColl [ SPSite - in ]<br>param: recurseSubSites [ bool - in ]<br>calls GetWebDetails( ) |
| GetWebDetails (SPWeb) | protected: long | param: web [ SPWeb - in ]<br>logMessage is appended. |
| GetFolderDetails (SPFolder) | protected: long | param: folder [ SPFolder - in ] |
| CheckPathAndCreate (string) | protected: string | param: ServerRelativeUrl [ string - in ] |

Table 36 lists exemplary attributes that are for a checklist within a case management system.

TABLE 36

Checklist Attributes

| Attribute | Type | Notes |
| --- | --- | --- |
| defaultText | private const: string | Initial Value: ""; |
| text | private: string | Initial Value: defaultText; |
| lblerror | public: Label | Label displays errors if any . |
| hypChecklist | private: HyperLink | HyperLink navigates to asp.net solution. |
| rbtnFFOC | private: RadioButton | Radiobutton holds the foreign originated Case 'Yes' value |
| rbtnFFIss | private: RadioButton | Radiobutton holds the foreign filing issues specify 'Yes' value. |

TABLE 36-continued

Checklist Attributes

| Attribute | Type | Notes |
| --- | --- | --- |
| rbtnPRpc | private: RadioButton | RadioButton holds the priority claimed/all priority documents filed 'Yes' value |
| rbtnPRuspto | private: RadioButton | RadioButton holds the USPTO acknowledgement of priority claim/documents 'Yes' value |
| rbtnDrawAny | private: RadioButton | RadioButton holds the any drawings 'Yes' value |
| rbtnDrawFDF | private: RadioButton | RadioButton holds the formal drawings filed 'Yes' value |
| rbtnDrawFDA | private: RadioButton | RadioButton holds the formal drawings approved by official Draftsmen 'Yes' value |
| rbtnOFRrrec | private: RadioButton | RadioButton holds the official filing receipt received 'Yes' value. |
| rbtnOFRcreq | private: RadioButton | RadioButton holds the correction of official filing receipt requested 'Yes' value. |
| rbtnOFRcrec | private: RadioButton | RadioButton holds the corrected receipt received 'Yes' value. |
| rbtnInventor | private: RadioButton | RadioButton holds the Inventor/Assignee Info Changed After Submission of First ADS 'Yes' value. |
| rbtnAssign | private: RadioButton | RadioButton holds the multiple ownership/multiple assignments 'Yes' value. |
| rbtnAssign1 | private: RadioButton | RadioButton holds the multiple ownership/multiple assignments 'No' value. |
| rbtnFFOC1 | private: RadioButton | Radiobutton holds the foreign originated Case 'No' value |
| rbtnFFIss1 | private: RadioButton | Radiobutton holds the foreign filing issues specify 'No' value. |
| rbtnPRpc1 | private: RadioButton | RadioButton holds the priority claimed/all priority documents filed 'No' value |
| rbtnPRuspto1 | private: RadioButton | RadioButton holds the USPTO acknowledgement of priority claim/documents 'No' value |
| rbtnDrawAny1 | private: RadioButton | RadioButton holds the any drawings 'No' value |
| rbtnOFRcreq1 | private: RadioButton | RadioButton holds the correction of official filing receipt requested 'No' value. |
| rbtnInventor1 | private: RadioButton | RadioButton holds the Inventor/Assignee Info Changed After Submission of First ADS 'No' value. |
| rbtnOffAct1 | private: RadioButton | RadioButton holds the restriction requirement 'Multiple' value. |
| rbtnOffAct2 | private: RadioButton | RadioButton holds the restriction requirement 'Yes' value. |
| rbtnOffAct3 | private: RadioButton | RadioButton holds the restriction requirement 'No' value. |
| txtFFiss | private: Label | Label displays the foreign filing issues value . |
| txtInventor | private: Label | Label displays the Inventor/Assignee value. |
| txtAssign1 | private: Label | Label displays the Assignment 1 value. |
| txtAssign2 | private: Label | Label displays the Assignment 2 value. |
| txtAssign3 | private: Label | Label displays the Assignment 3 value. |
| txtIDS | private: Label | Label displays the IDS1 value. |
| txtComments | private: Label | Label displays comments value |
| txtLvmRefNo | private: Label | Label displays the LvmReference number. |
| tbl | private: Table | Table |
| pch1 | private: PlaceHolder | PlaceHolder |
| pnl | private: Panel | Panel |
| lbldate | private: Label | Label displays IDS date values |
| lblref | private: Label | Label displays IDS references values. |
| rbfile | private: RadioButton | Radiobutton holds IDS "Filed" values |
| rbexchk | private: RadioButton | Radiobutton holds IDS "Exr.Chk" values |
| ds | private: DataSet | Dataset. |
| lblAssign | private: Label | Label displays Assignment values. |

TABLE 36-continued

Checklist Attributes

| Attribute | Type | Notes |
|---|---|---|
| rbtnAFiled | private: RadioButton | Radiobutton holds Assignment "Filed" values |
| rbtnRecorded | private: RadioButton | Radiobutton holds Assignment "Recorded" values |
| AssignPnl | private: Panel | Panel |
| ADLookupDomainStr | private static: string | Initial Value: ConfigurationSettings.AppSettings; Domain string name is stored from the web.config file |
| ADLookupUserID | private static: string | Initial Value: ConfigurationSettings.AppSettings; Domain User name is stored from the web.config file |
| ADLookupPassword | private static: string | Initial Value: ConfigurationSettings.AppSettings; Domain user password is stored from the web.config file |
| ADLookupDomainName | private static: string | Initial Value: ConfigurationSettings.AppSettings; Domain name is stored from the web.config file |

Table 37 lists exemplary method functions that are for a checklist within a case management system.

TABLE 37

Checklist Methods

| Method | Type | Notes |
|---|---|---|
| Text ( ) | «property» public: string | Attribute = '[Browsable(true), Category("Miscellaneous"), DefaultValue(defaultText), WebPartStorage(Storage.Personal), FriendlyName("Text"), Description("Text Property")]' Property |
| RenderWebPart (HtmlTextWriter) | protected: void | param: output [ HtmlTextWriter - in ] The HTML writer to write out to Render this Web Part to the output parameter specified. override = 'true' All the controls are rendered and HTML view is generated. |
| CreateChildControls ( ) | protected: void | override = 'true' All controls are built. Createlables( ) is called. Createtexboxs( ) is called Createradiobuttons( ) is called Displayvalues( ) is called. IsUserReader( ) is called. |
| createlables (Label, string) | public: Label | param: lbl [ Label - out ] param: text [ string - in ] labels are built. |
| createlables (Label, string, string) | public: Label | param: lbl [ Label - out ] param: text [ string - in ] param: id [ string - in ] labels are built. |
| createradiobuttons (RadioButton, string) | public: RadioButton | param: rbtn [ RadioButton - out ] param: groupname [ string - in ] radiobuttons are built. |
| createradiobuttons (RadioButton, string, string, int) | public: RadioButton | param: rbtn [ RadioButton - out ] param: groupname [ string - in ] param: id [ string - in ] param: chk [ int - in ] radiobuttons are built. |
| createtexboxs (Label) | public: Label | param: txt [ Label - out ] labels are built. |
| radiovalues (RadioButton, int) | private: int | param: rbtn [ RadioButton - in ] param: retval [ int - in ] if rabio button is unchecked then returns −1 value else returns the return value. |
| displayvalues (string) | private: void | param: caseno [ string - in ] calls "uso_getchecklistforwebpart( )" procedure and fills the controls |
| radiochecked (RadioButton, RadioButton, int) | private: void | param: rb1 [ RadioButton - in ] param: rb2 [ RadioButton - in ] param: rdvalue [ int - in ] checks a RadioButton among two radio buttons based on the value. |

TABLE 37-continued

Checklist Methods

| Method | Type | Notes |
|---|---|---|
| radiochecked (RadioButton, RadioButton, RadioButton, int) | private: void | param: rb1 [ RadioButton - in ]<br>param: rb2 [ RadioButton - in ]<br>param: rb3 [ RadioButton - in ]<br>param: rdvalue [ int - in ]<br>checks a RadioButton among three radio buttons based on the value. |
| returnradiovalue (int) | private: int | param: rdvalue [ int - in ]<br>returns the value 0,1,2,−1 based on the input value provided. |
| IsUserReader ( ) | private: bool | Checks if the login user belongs to Reader group. |

Table 38 lists exemplary attributes that are for contacts within a case management system.

TABLE 38

Contacts Attributes

| Attribute | Type | Notes |
|---|---|---|
| _text | public: String | Initial Value: _defaultText;<br>Property |
| dg «with events» | private: DataGrid | objectInitialiser = 'true' - The default value is a parameter list for a object initialiser<br>Datagrid displays all the contacts from client site. |

Table 39 lists exemplary method functions that are for contacts within a case management system.

TABLE 39

Contacts Methods

| Method | Type | Notes |
|---|---|---|
| [Text] ( ) | «property» public: String | Attribute = '<Browsable(True), Category("Miscellaneous"), DefaultValue(_defaultText), WebPartStorage(Storage.Personal), FriendlyName("Text"), Description("Text Property")>'<br>attribute_name = 'm_[Text]' |
| RenderWebPart (System.Web.UI.HtmlTextWriter) | protected: | param: output [ System.Web.UI.HtmlTextWriter - in ]<br>Render this Web Part to the output parameter specified.<br>Overrides = 'true'<br>Child controls are rendered. |
| CreateChildControls ( ) | protected: | Dim listItems As SPListItemCollection = list.GetItems(query) Dim listItem As SPListItem End Sub<br>Overrides = 'true'<br>Child controls are built. |

Table 40 lists exemplary procedures used with the database application interface within the case management system.

TABLE 40

Procedures

| Procedure Name | Parameters | | Notes | Tables |
|---|---|---|---|---|
| | Input | Return | | |
| USP_GetFullURL | @casecardnum, @fullurl, @caseType | | Select a case type from Cases Table based on casecardnum provided and get fullurl as per casetype | Cases |
| USP_GetProsecutionCases | @clientId | | Get Client details based on ClientID checking the case_type. | prosecution_cases, LVMOpinion_cases |

TABLE 40-continued

Procedures

| Procedure Name | Parameters Input | Return | Notes | Tables |
|---|---|---|---|---|
| USP_InsertProsecutionCase | @case_no, @case_type, @client_id, @family_id, @case_desc, @title, @country, @clientRefNumber, @fullurl, @isLargeEntity, @ApplicationNo | @error | Insert client details for prosecution case. | Prosecution_cases |
| USP_InsertLVMOpinionCase | @case_no, @case_type, @client_id, @case_desc, @clientRefNumber, @fullurl | @error | Insert client details for opinion case. | LVMOpinion_cases |
| USP_InsertLitigationCase | @case_no, @case_type, @title, @plaintiff, @defendant, @court, @fullurl | @error | Insert client details for litigation case. | Litigation_cases |
| USP_UpdateLitigationCase | @case_no, @title, @plaintiff, @defendant @court, | @success | Update client details for litigation case referring case_no | Litigation_Cases |
| USP_DeleteCase | @case_no, @case_type | | Delete from cases referring case_no | Prosecution_Cases, Litigation_Cases |
| USP_InsertCodeError | @errtext | | Insert Error Message into lvmCodeErrors | lvmCodeErrors |
| usp_InsertChecklist | @lvmrefno, @FFval1, @inventorval2, @idsval6, @commentsval12, @ffocval13, @ffIssval14, @PRpcval15, @PRusptoval16, @DrawAnyval17, @Drawfdval18, @Drawfdval19, @OFRrrecval20, @OFRcrecval21, @OFRcrecval22, @Inventorval23, @Assignval24, @offActval33, @offActval34 | | Insert details into checklist table. | Checklist |
| usp_deleteChecklist | @lvmrefno | | Delete details from checklist table based on LVM RefNo. | Checklist |
| usp_updatechecklist | @lvmrefno, @FFval1, @inventorval2, @idsval6, @commentsval12, @ffocval13, @ffIssval14, @PRpcval15, @PRusptoval16, @DrawAnyval17, @Drawfdval18, @Drawfdval19, @OFRrrecval20, @OFRcrecval21, @OFRcrecval22, @Inventorval23, @Assignval24, @offActval33, @offActval34 | | Update details into checklist table based on LVM RefNo | Checklist |
| uso_getchecklist | @caseno | | Get details from checklist table based on LVM RefNo | Checklist |
| usp_deletefromAssignTable | @lvmrefno | | Delete from AssignTable based on lvmRefNo | AssignTable |

TABLE 40-continued

Procedures

| Procedure Name | Parameters | | Notes | Tables |
|---|---|---|---|---|
| | Input | Return | | |
| usp_deletefromIdstable | @lvmrefno | | Delete from idstable based on lvmRefNo | Idstable |
| usp_getAssignValues | @lvmrefNo | | Select AssignText, Assign Value from assigntable based on lvmrefNo | assigntable |
| usp_getIdsValues | @lvmrefNo | | select IDSDate, IDSRef, idsFile from idstable based on lvmrefNo | Idstable |
| usp_insertAssignTable | @LVMrefNo, @AssignText, @AssignValue | | Insert values into AssignTable | AssignTable |
| usp_insertIdsTable | (@LVMrefNo, @IDSdate, @IDSRef, @IDSFile | | insert values into idstable | Idstable |
| uso_getchecklistforwebpart | @caseno | | Select details from checklist table based on LVM RefNo | Checklist |
| USP_GetProsecutionCasesForClientAlias | @clientAlias | | Get details for prosecution_cases and LVMOpinion_cases based on clientAlias | prosecution_cases, LVMOpinion_cases |

This <appSettings> section of the web.config maintains all the settings for the application.

Table 41 lists the keys used within the case management system.

TABLE 41

Keys

| Key | Description |
|---|---|
| ADLookupDomainStr | In this key Active Directory domain string is stored. |
| ADLookupUserID | In this key Active directory admin user is stored. |
| ADLookupPassword | In this key Active directory admin user password stored. |
| domainStr | In this key Active Directory domain name is stored |
| ExtractDocsLocation | In this key the documents extract location is stored. |
| AdminGroup | In this key Active directory group name is stored. |
| ClientSiteCustomTemplateID | In this key Client site template id is stored. |
| ProsecutionSiteCustomTemplateID | In this key Prosecution case site template id is stored. |
| LitigationSiteCustomTemplateID | In this key Litigation case site template id is stored. |
| LVMOpinionsCustomTemplateID | In this key Opinion case site template id is stored. |
| ConnectionString | In this key database connection string is stored |
| strSMTP | In this key SMTP ip address is stored |
| strSMTPUserName | In this key SMTP username is stored. |
| strSMTPPassword | In this key SMTP password is stored. |
| strToAddress | In this key "To Email address" is stored. |

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred exemplary embodiments are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A distributed system comprising:
a case management system, including a web-based content access user interface, comprising a processor and a non-transitory computer-readable medium including computer executable instructions for configuring the processor to carry out a method including:
providing an electronic user interface that allows system users to remotely access case information via the web-based content access user interface;
implementing a system service including:
a file management system, and
an administration utility that creates content pages by populating templates;
maintaining a database of content accessed by users via the web-based content access user interface;
extracting content from the database to facilitate accessing content through the web-based content access user interface;
receiving an e-mail message from an e-mail program; and
directly transferring, by a client e-mail publisher, the e-mail message to the database of content of the case management system; and
a client e-mail publisher utility configured to be directly accessed, via a user-activated control in an e-mail user interface of the e-mail program, to:
receive identification of the e-mail message selected for publication, and
send the e-mail message to the client e-mail publisher, wherein the e-mail program and the client e-mail publisher utility are external to the case management system.

2. The system according to claim 1, wherein the web-based content access user interface is selected from a group consisting of a web, inter-network, intra-network, local area network, wide area network, Internet, browsers, or viewer interfaces.

3. The system according to claim 1, wherein a website provides access to content from the database accessed through the web-based content access user interface.

4. The system according to claim 1, wherein a system user enters data to create a content website within the case management system.

5. The system according to claim 1, wherein the database of content comprises a hierarchical tree structured database.

6. The system according to claim 1, wherein each template is populated by system user data to create a content website to provide a uniform file storage and file maintenance case management system.

7. The system according to claim 1, wherein a default template is incorporated into the document management system and facilitates creating content websites.

8. The system according to claim 1, wherein a custom template is created and incorporated into the document management system to facilitate creating content websites.

9. The system according to claim 1, wherein the database supports the case management system by storing, updating, and removing content.

10. The system according to claim 1, wherein the content is stored into data structures within the database to provide uniform file storage and file maintenance in the case management system.

11. The system according to claim 4, wherein the content website comprises: client information, client case numbers, list of individuals, and a link to access the document extractor.

12. The system according to claim 1, further comprising a copy reference utility that copies content from one content data structure to another.

13. The system according to claim 1, wherein the extracting enables a user to transmit documents through the interface, the system further comprising:
a software component that accesses content from a case management system hierarchical tree storage structured database;
a software component that stores content in a flat file storage structured database; and
a software component that allows a system user to transmit content over a network through a user interface.

14. The system according to claim 1, wherein the client e-mail publisher utility supports selecting one or more e-mails to be copied and published as content into a data structure of the system database.

15. A method, performed in a distributed system including a case management system comprising a web-based content access user interface and a client e-mail publisher utility configured to be directly accessed via a user-activated control in an e-mail user interface of an e-mail program, the method including:
providing, by the case management system, an electronic user interface that allows system users to remotely access case information via the web-based content access user interface;
implementing, by the case management system, a system service including:
a file management system, and
an administration utility that creates content pages by populating templates;
maintaining, by the case management system, a database of content accessed by users via the web-based content access user interface;
extracting, by the case management system, content from the database to facilitate accessing content through the web-based content access user interface;
receiving an e-mail message from an e-mail program;
directly transferring, by a client e-mail publisher of the case management system, the e-mail message to the database of content of the case management system;
receiving, by the client e-mail publisher utility, identification of the e-mail message selected for publication, and
sending, by the client e-mail publisher utility, the e-mail message to the client e-mail publisher,
wherein the e-mail program and the client e-mail publisher utility are external to the case management system.

16. The method according to claim 15, wherein the maintaining the database of content further comprises:
storing content into data structures to provide uniform file storage and file maintenance in the case management system;
updating case and client content; and
removing case and client content.

17. The method according to claim 15, wherein the extracting content further comprises:
accessing one or more pieces of content from the case management system database;
copying one or more pieces of content from the case management system database;

storing one or more pieces of content into a flat file database; and transmitting contents over a network through a user interface.

18. A non-transitory computer-readable medium including computer executable instructions for carrying out a method, performed in a distributed system including a case management system comprising a web-based content access user interface and a client e-mail publisher utility configured to be directly accessed via a user-activated control in an e-mail user interface of an e-mail program, the method including:

providing, by the case management system, an electronic user interface that allows system users to remotely access case information via the web-based content access user interface;

implementing, by the case management system, a system service including:
a file management system, and
an administration utility that creates content pages by populating templates;

maintaining, by the case management system, a database of content accessed by users via the web-based content access user interface;

extracting, by the case management system, content from the database to facilitate accessing content through the web-based content access user interface;

receiving an e-mail message from an e-mail program;

directly transferring, by a client e-mail publisher of the case management system, the e-mail message to the database of content of the case management system;

receiving, by the client e-mail publisher utility, identification of the e-mail message selected for publication, and sending, by the client e-mail publisher utility, the e-mail message to the client e-mail publisher, wherein the e-mail program and the client e-mail publisher utility are external to the case management system.

19. The non-transitory computer-readable medium of claim 18, wherein the maintaining the database of content further comprises:

storing content into data structures to provide uniform file storage and file maintenance in the case management system;

updating case and client content; and removing case and client content.

20. The non-transitory computer-readable medium of claim 18, wherein the extracting content further comprises:

accessing one or more pieces of content from the case management system database;

copying one or more pieces of content from the case management system database;

storing one or more pieces of content into a flat file database; and transmitting contents over a network through a user interface.

* * * * *